(12) United States Patent
Lawrence

(10) Patent No.: US 11,900,455 B1
(45) Date of Patent: *Feb. 13, 2024

(54) METHOD AND APPARATUS FOR DECENTRALIZED VC FUNDS

(71) Applicant: Mark Lawrence, Monrovia, CA (US)

(72) Inventor: Mark Lawrence, Monrovia, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/359,614

(22) Filed: Jun. 27, 2021

Related U.S. Application Data

(63) Continuation-in-part of application No. 15/268,591, filed on Sep. 18, 2016, now Pat. No. 11,087,401.

(Continued)

(51) Int. Cl.
*G06Q 40/04* (2012.01)
*G06Q 20/40* (2012.01)
*G06Q 20/38* (2012.01)
*G06Q 10/20* (2023.01)
*G06Q 50/18* (2012.01)
(Continued)

(52) U.S. Cl.
CPC ........... *G06Q 40/04* (2013.01); *G06F 16/182* (2019.01); *G06N 3/08* (2013.01); *G06N 5/02* (2013.01); *G06Q 10/10* (2013.01); *G06Q 10/20* (2013.01); *G06Q 20/381* (2013.01); *G06Q 20/389* (2013.01); *G06Q 20/3829* (2013.01); *G06Q 20/40145* (2013.01); *G06Q 50/182* (2013.01); *H04L 9/3231* (2013.01); *H04L 63/0435* (2013.01); *H04L 63/126* (2013.01); *G06F 21/602* (2013.01); *G06Q 50/205* (2013.01); *G06Q 2230/00* (2013.01); *H04L 63/0272* (2013.01)

(58) Field of Classification Search
None
See application file for complete search history.

(56) References Cited

U.S. PATENT DOCUMENTS

| 4,670,848 A | 6/1987 | Schramm |
| 8,156,090 B1 | 4/2012 | Curles |

(Continued)

FOREIGN PATENT DOCUMENTS

| KR | 20200021221 A | 11/2020 |
| WO | WO2016177026 A1 | 11/2016 |

OTHER PUBLICATIONS

Girao (European Workshop on Security in Ad-hoc and Sensor Networks, "Two's company, Three is a crowd", 2006, pp. 70-82).*

*Primary Examiner* — Gregory A Pollock

(57) ABSTRACT

A method, a system, and a computer program product provide a method for managing a decentralized venture capital ("VC") fund in a decentralized autonomous organization ("DAO") configured to use a secure communication environment. The method includes securing authentication information, including user authentication information. The securing of the authentication information includes using a public key in the process to encrypt the authentication information and then decomposing the authentication information into subcomponents that are distributed randomly across a plurality of member computers. The method further includes recovering the authentication information by recombining the authentication information from its subcomponents then using a private key in the process to decrypt the authentication information.

20 Claims, 19 Drawing Sheets

Related U.S. Application Data

(60) Provisional application No. 63/094,236, filed on Oct. 20, 2020.

(51) Int. Cl.

| | |
|---|---|
| *G06Q 10/10* | (2023.01) |
| *H04L 9/40* | (2022.01) |
| *H04L 9/32* | (2006.01) |
| *G06F 16/182* | (2019.01) |
| *G06N 5/02* | (2023.01) |
| *G06N 3/08* | (2023.01) |
| *G06F 21/60* | (2013.01) |
| *G06Q 50/20* | (2012.01) |

(56) References Cited

U.S. PATENT DOCUMENTS

| | | |
|---|---|---|
| 8,271,545 B2 | 9/2012 | Butcher et al. |
| 8,374,354 B2 | 2/2013 | Berggren |
| 10,044,756 B2 | 8/2018 | Overby, Jr. et al. |
| 2001/0032157 A1 | 10/2001 | Dannenberg et al. |
| 2002/0138385 A1 | 9/2002 | Milam |
| 2005/0160034 A1 | 7/2005 | Woodruff et al. |
| 2008/0195433 A1 | 8/2008 | Glenn et al. |
| 2011/0129090 A1* | 6/2011 | Grall .................. H04W 12/041 |
| | | 380/285 |
| 2012/0136807 A1 | 5/2012 | Bendel |
| 2013/0226688 A1 | 8/2013 | Harvilicz et al. |
| 2014/0067644 A1 | 3/2014 | Cameron et al. |
| 2014/0143124 A1 | 5/2014 | Sanders |
| 2015/0161721 A1 | 6/2015 | Zhou |
| 2015/0170112 A1 | 6/2015 | DeCastro |
| 2015/0347971 A1* | 12/2015 | D'Amore ............. G06Q 10/101 |
| | | 705/300 |
| 2016/0162478 A1* | 6/2016 | Blassin .......... G06Q 10/063112 |
| | | 706/12 |
| 2018/0005186 A1 | 1/2018 | Geoffrey et al. |
| 2018/0089758 A1 | 3/2018 | Stradling et al. |
| 2019/0013931 A1 | 1/2019 | Benini |
| 2019/0156301 A1 | 5/2019 | Bentov et al. |

\* cited by examiner

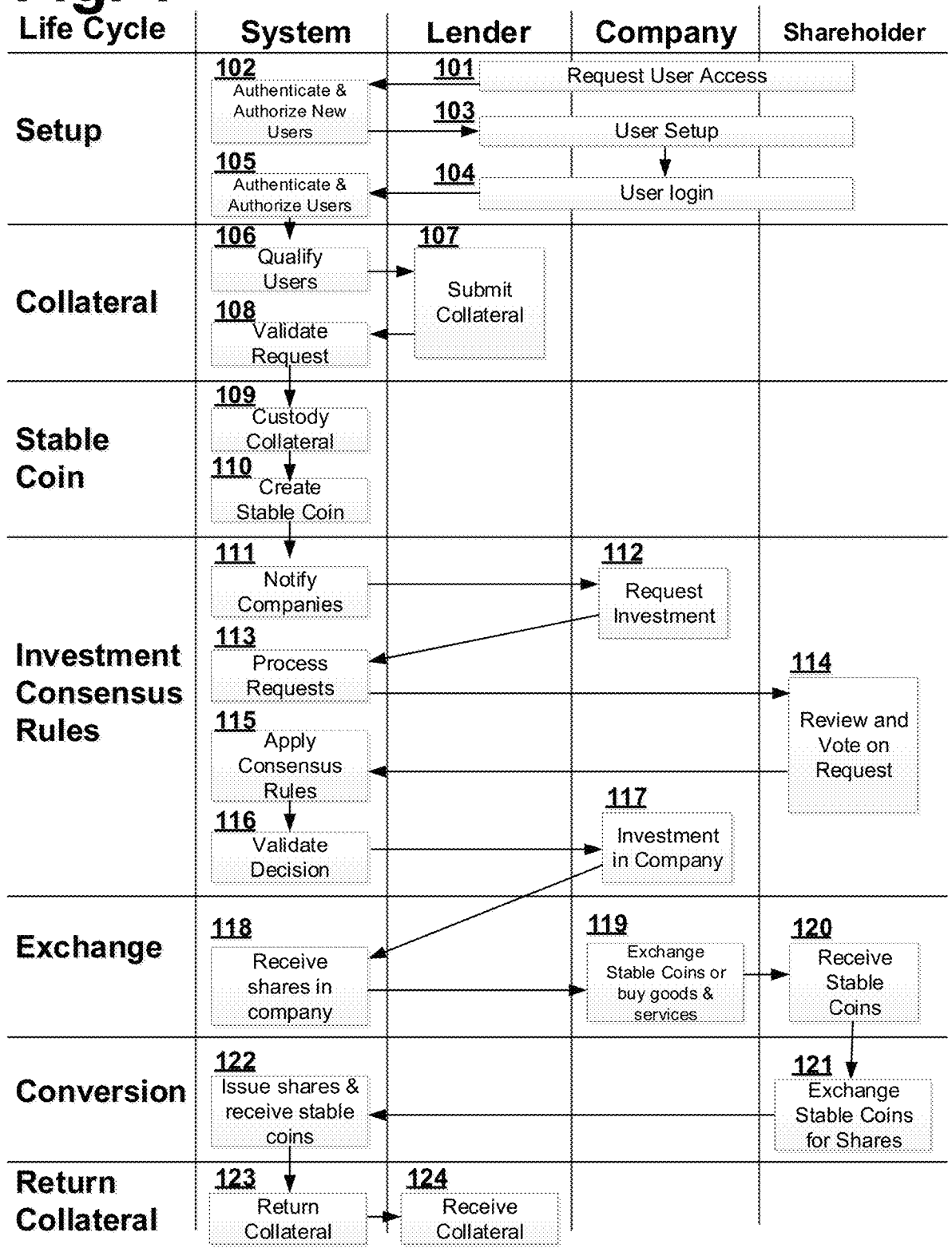

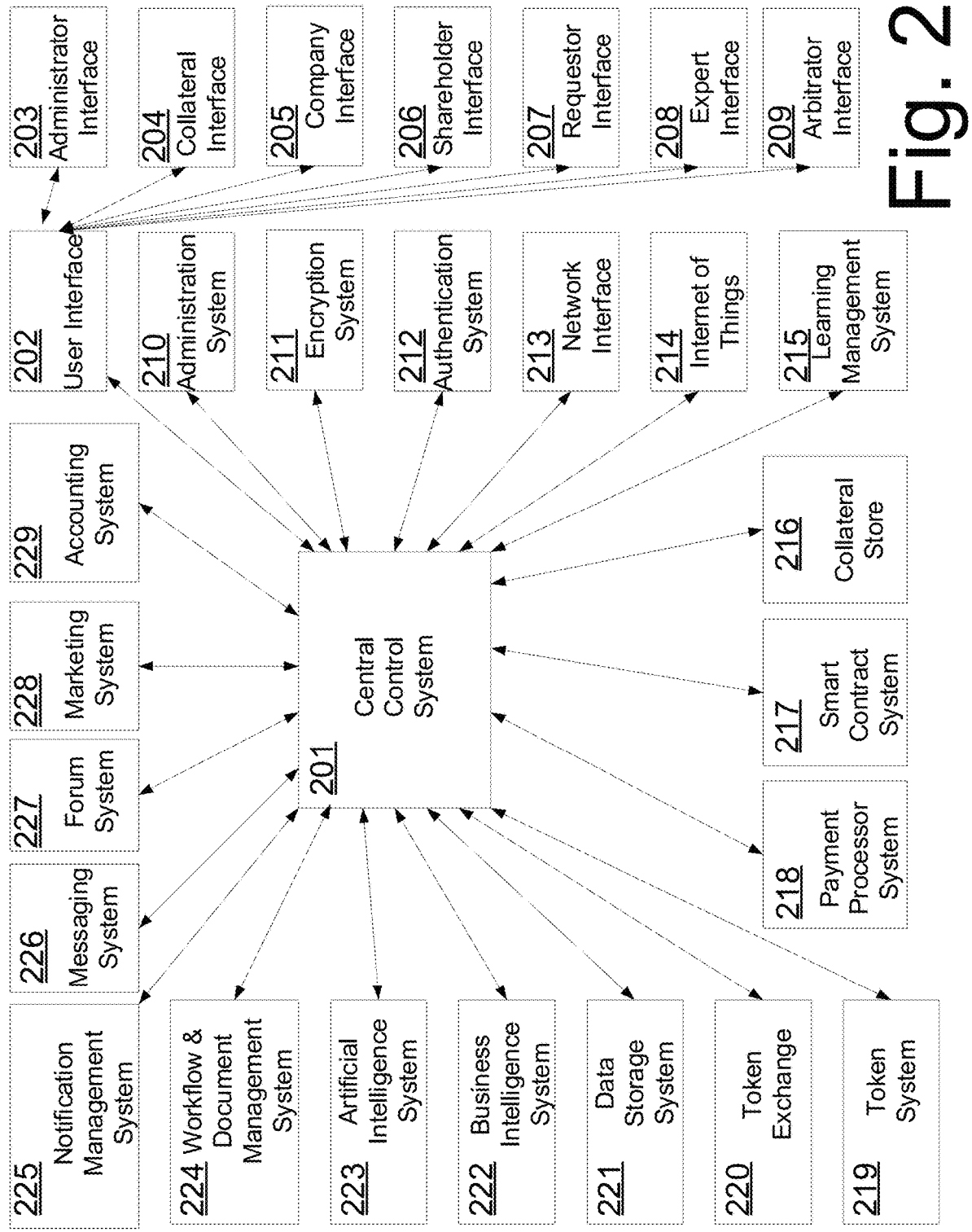

Fig. 6

Data Storage System 220

| # | Database | # | Database |
|---|---|---|---|
| 601 | CCS Database | 611 | Smart Contract Database |
| 602 | User Database | 612 | Payment Processor Database |
| 603 | Administration Database | 613 | Token/Stable Coin Database |
| 604 | Encryption Database | 614 | Artificial Intelligence Database |
| 605 | Authentication Database | 615 | Workflow Management Database |
| 606 | Internet of Things (IoT) Database | 616 | Notification Management Database |
| 607 | Collateral Store Database | 617 | Messaging Database |
| 608 | Learning Database | 618 | Forums Database |
| 609 | Service Request Database | 619 | Marketing Database |
| 610 | Arbitration Database | 620 | Audit Database |

Business Intelligence System

706 Presentation Layer Module

705 Reporting Tools Module

704 Data Mining Tools Module

703 Analytic Tools Module

702 Data Warehouse Module

701 ETL Module
Extract, Transform, Load Data

Fig. 7

METHOD AND APPARATUS FOR DECENTRALIZED VC FUNDS

CROSS REFERENCE TO RELATED APPLICATION

This application is a continuation-in-part of application Ser. No. 15/268,591, Filed Sep. 18, 2016 by the present inventor and Notice of Allowance mailed on Apr. 6, 2021.

This application claims the benefit of provisional patent application Ser. No. 63/094,236 filed 2020 Oct. 20 by the present inventor.

FEDERALLY SPONSORED RESEARCH

None.

SEQUENCE LISTING

None.

BACKGROUND OF THE PRESENT INVENTION

1.1) Field of the Invention

This invention relates generally to the field of venture capital.

1.2) Background

A traditional venture capital fund raises approximately $100M from limited partners ("LPs") who expect 10× their money ($1 Billion) in 7 to 10 years. Typically, the venture capital fund will invest in 20 to 50 companies. If the Venture Capitalist receives a 20% stake in each company and has a 90% failure rate then 2 to 5 companies will succeed. For a 10× return, the average value of 2 successful companies must exceed $2.5 Billion or the average value of 5 successful companies must exceed $1 Billion. Financial exclusion filters out companies that do not have the potential for a $1B valuation. This creates an opportunity for a new form of venture capital where companies that have a potential value of $10M to $50M can deliver the limited partner's target ROI in 3 to 5 years.

In addition, traditional venture capital funds have a selection committee which decides the companies in which they will invest. This can lead to bias that excludes investments in companies from specific geographies, industries and markets or management teams that have specific demographics, experience, stage of traction, etc.

This creates an opportunity for a new form of venture capital that has different return on investment expectations from limited partners and has decentralized decision making that promotes financial inclusion. This opportunity can be addressed by reducing the risk for limited partners, increasing the relative importance of non-monetary benefits, such as social impact, and by promoting decentralized autonomous investment selection decisions.

Further, authentication of confidential information is an important task. The confidential information may be subjected to various attacks, such as phishing attacks, social engineering attacks, dictionary attacks and the like. The confidential information may be hacked by a hacker using several hacking techniques. In addition, confidential information may be leaked due to inappropriate encryption and decryption of authentication information. Conventional methods of encryption and decryption may be hacked without much effort. Moreover, physical loss of authentication information may occur in several instances. The recovery of authentication information during physical loss of authentication information is also an important aspect. Hence, there exists a need for a system which provides secure authentication information, recovery of the authentication information, and storing the authentication information securely.

1.3) Background Art

These challenges associated with reducing the risk for limited partners in venture capital funds and therefore reducing their expected return on investment and making venture capital more inclusive is not resolved by the prior art. US20150161721 A1 teaches a method to raise venture capital via an award and reality TV show. US20010032157 A1 teaches a method and system for raising money for a new business idea. US20020138385 A1 teaches a method to match entrepreneurs with angel investors. US20120136807 A1 teaches a method to fund investment seeking companies. US20130226688 A1 teaches a crowd funding system to fund projects, such as business ventures and charitable causes. US20140067644 A1 teaches a method to provide entrepreneurs with crowdfunding capital that maintains appropriate monitoring control. US20140143124 A1 teaches an equity crowd funding system with different types of investors. WO2016177026A1 teaches a data processing method for a decentralized autonomous organization. KR20200021221A teaches a method and apparatus for providing a stable coin service on a blockchain. US20050160034A1 teaches a convertible debt component structured for issuance to at least one investor by an issuer. US20190156301A1 teaches a cryptocurrency exchange.

None of these disclosures, or any other prior art, teaches authenticated access to a decentralized venture capital platform that democratizes access to venture capital funding and democratizes access to limited partner opportunities in venture capital funds.

Accordingly, there is a need for authenticated access to a decentralized venture capital platform that reduces risk for limited partners, reduces the amount of money required to become a limited partner in a venture capital fund, reduces the return on investment expectations for venture capital funds, makes limited partnership opportunities more inclusive and makes venture capital investment decisions more inclusive which, in turn, makes venture capital more inclusive.

The applicant is not aware of any other commercially viable system that addresses the shortcomings of the prior art and also includes the features stated above. It is therefore an object of the present invention to set forth a system that offers entrepreneurs more inclusive access to venture capital funds, offers the community more inclusive access to limited partner opportunities in venture capital funds and makes investment decisions more inclusive for venture capital funds.

The confluence of technological advancements, such as blockchain technology, decentralized autonomous organizations and stable coins have realized the capabilities to meet this need.

It is an object of the present invention to reduce return on investment expectations for venture capital limited partners to commercial lending rates. It is another object of the present invention to obtain an asset, such as gold, at commercial lending rates. It is a further object of the present invention to use this asset to back a stable coin that can be priced at $1 per coin for example. It is yet another object of the present invention to invest the stable coin into entrepreneurial companies in return for shares in said entrepreneurial companies. Said entrepreneurial companies can use the stable coins to pay for goods and services to meet their operational needs or exchange the stable coins for cash to pay for goods and services. As the value of said entrepreneurial companies increase, the shares of the venture capital company will increase. It is another object of the present invention to allow anyone who owns these stable coins to exchange their stable coins for shares in the venture capital fund. As the price of a share in the venture capital fund exceeds the price of a stable coin, any logical owner of said stable coin would exchange each said stable coin for a share in the venture capital fund. It is yet another option of the present invention to execute a call option to exchange each said stable coin for a share in the venture capital fund. After all of the stable coins are returned to the venture capital fund, in return for shares in said venture capital fund, the venture capital company can return the asset that underwrites the stable coin, such as gold, to its lender.

Consequently, the present invention uses the stable coin as convertible debt to launch a venture capital fund. This debt is priced at commercial lending rates rather than typical limited partner return on investment rates. The venture capital fund invests the stable coin into companies in return for shares in those companies. As the value of these portfolio companies increase the value of the shares in the venture capital fund will increase. When the price of a share in the venture capital fund exceeds the price of the stable coin, each stable coin is converted into one share in the venture capital fund. This enables the venture capital fund to return the asset that underwrites the stable coin to the original lender. At that time, the venture capital fund will no longer have the financial liability to service the commercial interest rate or fees for that asset. In this business model, the stable coins replace traditional limited partners at commercial lending rates instead of much higher returns expected by traditional limited partners. Eventually, regular people who own these stable coins can convert them into shares in a venture capital fund, which they typically cannot access. A regular citizen can buy a stable coin for $1 and become a limited partner in a venture capital fund. In this case, these limited partners are actually shareholders in the venture capital fund.

In addition, this proposed solution is a decentralized autonomous organization which minimizes centralized decision-making for investment decisions that is prone to human bias in typical centralized venture capital funds These features and other objects of the present invention will be apparent to those skilled in the art from the following detailed description of the present invention, the accompanying drawings and the appended claims.

BRIEF SUMMARY OF THE PRESENT INVENTION

The present invention provides a computer implemented method for managing a decentralized venture capital ("VC") fund in a decentralized autonomous organization ("DAO") configured to use a secure communication environment, said method comprising: receiving, in the secure communication environment, a plurality of information about a collateral that underwrites a first number of stable coins where the stable coins are funding for said decentralized venture capital fund; receiving, in the secure communication environment, a request for an investment from a company; receiving, in the secure communication environment, from a plurality of shareholders of said decentralized venture capital fund, a first plurality of votes based on said request; approving said request automatically, in the secure communication environment, when a first number of approval votes exceeds a predetermined investment threshold; transferring, in the secure communication environment, to said company, a second number of stable coins from said first number of stable coins as the investment; transferring, in the secure communication environment, at least one stable coin, from said second number of stable coins, to a seller as payment for at least one of a good and service; and converting, in the secure communication environment, said at least one stable coin into at least one share option in said decentralized venture capital fund.

In a preferred embodiment, the DAO receives a secure authorization from any eligible user as an access request. The DAO encrypts this secure authorization then decomposes it into a plurality of linked subcomponents. The DAO makes a plurality of copies of the linked subcomponents. For each copy, each subcomponent is written to a different member computer selected randomly from a plurality of member computers. For each copy, the present invention selects the first member computer randomly from the plurality of member computers. The first member computer, which stores the first subcomponent, selects the second member computer randomly, which stores the second subcomponent. Each member computer selects the successive member computer that stores the successive subcomponent. Periodically, the present invention uses this same process to create a new copy of the subcomponents then delete the oldest copy. This enables the subcomponents of each copy of the encrypted secure authorization to move randomly and dynamically among the plurality of member computers.

When a user wants to access their secure authorization information, for example to log into the DAO, that user makes a request that initiates the reconstruction and decryption process. The DAO knows the first computer, in each block of computers, that stores the first subcomponent of the newest copy of the decomposed, encrypted secure authorization. The user has access to an authorization identifier, which the DAO uses as a filename for each subcomponent on each computer. The DAO uses the authorization identifier to recover the first subcomponent from that first computer. That first computer knows the second computer which enables the DAO to use the same authorization identifier (e.g., filename) to recover the second subcomponent from that second computer. The present invention repeats this process to retrieve the remaining subcomponents. The present invention then combines the subcomponents into the encrypted version of the secure authorization then decrypts the secure authorization. This enables the DAO to receive the secure authorization then grant the user access to the present invention. The present invention enables a user to initiate the encryption process and decryption process using a plurality of multifactor authentication methods including one or more biometric signatures.

In a preferred embodiment, the present invention provides a method and apparatus for authenticated access to a distributed autonomous organization ("DAO") that receives collateral at commercial lending rates, creates a stable coin based on said collateral, invests the stable coin into companies in return for shares, allows said companies to exchange the stable coins for goods and services and enables the holders of said stable coins to exchange each stable coin for shares in a venture capital fund.

The present invention receives from a venture capital fund information about an asset, such as gold, that the venture capital fund uses as collateral for a stable coin. The present invention then receives information about the venture capital fund investing some of these stable coins into entrepreneurial companies in return for shares in said entrepreneurial companies. Said entrepreneurial companies can use the stable coins to pay for goods and services to meet their operational needs or exchange the stable coins for cash to pay for goods and services. As the value of said entrepreneurial companies increase, the value of the venture capital company will increase. This will increase the share price of the venture capital company. The present invention then enables anyone who owns these stable coins to exchange one stable coin for one share in the venture capital fund. As the price of a share in the venture capital fund exceeds the price of the stable coin any logical owner will exchange each of their stable coins for one share in the venture capital fund. The present invention also enables the venture capital fund to execute a call option to exchange each said stable coin for a share in the venture capital fund. After all of the stable coins are returned to the venture capital fund, in return for shares in said venture capital fund, the venture capital company can return the asset that underwrites the stable coin, such as gold, to its lender.

In addition, the present invention is organized as a decentralized autonomous organization. This minimizes centralized decision-making for investment decisions that is prone to human bias in typical centralized venture capital funds.

The present invention enables a second user to submit a change request for the DAO, for example to resolve a dispute between the users and a service provider or a dispute among users. This arbitration request may require a change to an agreement, such as the loan contract for the collateral or the investment contract with the startup company. The present invention receives an adjudication from an arbitrator that includes a recommended arbitration amendment. The present invention enables the plurality of eligible voter users to approve, or reject, the recommended arbitration amendment. If the percentage of approval votes exceed a predetermined threshold then the present invention will automatically approve the recommended arbitration amendment which updates the relevant agreement.

The present invention enables a second user to submit a service request for the DAO, for example to maintain technical components of the DAO. The present invention then receives a request for proposal (RFP) from a reviewer user. The present invention then receives a bid on the RFP from at least one supplier user. The present invention then receives, from the reviewer user, a recommendation based on the bids. The present invention enables the plurality of eligible voter users to approve, or reject, the recommended service request. If the percentage of approval votes exceed a predetermined threshold then the present invention will automatically approve the recommended service request.

A decentralized autonomous organization ("DAO") is an organization represented by rules encoded as a computer program that is transparent, controlled by shareholders, or users, and not influenced by a central governance entity.

A SmartContract is a computer program or a transaction protocol which is intended to automatically execute, control or document legally relevant events and actions according to the terms of a contract or an agreement.

Warm storage is defined as a decentralized storage system that enables a user to control their confidential information independent of a third-party target system. For example, a user can store and control confidential information, such as a password or a blockchain address, in the decentralized storage system rather than relying on a centralized third-party system to store and control said user's confidential information. The user retains access control over the confidential information that is stored online in a decentralized database.

An encrypted decomposed dynamic decentralized distributed database (e.g., warm storage distributed database) is defined as a database that is distributed across a plurality of independent vetted member computers, so has no centralized control, wherein stored confidential information is encrypted then decomposed into a block of linked subcomponents that are randomly located among the plurality of independent vetted member computers, wherein periodically a new copy of said block is created and an oldest copy of said block is deleted to continuously relocate said confidential information dynamically and randomly among the plurality of independent vetted member computers.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 illustrates a first embodiment of an overview of the present invention.

FIG. 2 illustrates a first embodiment of the system architecture of the present invention.

FIG. 6 illustrates a first embodiment of the data storage system ("DSS") for the present invention.

FIG. 7 illustrates a first embodiment of the business intelligence system ("BIS") of the present invention.

DETAILED DESCRIPTION OF THE INVENTION

Figure 1A:
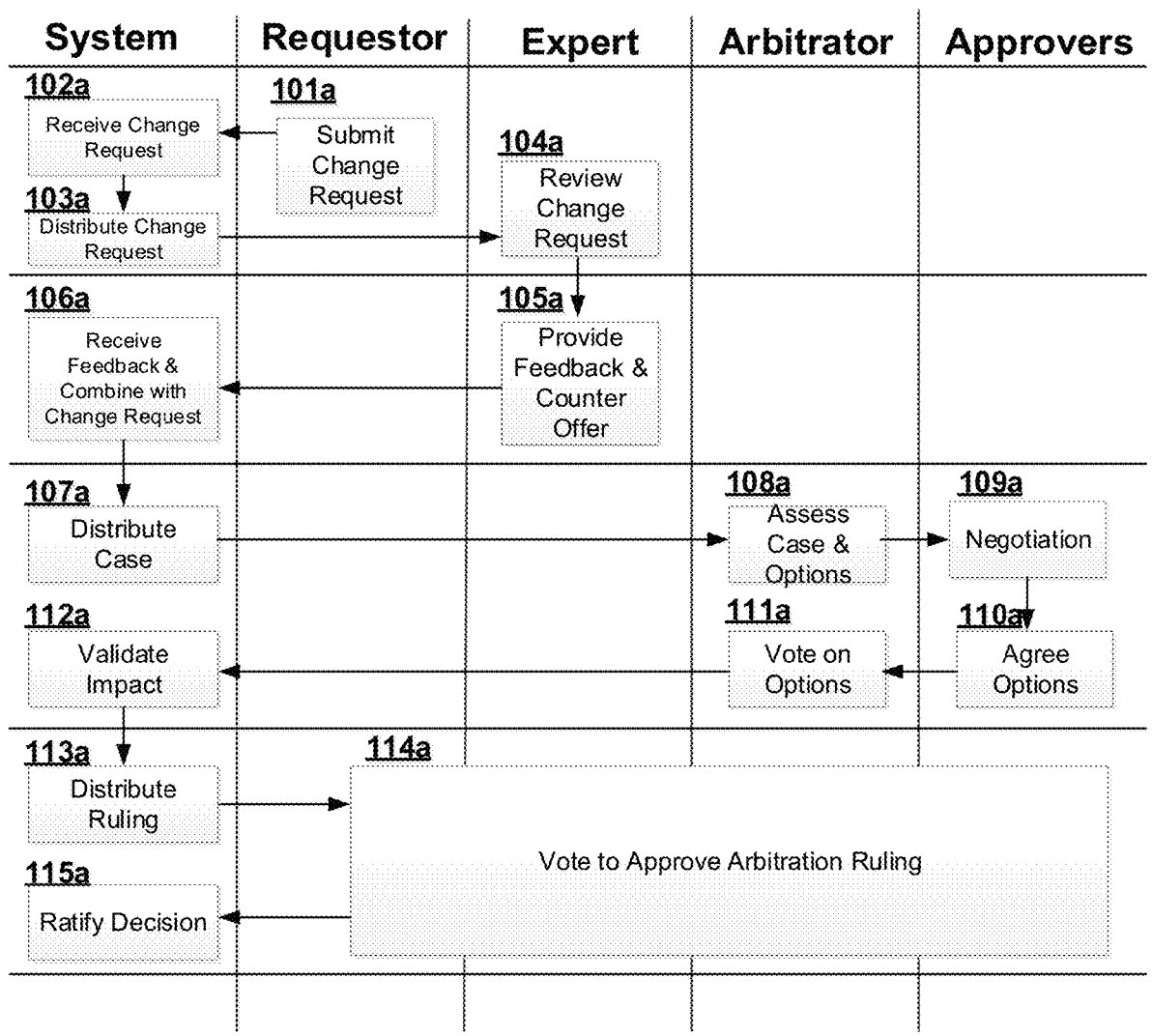
FIG. 1a illustrates a first embodiment of an arbitrator method for the present invention.

The detailed description set forth below is intended as a description of various configurations of the present invention and is not intended to represent the only configurations in which the present invention may be practiced. The appended drawings are incorporated herein and constitute a part of the detailed description. The detailed description includes specific details for the purpose of providing a thorough understanding of the present invention. However, it will be apparent to those skilled in the art that the present invention may be practiced without these specific details. Like or similar components are labeled with identical element numbers for ease of understanding.

System Overview

In an overview of a first embodiment of the present invention illustrated in FIG. 1, the present invention provides a method and apparatus for a first decentralized autonomous organization for a venture capital fund. Each first decentralized autonomous organization comprises a node in a parent decentralized autonomous organization.

The present invention comprises a system whose lifecycle includes system setup, collateral, stable coin, investment consensus rules, exchange, conversion, return collateral, and close. The main actors in this process are the system and the users. Each user can assume different roles. For example, a user can lend collateral to the venture capital fund, a user can be a company who is seeking investment from the venture capital fund and a user can be a shareholder in the venture capital fund or a holder of a stable coin that can be converted into shares in the venture capital fund.

The present invention is comprised of a system described in FIG. 1. The system enables a user to request access 101 to the system. The system authenticates that new user 102. The system offers many techniques to authenticate a user, such as user validation on an independent system, for example by sending a message to the user's email address or phone. The system also enables authorization information to be stored in and retrieved from an encrypted decomposed dynamic decentralized distributed database as described below.

Users can use cold storage solutions to store their confidential information, including confidential user and payment information for authentication and authorization. This includes users writing their authentication information, such as passwords and blockchain address information for their cryptocurrency accounts, on a sheet of paper which is offline. This prevents online hacking but creates other user risks, such as the risk of physical loss by the user and physical theft from the user. Alternatively, users can use hot storage solutions where the operator of the centralized application knows and controls the user's authentication information, such as passwords and blockchain address information. This eliminates user risk due to physical loss by the user and physical theft from the user, but hot storage solutions increase the system risk of online hacking due to careless or corrupt behavior of the employees of the centralized system operator. Conversely, the encrypted decomposed dynamic decentralized distributed database described herein offers a warm storage solution for a user's confidential information. This gives each user sole control of the storage and retrieval of their confidential information. It offers the user the control benefits of cold storage and the online access benefits of hot storage. However, it does not have the user risk of careless or unfortunate loss associated with cold storage and does not have the hacking risk associated with careless and corrupt behavior of employees that plagues hot storage solutions offered by centralized applications. This warm storage solution is comprised of encrypting the user's authentication information then decomposing it into linked subcomponents that are distributed randomly across a plurality of member computers. These linked subcomponents are also moved dynamically among the network of member computers. Storage and retrieval of this encrypted and decomposed authentication information can be invoked via user biometrics. This minimizes the risk of online hacking while enabling users to retain control of their authentication information. This warm storage solution is described in more detail below.

After the system authenticates a user, the system allows that user to setup their account 103. This includes setting up or changing a password, specifying challenge questions and answers and completing a user profile. After completing the setup process, if the user chooses cold storage and loses his or her password, then the system will ask one or more of the challenge questions to enable the user to regain access or recover the password, so long as the user enters the correct answers to the challenge questions. To reduce spam and prevent automated hacking techniques, the system supports captchas to distinguish between human and machine input. The system also enables the user to setup multiple biometric signatures to facilitate user log in. The system supports a number of biometric options including finger print (capacitive and ultrasonic), palm veins, palm print, hand geometry, iris scan, retina scans, facial recognition, and voice recognition. Users can choose from a plurality of access methods, including traditional user name and password access or warm storage of user access credentials. The user can edit his or her user profile information during subsequent logins.

After the user has been setup on the system, the system allows the user to login at will 104. The system supports multi factor authentication. For example, to access selected features available on the system, the system may force the user to implement single factor authentication, such as entering a user name and password directly or via warm storage. To access higher security features available on the system, the system may force the user to implement two-factor authentication such as entering a password and receiving then confirming a message on a separate device, such as a smartphone. To access even higher security features available on the system, the system may force the user to implement three-factor authentication such as entering a password, receiving then confirming a one-time passcode on a phone and submitting a biometric signature, such as finger print recognition.

After the user logs in, the system authenticates that user then determines the features that the user is authorized to access 105. After authenticating and authorizing a user, the system then qualifies a user 106. This qualification step comprises applying business rules to determine the features and functionality available to that user.

Any user can submit collateral 107 for use by the present invention. The system administrator validates and approves the collateral for use in accordance with the agreed terms and conditions, such as 5% annualized interest for three years without a prepayment penalty but with an option to extend the term 108. The system also applies a number of automated rules including, checking that the lender user has completed the loan proposal correctly, the lender user is authorized to provide collateral, and the loan collateral is required. The system uses a validation smart contract to automate this validation step.

If the system is able to validate the collateral proposal, then the system administrator enters a confirmation when the collateral is in custody 109. The system then creates the stable coins backed by the collateral 110.

The present invention notifies interested companies 111 that funding is available for investment. The system enables the entrepreneurs who run these companies to submit an investment request 112 then forwards the request to shareholders 113, which includes anyone who has already converted stable coins into shares. Shareholders can review the investment request and vote on whether the company should receive funding from the venture capital fund 114. Only shareholders can vote not holders of stable coins who do not yet own any shares in the venture capital fund.

The system applies the predetermined consensus rules to determine whether to grant the investment request 115. For example, does the venture capital fund have enough stable coins to meet the investment request, have a sufficient number of shareholders voted and did a high enough percentage of voters approve the investment request. These are sample consensus rules. The present invention enables each venture capital fund to configure its own set of consensus rules.

If all of the required conditions are met after applying the consensus rules, the present invention validates the investment decision 116 then transfers the agreed number of stable coins to the company 117 as an investment in that company. The present invention then receives shares in that company 118. The company can use the stable coins to buy goods and services or can exchange the stable coins for cash on an exchange 119. The present invention transfers the stable coins to the seller of the goods and services or the buyer of the stable coins on the exchange. The future shareholder receives the stable coins 120. The present invention enables the future shareholder to exchange stable coins for shares in the venture capital fund 121. The present invention receives the stable coins and, in return, issues shares in the venture capital fund to the stable coin holder 122.

After the present invention receives all of the stable coins, the system administrator returns the collateral to the lender 123. The lender receives the collateral 124 and the present invention stops paying interest for the collateral. The present invention enables the venture capital fund to launch its program based on commercial debt rather than investments from much higher cost typical limited partners.

In another embodiment of the present invention illustrated in FIG. 1a, an arbitration process is implemented. A requester user can submit a change request 101a. For example, a lender may want to change the terms of the collateral agreement or an entrepreneur may want to change the terms of their investment agreement. The system receives the change request 102a. The system sends this change request to the expert users assigned by the system 103a. These expert users are shareholders who applied to be assigned the status of expert user and that application was approved by a sufficient percentage of shareholders. The approved expert users review the change request 104a then provide feedback that can include a counter-offer that they will support 105a. The system receives the feedback and combines it with the change request 106a. The system distributes this information as a case to the predetermined arbitrator users 107a. These arbitrator users are regular shareholders who applied to be assigned the status of arbitrator user and that application was approved by a sufficient percentage of shareholders. The arbitrator users assess the case to determine viable options 108a. The role of the arbitrator users is to present the options to the impacted users and recommend a solution. The lead arbitrator user negotiates the options with the impacted users 109a then agrees acceptable options 110a. The arbitrator users then vote on the options and submit the agreed option 111a and final recommendation. This final recommendation is the arbitration ruling. The system validates the impact of the arbitration ruling 112a in order to ensure the resultant changes comply with all relevant predetermined rules. This includes validating that there are sufficient stable coins available to cover any change to the terms 112a. The system then distributes the ruling to all eligible shareholders for a vote 113a. The eligible shareholders vote to approve or reject the arbitration ruling 114a. The system checks the number of votes against the predetermined approval threshold and validates the decision 115a. The system ratifies the arbitration ruling by validating the voters and the number of votes. The system then implements the decision by doing nothing if the change request was rejected or by making the changes to the terms and conditions of the collateral agreement or the investment agreement if the change request was approved. The system also notifies the users of the actions taken. When each user registers to use the system, they agree to be bound by arbitration rulings or they are not granted access to the system.

Figure 1B:
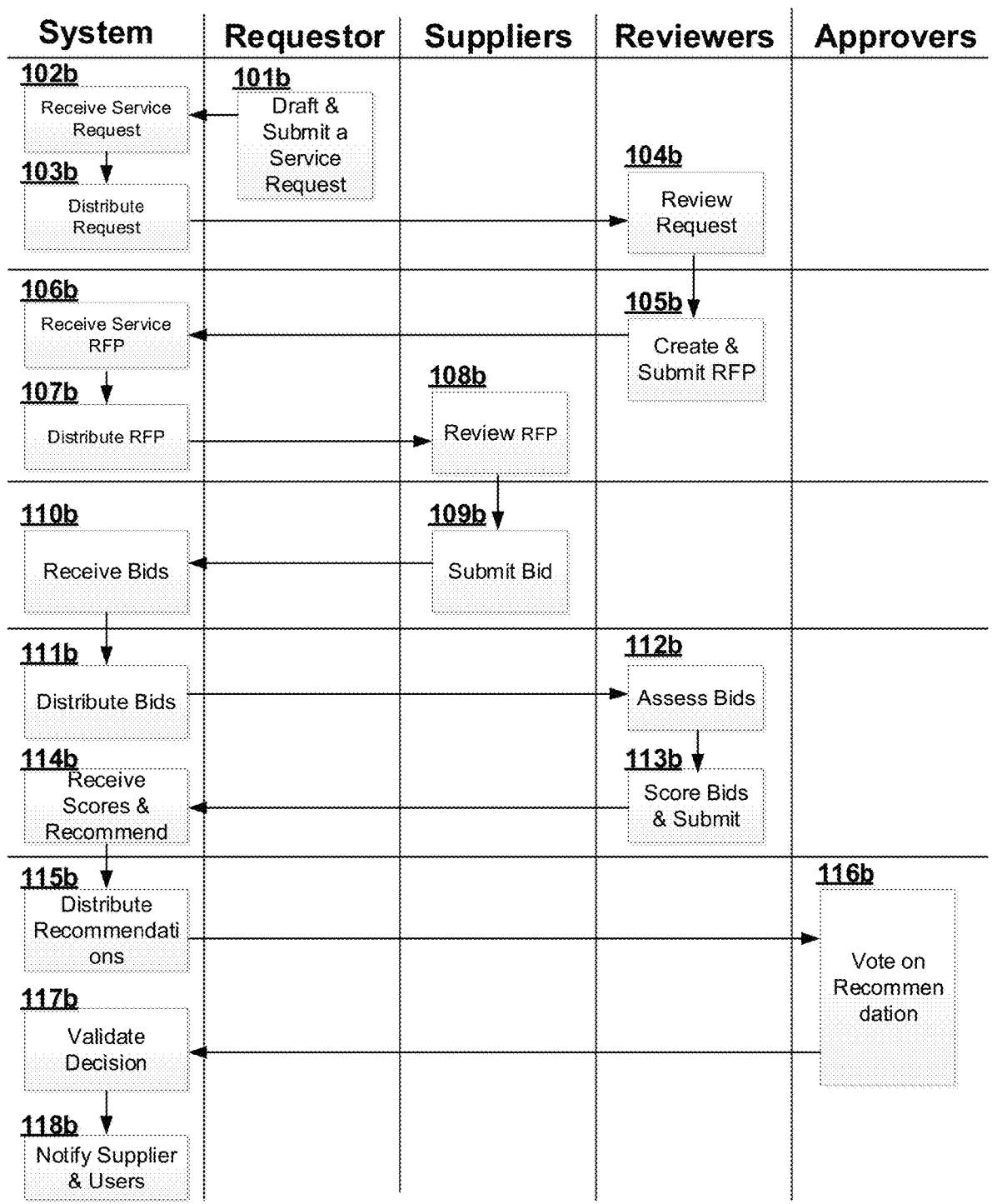
FIG. 1b illustrates a first embodiment of a service request method for the present invention.

In another embodiment of the present invention illustrated in FIG. 1b, a process is implemented to service the system. A requestor user can draft and submit a service request 101b. The requestor user can be any authorized user who has identified a need for the system to be serviced. For example, a requestor user may see a need for an online voting form to be changed, or for a new option to be added to a list in a form, or for the system response time to be improved. This list is exemplary and should not be considered as exhaustive or limiting in any way. The system receives the service request 102b. The system distributes this service request to a predetermine list of reviewers 103b. These reviewer users are regular users who have sufficient standing in the community of users to be granted this authority. The reviewer users review the service request 104b then they reject the service request or they approve the service request and convert the service request into a service proposal (e.g., request for proposal) 105b. One of the reviewer users submits the service proposal into the system. This service proposal is comprised of a plurality of information, including an overview of the service request, the objective of the work, a list of deliverables, the acceptance criteria for each deliverable, a schedule and a list of standard legal terms and conditions from a template. The reviewer user also submits an estimated budget with the service proposal. The system receives the service proposal 106b and ensures sufficient funding is available in the predetermined budget account to cover the estimated budget. The system then distributes the service proposal to a predetermined list of suppliers 107b. In another embodiment of the present invention, third-party suppliers can apply to be added to the predetermined list of suppliers and the reviewer users can vote to approve or reject their application. The authorized suppliers, who are on the predetermined list of suppliers, review the service proposal 108b. An authorized service supplier can submit a bid to provide the service specified in the service proposal 109b. The system receives the bid 110b. The system then distributes the bid to all eligible reviewer users 111b. The reviewer users then assess the bids 112b and score the bids 113b. Scoring entails assign a score between 1 and 100 to each key component of a bid. This score reflects how well each component proposed by the supplier meets each need specified in the proposal. The reviewer user then submits their scores to the system. The reviewer user includes a summary of the pros and cons of each proposal. The system receives the scores from each eligible reviewer user then determines the average weighted score for each bid 114*b*. The system then distributes the scores and summaries to all eligible users for a vote 115*b*. The eligible users vote to approve or reject each bid based on the recommendations from the reviewer users 116*b*. The system checks the number of votes against the predetermined approval threshold and validates the decision 117*b*. The system validates the decision by validating the voters and the number of votes. The system then implements the decision by doing nothing if the proposal was rejected or by notifying the users and supplier if the service request was approved 118*b*.

System Context

FIG. 2 illustrates the system context of a first embodiment of the apparatus and process for the present invention.

The central control system ("CCS") 201 is operatively coupled to a plurality of other systems and user interfaces. Operative coupling is the preferred procedure to exchange information between systems. In the present invention, the systems are inter-connected via a combination of wide area networks including the public switched telephone network, local area networks, such as an Ethernet network, token ring networks, wireless networks, the internet, the internet of things and at least one blockchain. Most systems, such as modern computers, include a built-in interface to a local network, such as an Ethernet or 802.11b wireless network. The communications protocol used by these networks follow an international standard, such as 802.11b, that enables these systems to exchange data using a pre-determined method. However, local area network connectivity only ensures the integrity of data transfer. It is also necessary to specify the information to transfer, its source location and its intended location in the destination system. Each system has its key information stored in pre-determined locations in its database. When the installation engineers configure the interface between two systems, they specify the pre-determined location of the required information in the source system's database and the pre-determined location for that information in the destination system's database. The engineers also specify the pre-determined frequency of information transfer (e.g., continuous, every day at 10:00 PM PT), the pre-determined format to use (e.g., synchronous, flat file Extract Transform Load "ETL") and the pre-determined error checking protocol to use. The combination of network connectivity and the configuration of the communication method by installation engineers enable systems to be operatively coupled to the CCS.

The CCS 201 is operatively coupled to the user interfaces. The different types of users access the CCS through a plurality of user interfaces. The user interfaces include the system administrator interface 203, the collateral user interface 204, the company user interface 205, the shareholder interface 206, the requestor interface 207, the expert interface 208, and the arbitrator user interface 209, collectively "the user interfaces". The user interfaces are the input and output gateways for communications with the CCS 201. Note that this layout for user interfaces illustrates the key roles. The present invention enables a single user to play many roles from a common terminal.

The administration system 210 is operatively coupled to the CCS 201. The administration system enables an administrator user to administer the CCS. For example, the system administrator can use the administration system to update the look, feel and content of the web and mobile interfaces. The administration function also provides customer service features that handle customer enquiries, support community discussions and also enable technical support and maintenance functions for the present invention.

The encryption system 211 is operatively coupled to the CCS 201. The encryption system enables a symmetric encryption key, public encryption key and private encryption key to be generated for each user or transaction. It also provides an algorithm that is used to encrypt and decrypt information. It supports a multitude of encryption techniques including symmetric encryption that uses the same key to encrypt and decrypt information as well as asymmetric encryption that uses a public encryption key to encrypt information and a matching private encryption key to decrypt the same information.

The authentication system 212 is operatively coupled to the CCS 201. The authentication system encrypts authentication information, decomposes it into subcomponents, distributes those subcomponents dynamically across randomly selected member computers and uses biometrics to secure and recover the authentication information. This includes securing authentication information for users, systems, payments, transactions and devices, such as IoT devices.

The network interface 213 is operatively coupled to the CCS 201. The networks available to the CCS through the network interface include, the internet, the internet of things (IoT) and at least one blockchain in addition to standard computer networks that include local area networks, WIFI networks, wide area networks, ethernet networks, token ring networks, wireless networks, cable networks, broadband networks, satellite networks and the public switched telephone network.

The Internet of Things platform 214 is operatively coupled to the CCS 201. It is comprised of a number of sensors that capture data from their surroundings, such as equipment, and IoT actuators that control their surroundings, such as control devices for autonomous equipment. The internet of things platform processes this data into useful information then analyzes and transforms it into knowledge that supports decision making. The objective is to deliver the right data, at the right time, to the right people to drive the right business outcomes. The Internet of Things platform is detailed below.

The learning management system 215 manages courses that are available to users. It is operatively coupled to the CCS 201. The learning management system administers, documents, tracks, reports, and delivers educational courses, training programs, learning programs and development programs. The learning management system delivers and manages a variety of content, including video, courses, virtual reality and documents. In one embodiment of the present invention, all of the courses are self-directed and all of the tests are multiple choice. This automates teaching and test scoring, which eliminates the need for human supervision or human intervention. The present invention uses a specific learning management system. However, a number of commercial off-the-shelf learning management systems are available that can meet the needs of the present invention including LearnUpon, Docebo and MindFlash LMS. These systems all include mobile learning, social learning, gamification, and video conferencing.

The collateral store 216 is operatively coupled to the CCS 201. The collateral store tracks collateral that is available to venture capital funds and collateral that is being used by venture capital funds.

The smart contract system 217 is operatively coupled to the CCS 201. The smart contract system manages the smart contracts used by the present invention. Smart contracts are computer programs designed to automate the execution of the terms of a machine-readable contract or agreement. Each smart contract is implemented as a machine executable program which comprises rules that can process inputs in order to produce results, which can then cause actions to be performed dependent upon those results. In a first embodiment of the present invention, the smart contracts receive input conditions, such as investment terms and account information, then the smart contract initiates the payment transfer from the source account to the destination account in accordance with the predetermined terms and conditions. US20180005186A1 teaches a smart contract management system that can be used by the present invention. US20180089758A1 teaches an example smart contract.

The payment processor system 218 is operatively coupled to the CCS. The payment processor system enables payments to be transferred from a first user to a second user. A number of service providers offer payment processor systems that meet the needs of the present invention, such as Paypal, Google, WePay and Stripe.

The token system 219 is operatively coupled to the CCS 201. It enables crypto currency tokens, or stable coins, to be created, transferred and stored on a blockchain. A token, or stable coin, is a cryptographic string of numbers and letters that is stored on a distributed ledger, or blockchain, as a transaction. A first user creates a message, such as transfer 10 of my cryptocurrency tokens, or stable coins, to another user whose address is 0x7e5f4552091a69125d5dfcb7b8c2659029395bef (for example). The first user then signs (e.g., encrypts) that message using their private key. The first user then submits the encrypted message to the blockchain. A second user can access that message then use the first user's public key to decrypt the message. The encrypted message can describe a crypto currency token and its transactions. In one embodiment, the present invention uses its own stable coin, instead of cash, for investments. Users can exchange these tokens, or stable coins, on a token exchange. Also, a token is not a physical object or even a digital representation of a physical object. Rather, it is a string characters that represent a transaction that creates, transfers or destroys virtual tokens. The following contract is exemplary and is not intended to represent the only script that the present invention can use to mint a token (or stable coin). It will be apparent to those skilled in the art that the present invention may be practiced without this specific contract.

```
pragma solidity ^0.5.0;
contract Coin {
    //The keyword "public" makes those variables
    //easily readable from outside.
    address public minter;
    mapping (address=>uint) public balances;
    //Events allow light clients to react to
    //changes efficiently.
    event Sent(address from, address to, uint amount);
    //This is the constructor whose code is
    //run only when the contract is created.
    constructor( ) public {
        minter=msg.sender;
    }
    function mint(address receiver, uint amount) public {
        require(msg.sender==minter);
        require(amount <1e60);
        balances[receiver]+=amount;
    }
    function send(address receiver, uint amount) public {
        require(amount <=balances[msg.sender], "Insufficient balance.");
        balances[msg.sender]-=amount;
        balances[receiver]+=amount;
        emit Sent(msg.sender, receiver, amount);
    }
}
```

The token exchange, or crypto currency exchange, 220 is operatively coupled to the CCS 201. According to Wikipedia a cryptocurrency exchange or a digital currency exchange (DCE) is a business that allows customers to trade cryptocurrencies or digital currencies for other assets, such as conventional fiat money or other digital currencies. A cryptocurrency exchange can be a market maker that typically takes the bid-ask spreads as a transaction commission or, as a matching platform, simply charges fees. A crypto currency exchange is taught by US 2015/0170112 A1. The present invention uses the crypto currency exchange to sell, buy, and exchange its stable coins. The present invention can use a plurality of third-party exchanges for its transactions, including LA Token, Bittrex and Binance.

The data storage system 221 is operatively coupled to the CCS 201. The data storage system stores the plurality of data used by the present invention.

The business intelligence system 222 is operatively coupled to the CCS 201. The business intelligence system calculates and stores a plurality of information about trends, patterns and relationships in the databases used by the present invention.

The artificial intelligence ("AI") system 223 is operatively coupled to the CCS 201. AI systems are machines that appear to have human intelligence. They ingest volumes of data, adapt to their environment, react to changing conditions, search through possible scenarios handle multiple people and systems concurrently and can even act on their own recommendations. A first embodiment of the present invention uses a commercial off the shelf artificial intelligence system. It leverages standard AI methodologies including time series prediction and reinforcement learning systems to guide user demand for stable coins. The time series prediction model estimates demand over time. It leverages long short-term memory (lstm)/recurrent neural network (rnn) models with sliding windows and traditional logistic regression techniques with a few adaptations. These models receive a plurality of inputs, including external data, such as the local exchange rate, which has a significant correlationship with demand for stable coins in certain regions. The reinforcement learning system has simulation models that make predictions, or classifications, then acts on those predictions autonomously without human intervention. Whenever the price of a stable coin falls toward the minimum target or increases toward a maximum target for any given location, the CCS provides feedback to the model to help it improve its predictive capabilities for stable coins. Although a commercial off the shelf system is used, a number of artificial intelligence systems are available that can meet the needs of the present invention, such as the one taught in U.S. Pat. No. 4,670,848A.

The workflow and document management system 224 is operatively coupled to the CCS 201. The workflow and document management system enables users to create and evolve workflows that guide users through the best practice to complete an activity. A number of commercial workflow management systems are available that can meet the needs of the present invention, including ProcessMaker and Integrify.

The notification management system 225 is operatively coupled to the CCS 201. The CCS sends an alert to the notification management system whenever an event occurs that requires the attention of a user or other entity. For example, after a collateral loan is approved the CCS will instruct the notification management system to alert the lender user by sending an email, text message or alternative notification. The present invention uses a specific notification management system. However, Google and web hosts such as GoDaddy and Host Gator provide tools that support alerts that can be used by the present invention.

The messaging system 226 is operatively coupled to the CCS 201. The messaging system enables users to exchange communication messages in real time. For example, a first user can send a question to a second user and that second user can respond immediately. In addition, multiple stakeholders can participate in a group conversation using real time messaging where they can exchange communications in multiple formats including text and files. The present invention uses a specific messaging system. However, Google and web hosts such as GoDaddy and Host Gator provide messaging system that can be used by the present invention.

The forum system 227 is operatively coupled to the CCS 201. The forum system enables users to create a bulletin board where multiple users can exchange communication messages about a topic specified by the user who created and manages the forum. For example, a lender may be facing an issue related to their collateral. That lender can create a forum to explain the issue. Other stakeholders with the relevant expertise can respond with information to help resolve the issue. Forums allow users to exchange information in multiple formats including text and files. The present invention uses a specific forum system. However, web hosts such as GoDaddy and Host Gator provide forum solutions that can be used by the present invention. For example, GoDaddy's Website Builder solution supports forums. Other forum software solutions that can be used by the present invention include MyBB, pphbb and punbb.

The marketing system 228 is operatively coupled to the CCS 201. Marketing software is generally categorized into three groups: advanced workflow automation, marketing intelligence, and marketing automation. It allows the management of marketing campaigns, optimization of resources, and has features for data collection, analytics, team collaboration, branding, phone call tracking, social media marketing, content distribution, SEO, lead scoring and nurturing, and email marketing. The present invention's marketing system enables users to market their offerings to other users. For example, supplier users can market their offerings to reviewers. In a first embodiment of the present invention, a commercial off the shelf marketing system is operatively coupled to the CCS. However, a number of commercial off the shelf marketing systems can be used with the present invention including, Salesforce and Hubspot.

The accounting system 229 is operatively coupled to the CCS 201. In general, businesses use accounting systems for financial close, revenue management, fixed assets, order management, billing, inventory management, expense management and management of its other financial activities. Modules include billing and payroll, accounts receivable, accounts payable, budget and forecast, fixed assets, inventory and general ledger. The present invention uses a specific accounting system. For example, a service provider can bid for the contract to complete the accounts for the system. If that service provider is awarded the contract then he or she will be granted access to the accounting system. However, a number of commercial accounting systems are available that can meet the needs of the present invention, including Workday, NetSuite ERP, Quickbooks Enterprise and Microsoft Dynamics GP.

Figure 3:
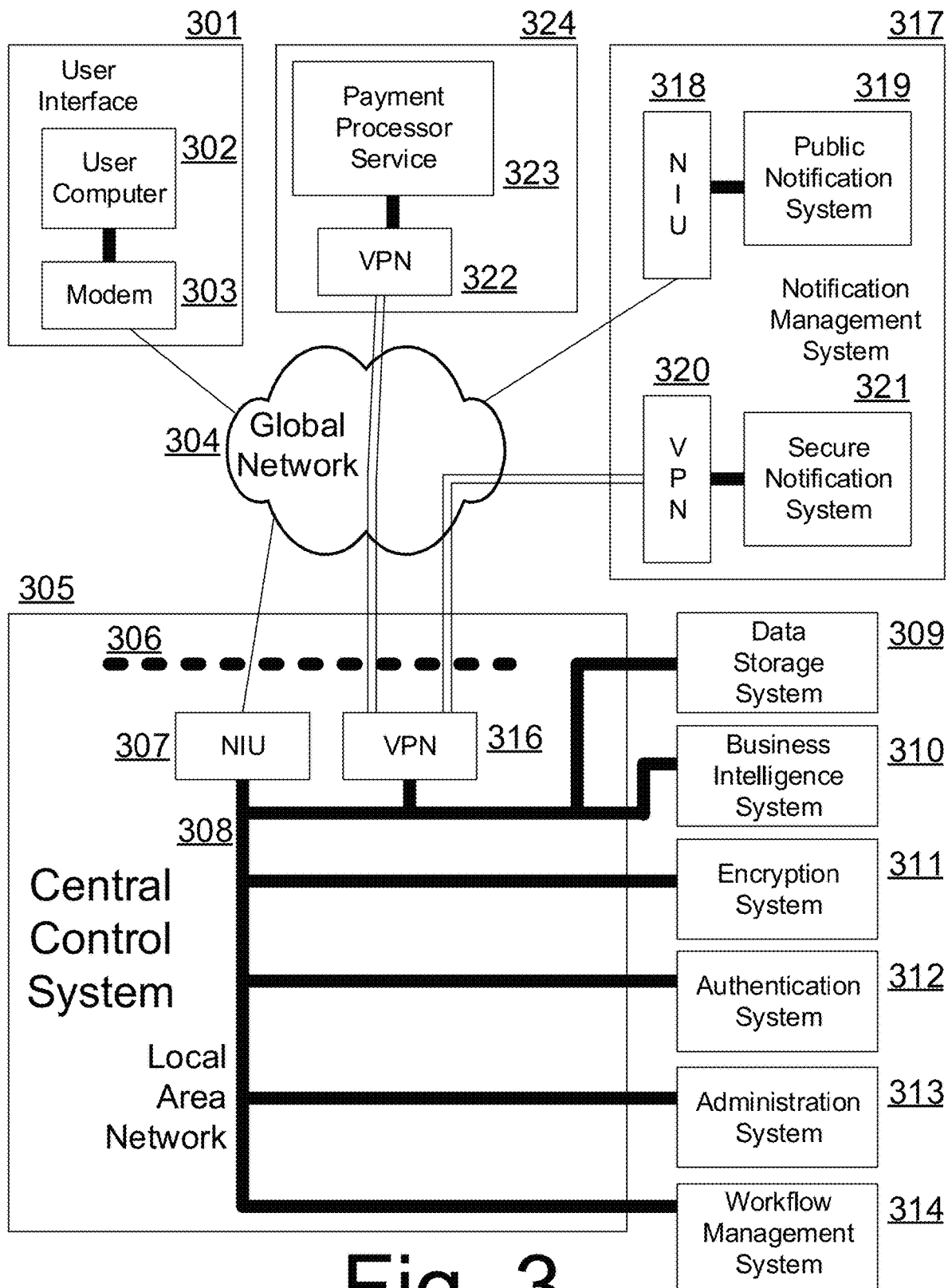
FIG. 3 illustrates a first embodiment of the integration among the central control system and selected components of the present invention.

FIG. 3 illustrates the network connectivity of a first embodiment of the apparatus and method of the present invention.

The user interfaces 301 include a computer 302 and a modem 303. Many companies make mobile and desktop computers that a user can use to access the CCS including Apple, Samsung, Hewlett Packard, and Toshiba. In addition, many companies make modems that can connect to the CCS including 3Com Corp., D-Link Systems, Inc., and US Robotics. The user's computer is connected to the CCS via the modem and a Global Network 304, such as the Internet. The user's modem can be connected to the Global Network using at least one of a plurality of services including public or private networks such as the public switched telephone network, dedicated data line, cable service, cellular service, WiFi service, personal communication system ("PCS"), satellite network, and a microwave connection. These types of connections are provided by a plurality of organizations including local and regional telephone operating companies, cable TV companies and other providers of private and public networks.

The CCS 305 includes a local area network 308 that is connected to the global network 304 via a network interface unit ("NIU") 307 and a firewall 306. The CCS is also connected to other systems via the local area network 308 including the Data Storage System 309, Business Intelligence System 310, Encryption System 311, Authentication System 312, Administration System 313, and the Workflow Management System 314.

The CCS 305 also includes a Virtual Private Network ("VPN") modem 316 that is connected to the Secure Notification System 321 and the Payment Processor System 323. Many companies make VPN modems that can be used with the present invention including Netgear, Linksys and Cisco. The Secure Notification System 321 is connected to the CCS via the Global Network using a Virtual Private Network modem 320. In addition to the Secure Notification System 321, the Notification Management System 317 includes a Public Notification System 319. The Public Notification System 319 is connected to the Global Network using a Network Interface Unit 318. The preferred embodiment of the present invention can use a plurality of Public Notification Systems including email services and mobile services. The present invention can operate with many such email services including Yahoo, Hotmail and Gmail. Many organizations provide such email services including Yahoo, Microsoft and Google. The Payment Processor System 324 includes a Payment Processor Service 323 that is connected to the Global Network via a VPN modem 322. Many organizations provide such Payment Processor Services that can be used with the present invention including Paypal, Western Union, WePay, Stripe and Verisign.

Figure 4:
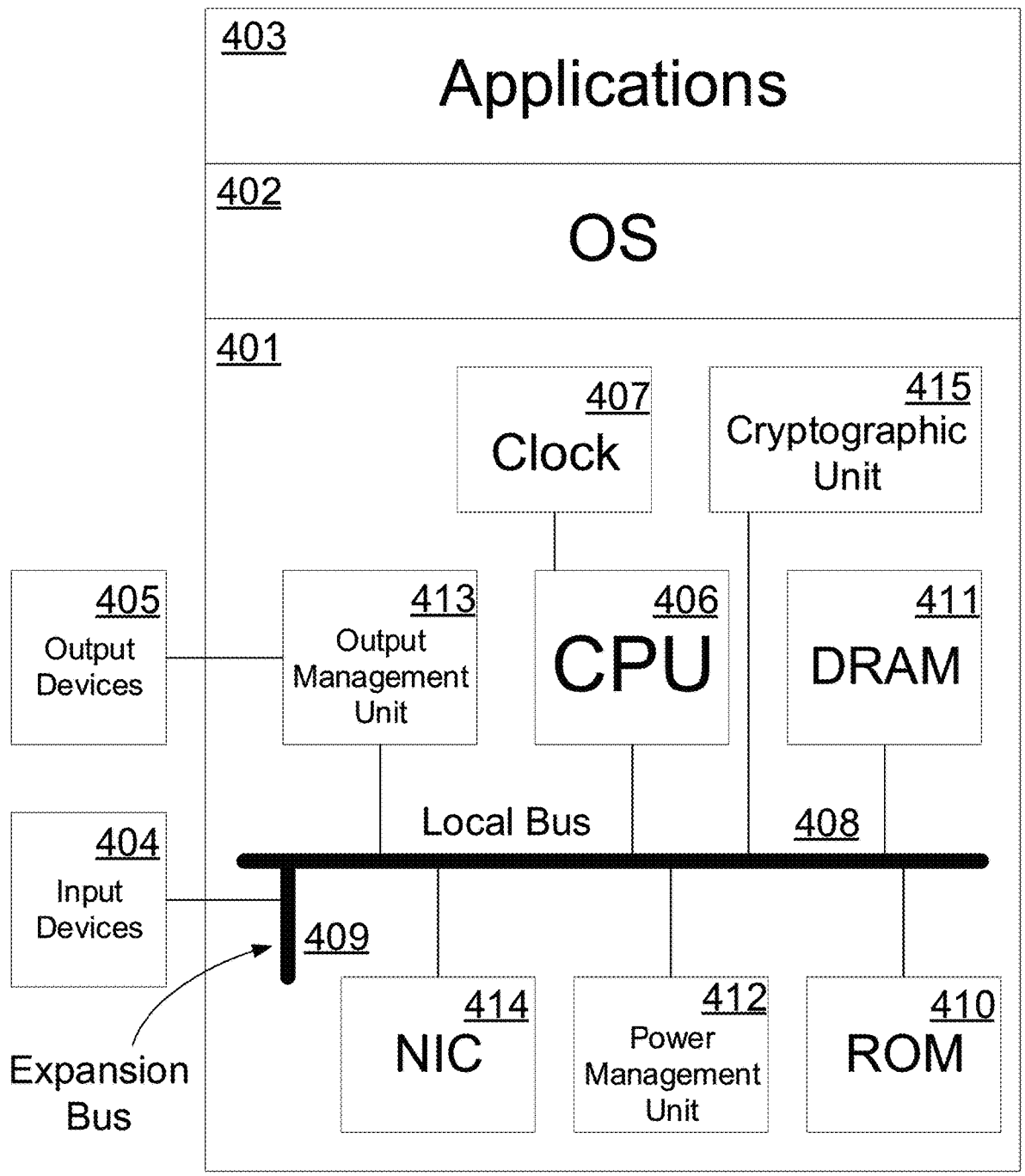
FIG. 4 illustrates a first embodiment of the technical platform for the central control system of the present invention.

FIG. 4 illustrates the key components of the CCS in a first embodiment of the apparatus and method of the present invention.

The Central Control System ("CCS") includes a number of key components including the main hardware 401, the operating system 402, software applications 403, input devices 404 and output devices 405. The operating system 402 is the interface between the applications and the hardware. It controls the execution of computer applications and provides services to those applications. The preferred embodiment of the present invention can use one of a plurality of standard commercial operating systems, such as Microsoft windows, Linux and UNIX. The applications 403 include software tools such as commercial antivirus software available from companies such as McAfee and Norton, and a browser, such as Microsoft Internet Explorer, Chrome and Firefox. The CCS also includes some unique code that implements some of its unique functions described in this disclosure, such as coordinating data interchange among the different systems illustrated in FIG. 2. This unique code is programmed using a combination of programming languages including java, javascript, PHP, HTML, C, C+, and visual basic. Input devices 404 include a plurality of commercial options such as a smartphone, keyboard, a camera, a mouse, and a microphone. Output devices include a plurality of commercial options such as a smartphone, monitor and speakers. These standard commercial input devices 404 and output devices 405 are available from a plurality of vendors such as CompUSA and Office Depot.

The main hardware 401 in the CCS is a combination of at least one conventional smartphone, personal computer and server each with sufficient memory and processing power. To one skilled in the art, it will be evident that the functionality of the CCS can be distributed over multiple inter-connected smartphones, multiple inter-connected personal computers or multiple inter-connected servers. The main hardware includes a number of key components including the central processing unit ("CPU") 406, clock 407, local bus 408, expansion bus 409, read only memory ("ROM") 410, dynamic random access memory ("DRAM") 411, power management unit 412, output management unit 413, network interface card 414 and cryptographic unit 415.

The central processing unit ("CPU") 406 is the component of the CCS that performs most of the data processing. It interprets instructions, performs logical and arithmetic operations on data, and controls input and output functions. The preferred embodiment of the present invention can use a commercial CPU from a plurality of vendors, such as a Pentium G3258 supplied by Intel and the FX-9590 supplied by AMD. The clock 407 regulates the rate at which the CPU processes instructions. The CCS also uses the clock to synchronize the operation of its key components. A CPU such as a Pentium G3258 can operate at a clock speed of 3.2 GHz. The CCS uses the local bus to inter-connect its key components. These key components exchange data via the local bus. The CCS uses the expansion bus 409 to enable expansion cards to exchange data with the CPU and memory. Examples of commercial expansion cards are sound cards and graphics cards. The expansion bus also enables input devices 404, such as a mouse, to input data that can be used by the key components of the CCS. The read only memory ("ROM") 410 includes the instructions that the CPU executes to perform its basic operations. The vendor of the computer platform that comprises the hardware component of the CCS provides the instructions that are stored in the ROM. When the CCS's power is removed then restored, the instructions in the ROM remain unchanged. The dynamic random access memory ("DRAM") 411 includes instructions that the CPU executes to perform selected tasks. The DRAM also stores the data that is used by the instructions executed by the CPU. However, when the CCS's power is removed then restored, the information in the DRAM is lost. The CCS uses the power management unit 412 to supply and regulate the power required to operate the key components of the CCS. The CCS uses the output management unit 413 to interface with output devices, such as a monitor. The CCS uses the network interface card ("NIC") 414 to interface with external networks, including an Ethernet network, public switched telephone network and a wireless network. The CCS uses the cryptographic unit 415 to support secure communications with external systems, such as the payment processor system and secure notification management system. The vendor of the computer platform, which is used by the CCS, provides the local bus, expansion bus, ROM, DRAM, power management unit, output management unit, network interface card, clock, CPU and cryptographic unit. Specific components, including the NIC, can be obtained from alternate commercial vendors including CompUSA and Office Depot.

Figure 5:
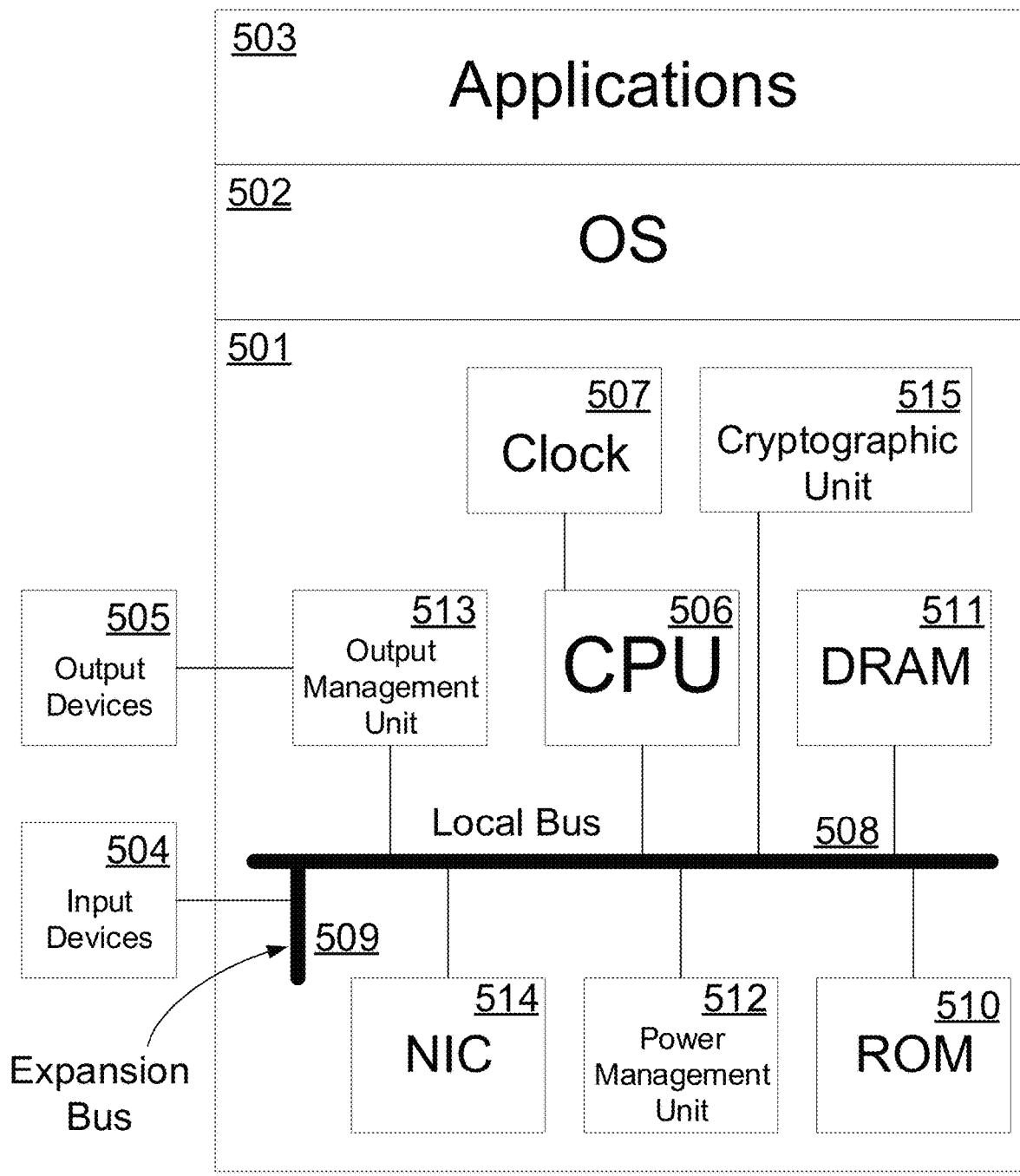
FIG. 5 illustrates a first embodiment of the user interface to the present invention.

FIG. 5 illustrates the key components of the user interface in a first embodiment of the apparatus and method of the present invention.

In a preferred embodiment of the present invention the user interface device 301 is at least one of a smartphone and conventional personal computer that includes, the main hardware 501, the operating system 502, software applications 503, input devices 504 and output devices 505. The main hardware 501 in the user interface device includes a number of key components including the central processing unit ("CPU") 506, clock 507, local bus 508, expansion bus 509, read only memory ("ROM") 510, dynamic random access memory ("DRAM") 511, power management unit 512, output management unit 513, network interface card ("NIC") 514 and cryptographic unit 515. These components are substantially the same as the similarly named components in the CCS as illustrated in FIG. 4. They also perform substantially the same functions and are available from the same vendors. The key differences are that the components in the CCS have higher performance requirements than the equivalent components in the user interface device. In addition, the user interface device includes, commercial software applications such as a word processor application and graphical design application. An example of a word processor application that can be used by the present invention is Microsoft Word. An example of a graphical design application that can be used by the present invention is Microsoft Visio. Examples of higher performance components for the CCS are a faster clock speed, a more powerful CPU and higher capacity DRAM.

FIG. 6 illustrates the key components of the Data Storage System in a first embodiment of the apparatus and method of the present invention.

The data storage system 207 is a conventional hard disk drive that includes non-volatile, magnetic-based hard disk storage that stores digitally encoded data. The data is retained in the data storage system after power is removed then restored. A plurality of suppliers manufacture data storage systems that can be used by the present invention including EMC, Western Digital, Seagate, Maxtor, and Hitachi. The data storage system is comprised of a plurality of databases that are described below. The present invention uses a specific database system. However, one of a plurality of database systems can meet the needs of the present invention including Oracle and SQL database systems. The CCS stores the data in the Data Storage System in an encrypted format.

The CCS uses the CCS database 601 to store information about how users are using of the CCS. The CCS database contains a plurality of fields including a unique reference key for each record in the CCS database, the unique reference key of each user who has logged into the CCS and tracking information about the functions of the CCS used by each user during each login session.

The CCS uses the user database 602 to store information about users. For each user, the user database contains a plurality of fields including a unique reference key for each record in the user database, type of user, the user's name, role, location, contact phone numbers, email address, social media account IDs, notes, qualifications, organization, type of organization, industry, target market, user authentication information and login credentials for the CCS.

The CCS uses the administration database 603 to store information about the website, the mobile website, and the mobile application for the CCS as well as information about the maintenance and support of the CCS. The administration database contains a plurality of fields including a unique reference key for each record in the administration database, the type of information, the actual information, and corresponding meta data.

The CCS uses the encryption database 604 to store information about the symmetric encryption keys, private encryption keys, and public encryption keys. The encryption database contains a plurality of fields including a unique reference key for each record, the unique reference key for each user and information about the encryption keys. This information does not give the CCS access to the actual encryption keys.

The CCS uses the authentication database 605 to store authentication information about users, systems and devices. The authentication database is distributed across a number of member computers. It stores authentication information that has been encrypted and decomposed into subcomponents. Users can use a biometric signature to initiate and reverse this secure authentication process.

The CCS uses the Internet of Things (IoT) database 606 to store information about IoT devices and their connectivity. For each IoT device, the Internet of Things (IoT) database contains a plurality of fields that include a unique reference key for each record in the Internet of Things (IoT) database, the type of device, infrastructure, identification, communications and transport, discovery, data protocols, device management, semantic and multi-layer framework.

The CCS uses the collateral store database 607 to store information about collateral that is used to underwrite stable coins. For each collateral, the collateral store database contains a plurality of fields that include a unique reference key for each record in the collateral store database, the type of collateral, the current status, collateral offer, the prerequisites and requirements, the lender, the terms and conditions, change requests and arbitration rulings.

The CCS uses the learning database 608 to store information about its courses. For each learning option, the learning database contains a plurality of fields that include a unique reference key for each record in the learning database, the type of course, the prerequisites, duration, type of media, templates and type of test.

The CCS uses the service request database 609 to store information about its service requests and service providers. For each service request, the service request database contains a plurality of fields that include a unique reference key for each record in the service request database, the type of service request, the current status, the requestor, reviewers, approvers, the bidding service providers, the selected service providers, the proposal, the recommendation, bids received, votes, final decision and arbitration ruling.

The CCS uses the arbitration database 610 to store information about arbitration cases. For each arbitration case, the arbitration database contains a plurality of fields that include a unique reference key for each record in the arbitration database, the type of arbitration, the current status, the arbitrators, the lenders, the companies receiving investments, the approvers, arbitration options, arbitration recommendation, votes and the arbitration ruling.

The CCS uses the smart contract database 611 to store information about its smart contracts. For each smart contract, the smart contract database contains a plurality of fields that include a unique reference key for each record in the smart contract database, the type of smart contract, the purpose of the smart contract, the input conditions, the procedure, the output conditions, terms and conditions, owner, risks, version control, language, blockchain and script.

The CCS uses the payment processor database 612 to store information about payments between users. The payment processor system has its own database. However, each payment that is submitted to the CCS is stored in the payment processor database. For each payment submitted to the CCS, the payment processor database contains a plurality of fields including a unique reference key for each record, the user's payment credentials, the amount of the payment, the payment method, the type of transaction, the date and time that the payment was submitted, whether the payment was accepted or rejected and the date and time that the payment was confirmed or rejected. Payments may be made using a plurality of methods, including fiat currency, crypto currency, stable coins, digital cash, cash equivalents, credit card, debit card, prepaid card, direct debit, mobile payments, barter, debt, financing, automated buying, ACH, letter of credit, check, money orders and crowd buying.

The CCS uses the token/stable coin database 613 to store information about its tokens and stable coins. For each token or stable coin, the token/sable coin database contains a plurality of fields that include a unique reference key for each record in the token/stable coin database, the type of token/stable coin, the purpose of the token/stable coin, the previous owner, the current owner, terms and conditions, risks, current value, language, version control, blockchain and script.

The CCS uses the artificial intelligence database 614 to store information that supports the artificial intelligence system. For each record, the artificial intelligence database contains a plurality of fields that include a unique reference key for each record in the artificial intelligence database, the lender user reference key, the company user reference key, the arbitrator user reference key, the requestor user reference key, the reviewer user reference key, the service provider user reference key, the approver user reference key, the learning management reference key, the proposal reference key, the bid reference key, the recommendation reference key, a key for the business rules table and the notification reference key.

The CCS uses the workflow management database 615 to store information about different workflows, procedures and best practices. For each workflow, the workflow management database contains a plurality of fields including a unique reference key for each record, a name for the workflow, a description of the workflow, the steps in the workflow and the unique reference key for the type of workflow.

The CCS uses the notification management database 616 to save and archive information about notifications. The notification database also stores links to templates for the different types of notifications. A notification is a message sent to a user to inform that user that an event has occurred, such as a collateral approval. For each notification, the notification database contains a plurality of fields including a unique reference key for each record, the type of event that caused the notification (e.g., a purchase), the unique reference key for the event that has caused the notification (e.g., the unique reference key for a specific purchase), the type of template to use for the notification, the unique reference key for the recipient to be notified (e.g., unique reference key for the destination user or system), the date and time of the event that caused the notification, the date and time that the notification was sent, the title of the notification, the message within the notification, the unique reference key for each user who shall receive a carbon copy of the notification and the unique reference key for each user who shall receive a blind copy of each notification.

The CCS uses the messaging database 617 to save and archive messages. The messaging database also stores links to templates for the different types of messages. A message is a communication from one user to another user or a note that is saved by a user. For each message, the messaging database contains a plurality of fields including a unique reference key for each record, the unique reference key for the messaging thread (e.g., text messaging between two users), the sequence in the thread for the message, and the date and time for the message.

The CCS uses the forums database 618 to store information about forums. The forums database contains a plurality of fields including a unique reference key for each record, the name of the forum, the purpose of the forum, the topic, and the audience who can see the forum and participation permissions.

The CCS uses the marketing database 619 to store information about marketing campaigns. The marketing database contains a plurality of fields including a unique reference key for each record, the name of the marketing campaign, a description for the marketing campaign, the target audience, links to information that supports the marketing campaign, the terms and conditions for the offer, the timeframe for the marketing campaign, the approved budget for the marketing campaign, the actual spend for the marketing campaign, the success criteria, the key performance indicators and the partners used to execute the marketing campaign.

The CCS uses the audit database 620 to save and archive transactional information about CCS activities such as transactions between venture capital funds and lenders. The audit database contains a plurality of fields including a unique reference key for each record, information about each activity performed by the CCS, the time that the activity occurred, and the unique reference key of the person who initiated the activity.

FIG. 7 illustrates the key components of the Business Intelligence System in a first embodiment of the apparatus and method of the present invention.

The Business Intelligence System is operatively coupled to the CCS. Many companies supply business intelligence systems that can be used by the present invention including Microstrategy and Oracle. The CCS uses the business intelligence system to analyze data stored in the plurality of databases that comprise the data storage system. The purpose of the analysis by the business intelligence system is to identify trends, patterns and relationships that may be hidden in the data stored in the data storage system.

The present invention uses a commercial Business Intelligence System that is illustrated in FIG. 7. It includes a plurality of modules including an extract, transform and data load "ETL" module 701, a data warehouse module 702, an analytic tools module 703, a data mining module 704, a reporting tools module 705 and a presentation layer module 706. The main purpose of the business intelligence system is to capture, process and analyze vast amounts of data from a plurality of sources then identify trends, patterns and relationships that can facilitate business decision-making.

The ETL module 701 is the interface between the Business Intelligence System and the CCS. The main purpose of the ETL module is to transfer data from the CCS to the data warehouse. Using ETL tools to operatively couple a system, such as the Business Intelligence System, to the CCS is explained above in the description of FIG. 2.

The data warehouse module 702 is a database built in a commercial storage system and is substantially the same as the data storage system described in FIG. 6. The data warehouse module contains a copy of a pre-determined subset of the total data that is available in the data storage system. The system administrator user specifies the data in the data storage system that the system administrator wants to use for business analysis. The installation engineer configures the ETL module to extract that pre-determined data from the source database in the data storage system, then configures the ETL module to transform that data into a format that is compatible with the data warehouse, then configures the ETL module to load the transformed data into the pre-determined database locations in the data warehouse module. The installation engineer also configures the ETL module to repeat this extract, transform and data load procedure periodically. The present invention uses a specific data warehouse but many vendors offer commercial data warehousing solutions that can be used by the present invention including Hyperion, Microstrategy and Oracle.

The analytic tools module 703 includes standard on-line analytical processing ("OLAP") functionality. OLAP software enables users to create various views and representations of data in the data warehouse. OLAP functionality enables the system administrator user to access, analyze and model business issues and share the information that is in the data warehouse. The present invention uses a specific OLAP solution but many vendors offer commercial data warehousing and OLAP solutions that meet the needs of the present invention, including Hyperion, Microstrategy and Oracle. The OLAP council creates OLAP standards.

The data mining tools module 704 enables the system administrator user to discover trends, patterns and relationships in the data stored in the data warehouse module. Data mining software is designed to analyze large volumes of data using sophisticated data search techniques then apply statistical methods to discover trends, patterns and relationships in the data. The present invention uses a specific data mining system but many data mining options are available that can meet the needs of the present invention, including solutions from Baan Software, Oracle, SAP, Sybase and Tableau Software. The Data Mining Group is an independent, vendor led consortium that develops data mining standards.

The reporting tools module 705 enables the system administrator user to create reports that display the data stored in the data warehouse as well as information that illustrates the trends, patterns and relationships in the data stored in the data warehouse module. The present invention uses a specific reporting tools solution but many vendors offer commercial reporting software that can meet the needs of the present invention, including Business Objects, Cognos, Crystal Reports and Microstrategy.

The presentation layer module 706 includes graphics and multimedia interfaces that enable information and reports to be displayed in a user-friendly manner. The reporting tools described above all include a presentation layer module.

Figure 8:
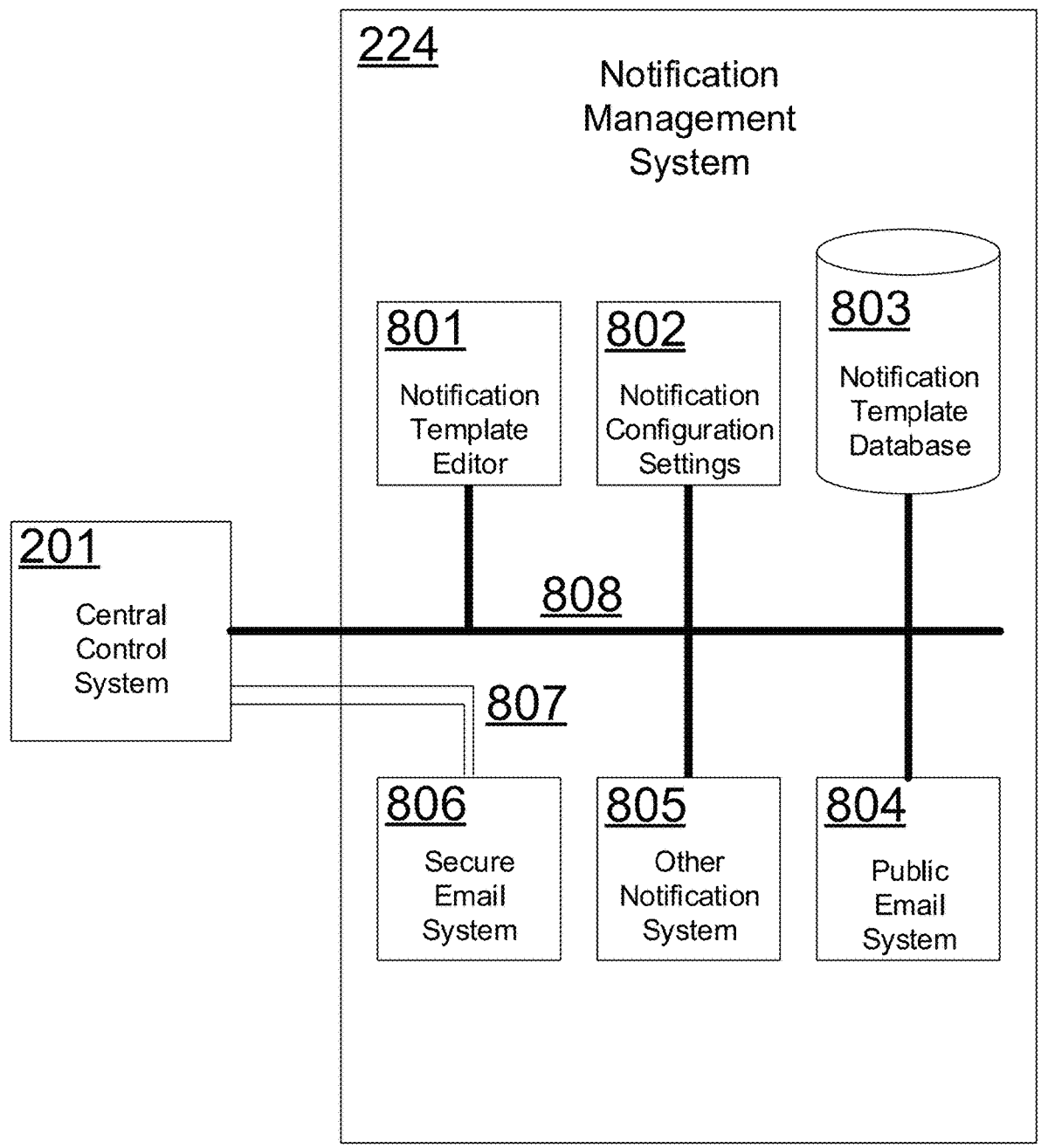
FIG. 8 illustrates a first embodiment of the notification management system ("NMS") of the present invention.

FIG. 8 illustrates the key components of the notification management system in a first embodiment of the apparatus and method of the present invention.

The notification management system 209 is operatively coupled to the CCS. The purpose of the notification management system is to send a notification whenever an event occurs that requires the attention of a user. The CCS sends a notification message via the notification management system to inform the recipient of the notification that a key event has occurred such as a payment has been made. The system administrator user configures the notification management system to monitor a plurality of other events then alert the pre-determined user when the specific event occurs. These events are linked to the key steps in the preferred embodiment of the present invention many of which are illustrated in FIG. 1, FIG. 1*a* and FIG. 1*b*.

FIG. 8 illustrates the Notification Management System used by the present invention. This Notification Management System includes a plurality of modules including a notification template editor 801, a notification configuration settings module 802, a notification template database 803, at least one public email system 804, at least one other notification system 805, a secure email system 806, a virtual private network (VPN) 807 and a wide area network 808.

The notification template editor 801 is a standard commercial word processor that the system administrator user can use to draft notification templates. The system administrator user then saves those templates into the notification template database 803. The system administrator inserts bookmarks into the notification template where information must be added to convert the template into an actual notification message. For example, the system administrator inserts a bookmark for the notification address (such as an email address) of the pre-determined user to whom the notification shall be sent.

The system administrator user uses the notification configuration settings module 802 to configure and enable the notifications. For example, in one embodiment of the present invention the system administrator user will configure a notification to be sent whenever a micro loan is approved. The configuration information will include a plurality of information including the event (e.g., an approved micro loan), the contact information for the user to be notified, the title of the notification, information about the micro loan, and related meta data.

The notification template database 803 is used to store notification templates. For each notification template, the notification template database contains a plurality of fields including a unique reference key for each record, the unique reference key for the type of event for which the notification template shall be used, the title of the event, the standard message in the notification, the unique reference key for each user who shall receive the notification, the unique reference key for each user who shall receive a carbon copy of the notification and the unique reference key for each user who shall receive a blind copy of the notification. When a predetermined event occurs, the CCS will identify the pre-determined users to whom the notification shall be addressed, the predetermined users who shall receive a copy of the notification and the predetermined users who shall receive a blind copy of the notification.

The CCS passes this information and a plurality of other information, such as the predetermined template to use for the specific event, to the notification management system that extracts information from the notification management database to fill in the blanks in the predetermined notification template.

The public email system 804 enables users to receive notifications from the CCS by email. It also enables users to send emails to the CCS. A plurality of public email systems are compatible with the present invention including yahoo mail, hotmail, and gmail. When a user registers with the CCS, that user must input an email address that the CCS will use to send non-confidential notifications.

To one skilled in the art, it will be evident that the CCS can use other notification systems 805 to notify users that an event has occurred. Other possible notification systems include instant messaging, text messages, telephone service, and wireless services. When the user registers with the CCS, the user can input their contact information for their alternative notification systems.

The secure email system 806 enables users to receive secure notifications from the CCS by email. It also enables users to send secure emails to the CCS. A plurality of vendors offers secure email services that are compatible with the present invention, such as Zix mail. When a user registers with the CCS, the CCS will give that user a secure email address. The CCS is connected to the secure email system by a virtual private network (VPN) 807. Commercial telephone companies such as Verizon provide virtual private networks. These VPN circuits provide more security than a regular telephone circuit. The other components of the notification management system are interconnected by a combination of wide and local area networks 808. Such networks are described above in the discussion of FIG. 3.

When an event occurs that requires a notification that does not include sensitive information, the CCS will send the notification to the user's secure email address and also to the user's public email address. When an event occurs that requires a notification that does include sensitive information then the CCS will send the notification to the user's secure email address. The CCS will also send a non-confidential notification to the user's public email address informing that user that a secure notification message has been sent to that user's secure email address. The user will then log in to the CCS to access the secure notification.

Figure 9:
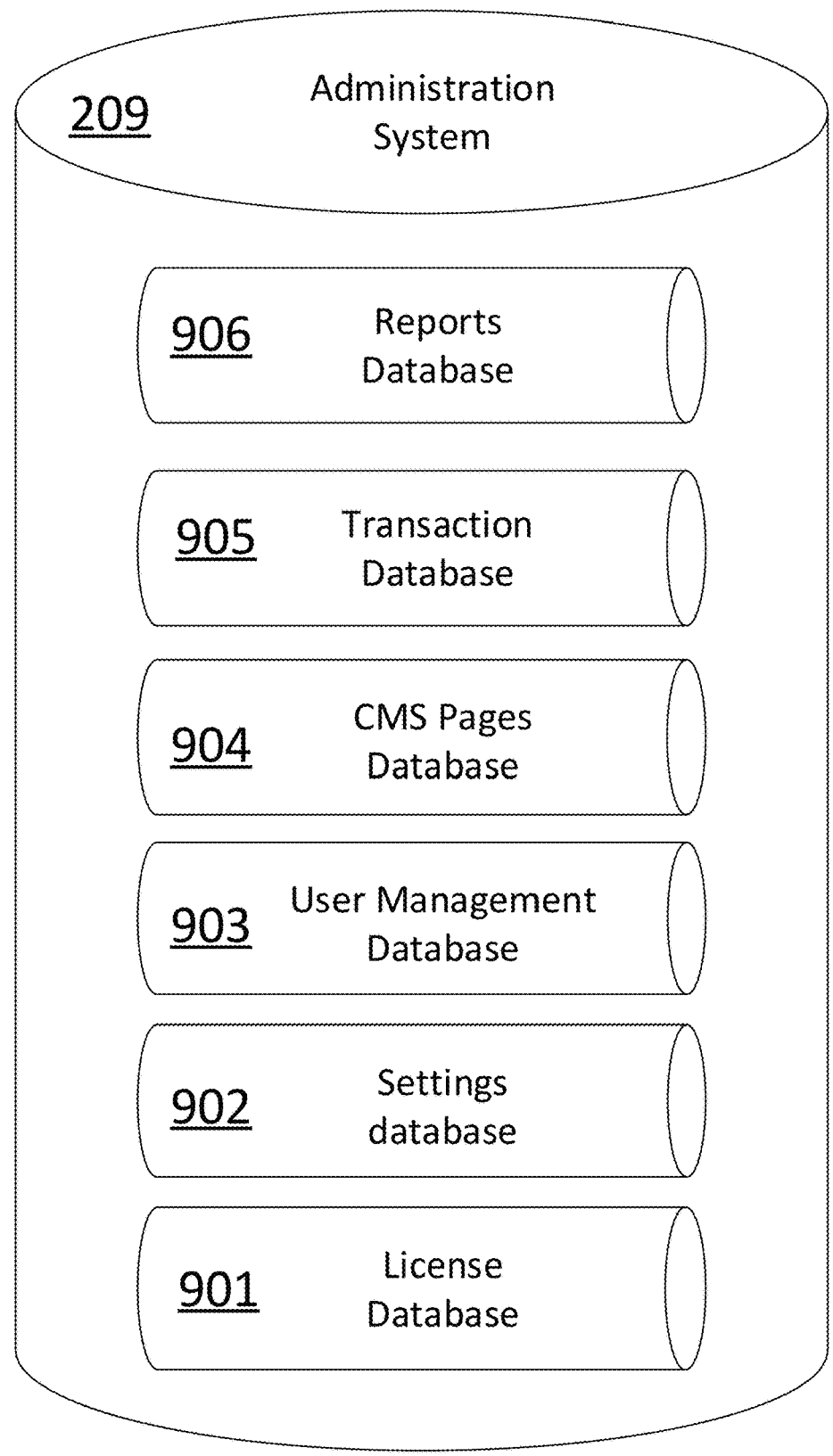
FIG. 9 illustrates a first embodiment of the administration system of the present invention.

FIG. 9 illustrates the key components of the Administration System which is operatively coupled to the Central Control System. The Administration System used by the present invention is comprised of a plurality of modules including a license database 901, a settings database 902, a user management database 903, a CMS pages database 904, a transactions database 905, and a reports database 906.

The license database 901 stores information about which users are authorized to use the present invention. The license database contains a plurality of fields including a unique reference key for each record in the license database, the unique reference key of each user, and licensing and payment information for each user.

The settings database 902 stores configuration information for the present invention.

The user management database 903 stores information about users. This information includes the type of user, contact information, and the user's status such as active or inactive.

The CMS pages database 904 stores information about the web site pages and mobile user interface for the present invention. This module enables the system administrator to edit the content on these pages. Example pages include "About Us", "Frequently Asked Questions", "Home", "privacy policy" and the "User Agreement".

The transactions database 905 stores information about system transactions in the present invention.

The reports database 906 stores information about reports in the present invention. These reports help the system administrator manage the present invention. Example reports include the amount of the available storage used, peak and average CPU utilization in system servers, and peak and average number of users.

Preferred Embodiment of the Present Invention

Figure 10:
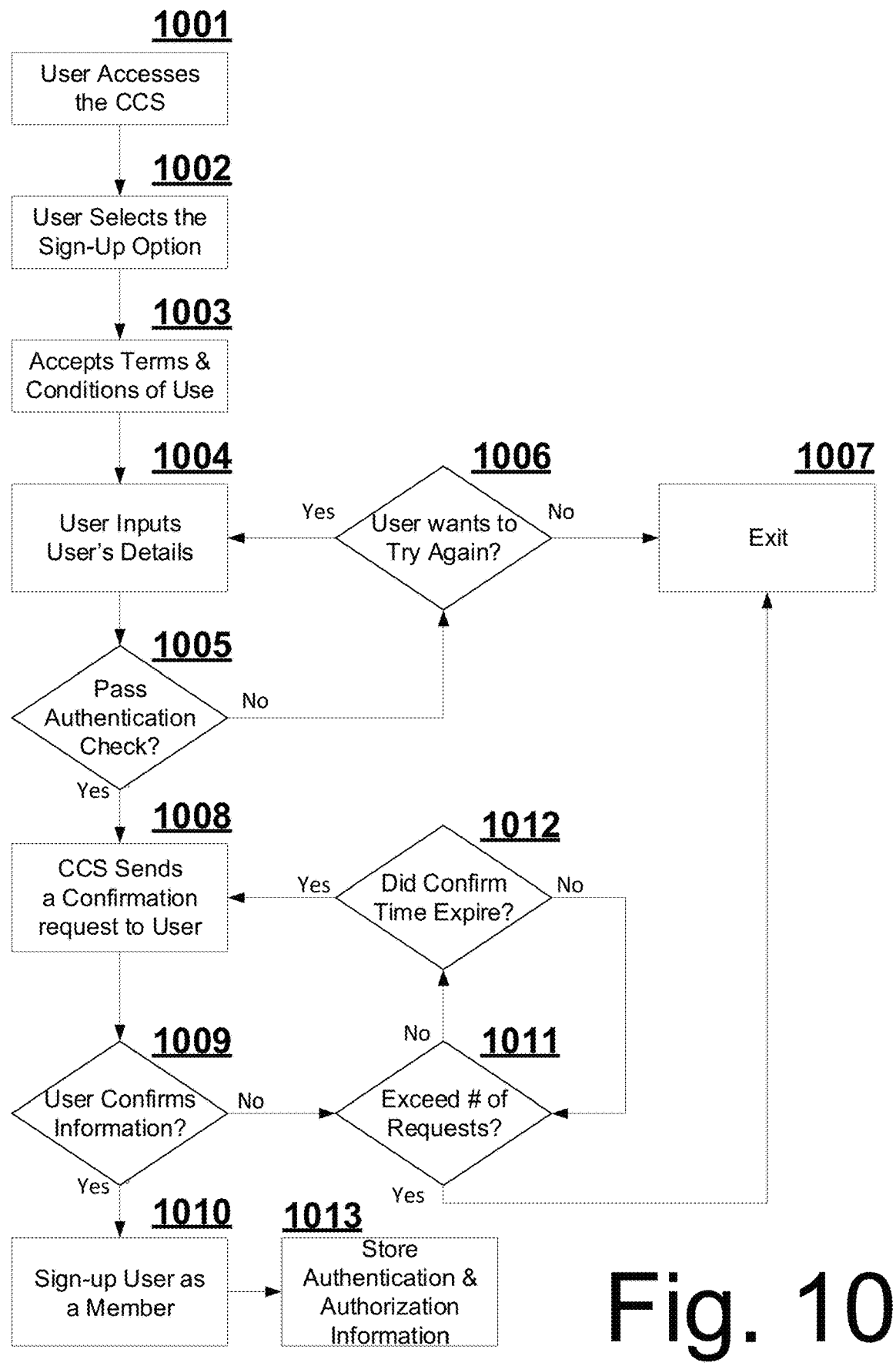
FIG. 10 illustrates a first embodiment of the sign-up procedure for the present invention.

FIG. 10 illustrates the procedure for users to sign-up in a first embodiment of the apparatus and method of the present invention.

The user accesses the CCS 1001 then selects the sign-up option 1002. The user then accepts the predetermined terms and conditions of use 1003. The user then inputs the requested user details 1004. These details include name, contact information, user name, password and the other meta data specified above for the user database illustrated in FIG. 6. When the user accesses the CCS after signing up, that user will have to input the user name and password to log into the CCS. The user can also select at least one of a plurality of multi factor authentication options, such as a biometric signature, an email confirmation or a text message to supplement, or replace, the standard login credentials. The CCS authenticates the information entered by the user at step 1004 for completeness. If the information is incomplete 1005, the CCS will offer the user the opportunity to complete the information 1006. If the user chooses to try again to complete the information, the CCS returns to step 1004. If the user chooses not to complete the sign-up information, the CCS exits the sign-up procedure 1007.

If the information entered by the user is complete 1005, the CCS sends a confirmation request to the user 1008. The CCS will send this confirmation request to the email address, or other validation option, entered by the user at step 1004. For example, the user can also select to authenticate using a text message rather than an email. The CCS asks the user to confirm receipt of this request 1009. If the user confirms receipt of the confirmation request as requested by the CCS, the CCS will sign-up the user as a member 1010. If the user does not confirm receipt of the confirmation request, the CCS will determine whether the predetermined maximum number of reminder requests have been exceeded 1011. If the CCS has already sent the predetermined maximum number of confirmation requests, then the CCS will exit the sign-up procedure 1007. If the CCS has sent fewer than the predetermined maximum number of confirmation requests, then the CCS will determine whether the predetermined wait time has been exceeded 1012 before sending another confirmation request to the user. After the predetermined wait time between reminders has been exceeded 1012, the CCS will send another confirmation request to the user 1008. This will return the CCS to step 1008 in the sign-up procedure. After a user signs up, that user is given the option to store their authentication information and authorization information in the decentralized distributed encrypted database 1013 described below.

Figure 11:
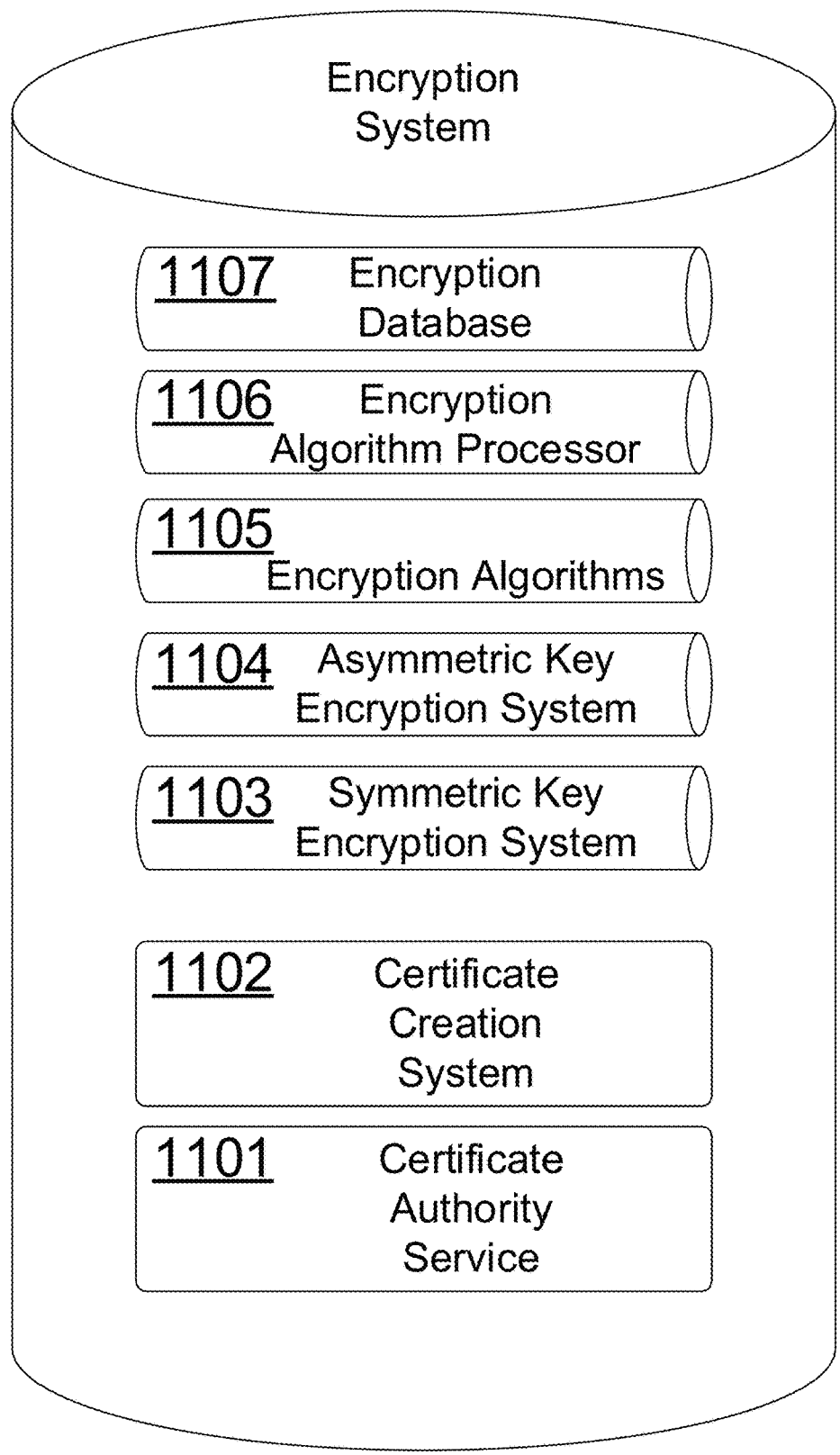
FIG. 11 illustrates a first embodiment of the encryption system of the present invention.

FIG. 11 illustrates the key components of the Encryption System which is operatively coupled to the Central Control System. The Encryption System used by the present invention is comprised of a plurality of modules including a certificate authority service 1101, a certificate creation system 1102, a symmetric encryption key encryption system 1103, an asymmetric key encryption system 1104, encryption algorithms 1105, an encryption algorithm processor 1106, and an encryption database 1107.

The certificate authority service 1101 is independent of the two users who want to communicate. However, it is a source that is trusted by both users and confirms that they both are who they say they are. In addition, the certificate authority service provides the public encryption keys to each user. In summary, the certificate authority service authenticates the users and the fact that the authorization has not been altered.

Authentication is used with encryption to create a secure communication environment. Standard authentication systems include user name and password, pass cards that use a magnetic strip similar to that on a credit card, smart cards that have an embedded chip, and digital signatures based on the Digital Signature Standard (DSS) that uses the Digital Signature Algorithm (DSA). More modern forms of encryption use biometrics for authentication. Biometrics use biological information to verify a user's identity. Biometric authentication methods include finger print scans (capacitive and ultrasonic), palm veins, palm print, hand geometry, iris scan, retina scans, facial recognition, and voice recognition. Biometric authentication eliminates many of the risks associated with not knowing who is using an authenticated input or output device. Biometric authentication therefore provides an additional level of security over device level authentication for secure personal communications.

The certificate creation system 1102 generates a certificate for each user in the form of a piece of code, or a large number, that says that the user is trusted by the certificate authority. For example, when a first user sends a secure message to a second user that first user also sends his public encryption key and certificate to the second user. This allows the second user to validate three things: 1) that the certificate comes from a trusted party; 2) that the certificate is currently valid; and 3) that the certificate has a relationship with the present invention.

The symmetric key encryption system 1103 generates a secret code for each user. The encryption system uses this secret code, or encryption key, to encrypt information. Modern encryption systems use the advanced encryption standard (AES), which uses 128-, 192- or 256-bit encryption keys. These create more than $2^{128}$ possible key combinations for the encryption key. For a hacker trying to guess the encryption key, this is like trying to find one specific grain of sand in the Sahara Desert. It would take a hacker so long to guess the correct key combination that this encryption standard is considered to be secure for the foreseeable future. For symmetric key encryption, the same key is used to encrypt and decrypt a message. The use of symmetric encryption keys and asymmetric encryption keys in the present invention is described below.

The asymmetric key encryption system 1104 generates two secret codes for each user, a public encryption key and a private encryption key. When a first user wants to send an encrypted message to a second user but does not want to risk sending the encryption key then they use the asymmetric key encryption system. The use of symmetric encryption keys and asymmetric encryption keys in the present invention is described below. For example, in the present invention, when a first user wants to send a symmetric encryption key to a second user, that first user uses the public encryption key of the selected second user to encrypt the symmetric encryption key. The second user then uses his or her private encryption key to decrypt the symmetric encryption key. This is possible because an encryption algorithm is used where the algorithm, or function "F" is such that, F(clear symmetric encryption key, first user's public encryption key)=encrypted symmetric encryption key and F(encrypted symmetric encryption key, first user's private encryption key)=clear symmetric encryption key. Therefore, by using the same algorithm ("F") a user's private encryption key can be used to decrypt the symmetric encryption key that was encrypted by the same user's public encryption key (U.S. Pat. No. 8,374,354 B2). One advantage of the present invention is that the encryption and decryption are performed at the user interface preferably initiated by biometrics. For confidential information, the present invention only has access to the encrypted version of the symmetric encryption key and cannot decrypt the symmetric encryption key. The symmetric encryption key is used to encrypt and decrypt the information. In other systems, encryption is used to secure the transmission of digital media from the user to the system. This enables confidential information to be decrypted by the system operator which creates the risk of hacking supported by corrupt employees of the system operator.

The present invention uses a specific encryption algorithm however, a number of different encryption algorithms 1105 have been created that can be used by the present invention. Symmetric key encryption algorithms include The Data Encryption Standard (DES) was adopted as a U.S. government standard in 1977 and as an ANSI standard in 1981. Triple-DES is a way to make the DES dramatically more secure by using the DES encryption algorithm three times with three different keys, for a total key length of 168 bits. Also called "3DES," this algorithm has been widely used by financial institutions and by the Secure Shell program (ssh). Blowfish is a fast, compact, and simple block encryption algorithm invented by Bruce Schneier. The algorithm allows a variable-length key, up to 448 bits, and is optimized for execution on 32- or 64-bit processors. The algorithm is unpatented and has been placed in the public domain. Blowfish is used in the Secure Shell and other programs. Asymmetric key encryption algorithms include the Rivest Shamir Adleman (RSA) public encryption key algorithm that can be used for encrypting and signing data and Elliptic Curve Cryptography (ECC) which provides similar functionality to RSA for smaller devices like cell phones. It requires less computing power than RSA. ECC encryption systems are based on the idea of using points on a curve to define the public/private encryption key pair. The present invention can use these and other standard encryption algorithms.

The encryption algorithm processor 1106 is the code that is used to encrypt and decrypt information. The present invention includes its own code for these purposes and also can use other code considered to comply with industry standards. By way of example, sample code that was published by syntx.io includes the following to encrypt a message using AES as the algorithm:

```
public static final String encrypt(final String message,
    final Key key, final IvParameterSpec iv) throws Ille-
    galBlockSizeException,
BadPaddingException, NoSuchAlgorithmException,
NoSuchPaddingException, InvalidKeyException,
UnsupportedEncodingException,
InvalidAlgorithmParameterException {
  Cipher cipher=
Cipher.getInstance("AES/CBC/PKCS5Padding");
  cipher.init(Cipher.ENCRYPT_MODE,key,iv);
  byte[ ] stringBytes=message.getBytes( );
  byte[ ] raw=cipher.doFinal(stringBytes);
  return Base64.encodeBase64String(raw);
}
```

The same example from syntx.io published the following code to decrypt the message:

```
public static final String decrypt(final String encrypted,
    final Key key, final IvParameterSpec iv) throws
    InvalidKeyException,
NoSuchAlgorithmException, NoSuchPaddingException,
IllegalBlockSizeException, BadPaddingException,
    IOException, InvalidAlgorithmParameterException {
  Cipher cipher=Cipher.getInstance("AES/CBC/
    PKCS5Padding");
  cipher.init(Cipher.DECRYPT_MODE, key,iv);
  byte[ ] raw=Base64.decodeBase64(encrypted);
  byte[ ] stringBytes=cipher.doFinal(raw);
  String clearText=new String(stringBytes, "UTF8");
  return clearText;
}
```

It will be evident to one skilled in the art that more robust algorithms are available for use, can be developed, and can be used by the present invention.

The encryption database 1107 is substantially the same as the encryption database in FIG. 6. It stores the encryption information required by the other modules described above that comprise the encryption system.

Figure 12:
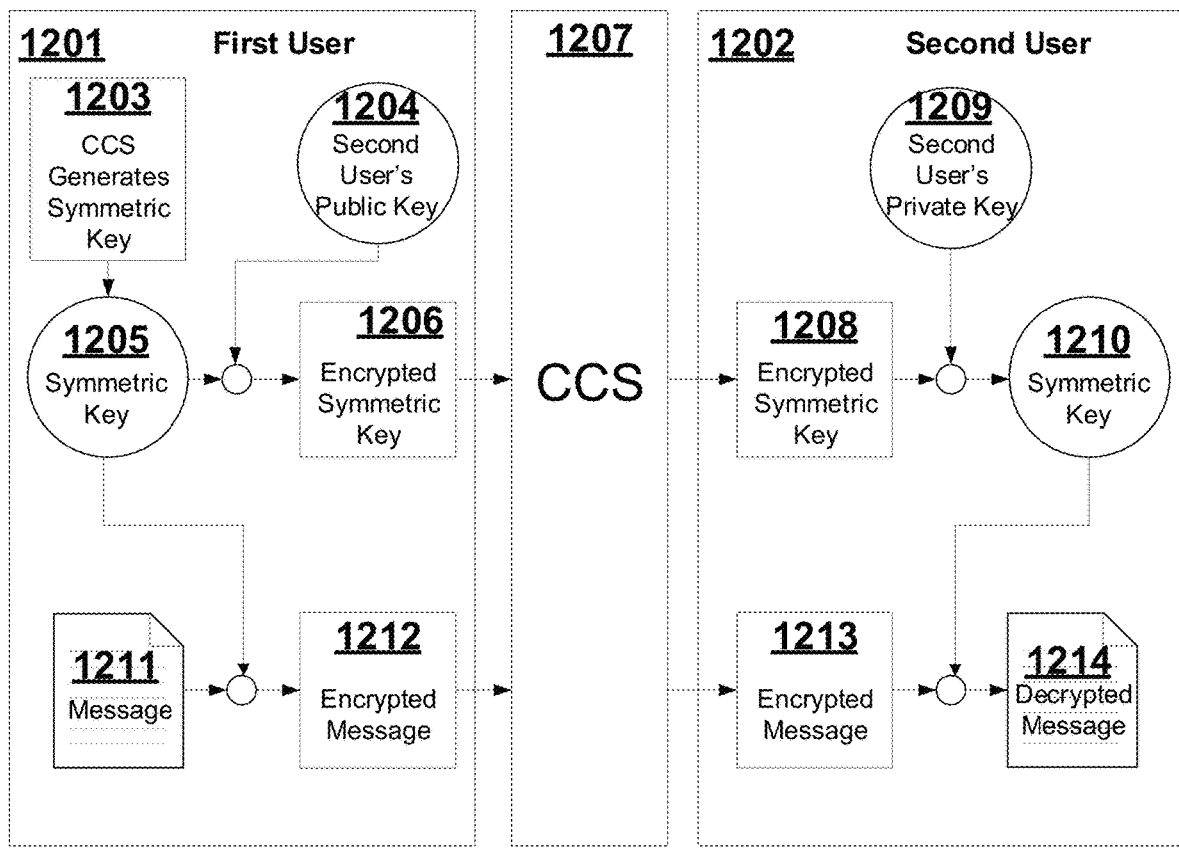
FIG. 12 illustrates a first embodiment of the high level encryption approach for the present invention.

FIG. 12 illustrates the preferred procedure to send a message from a first user 1201 to a second user 1202 through the CCS. When the first user and second user register on the system they download the CCS front end application onto their computer 301. The CCS application is created using standard programming languages such as java, javascript, PHP, HTML, C, C+, and visual basic. The CCS also gives the first user and second user their own symmetric encryption key, private encryption key and public encryption key as described above for the encryption system. The first user and the second user both use the CCS to make their public encryption keys available to other users. When the first user wants to send a message to the second user, the CCS application in the first user's computer 301 generates a new symmetric encryption key 1203 for this transaction. The CCS then uses the second user's public encryption key 1204 to encrypt the symmetric encryption key 1205 and create an encrypted symmetric encryption key 1206. The CCS 1207 then transfers the encrypted symmetric encryption key from the first user to the second user. The CCS front end application on the second user's computer receives the encrypted symmetric encryption key 1208 then uses the second user's private encryption key 1209 to decrypt the encrypted symmetric encryption key and recover the symmetric encryption key 1210 that was generated by the CCS application on the first user's computer for this transaction.

The CCS application on the first user's computer also uses the same symmetric encryption key 1205 to encrypt the target message 1211 and form an encrypted message 1212. The CCS 1207 then transfers the encrypted message from the first user to the second user. The CCS's front end application on the second user's computer receives the encrypted message 1213 then uses the second user's symmetric encryption key 1210 to decrypt the encrypted message and recover the original message 1214 that was sent by the CCS application on the first user's computer. The symmetric encryption key and message cannot be accessed by employees or partners of the CCS platform which minimizes the risk of unauthorized decryption.

Asymmetric encryption is slower than symmetric encryption. The CCS application therefore uses the public encryption key and private encryption key to encrypt and decrypt the symmetric encryption key because the symmetric encryption key is typically much smaller than the user's message. This is a secure method for the CCS to transfer the symmetric encryption key from the first user to the second user. This solution also enables the CCS application to use the faster symmetric key encryption method to encrypt and decrypt the target message that is typically much larger than the symmetric encryption key.

Figure 13:
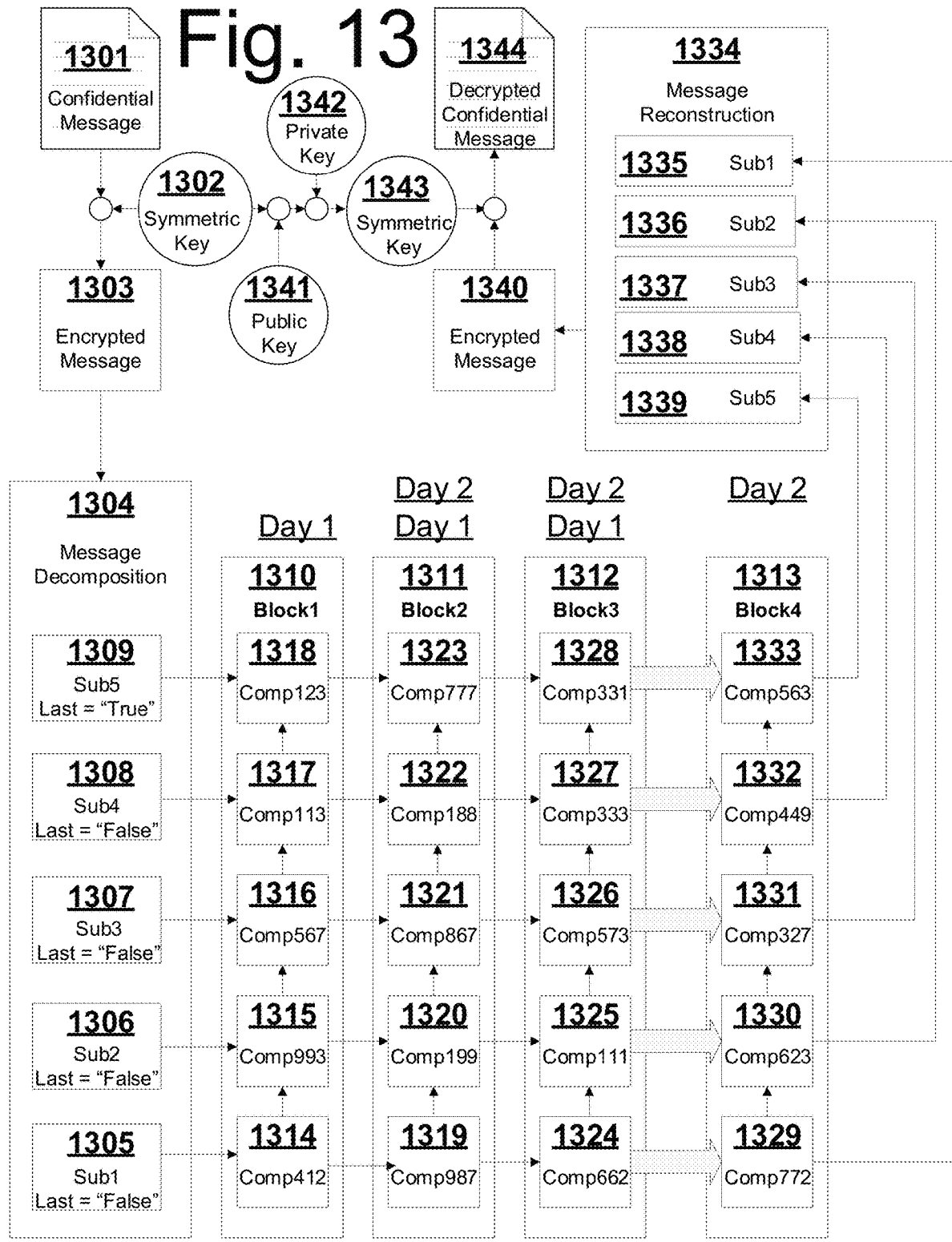
FIG. 13 illustrates a first embodiment of the high level authentication approach for the present invention.

FIG. 13 illustrates the preferred procedure for the present invention to receive a secure authorization in the form of a confidential message 1301 and output a confidential message 1344, wherein said confidential message has one of a plurality of forms including user authorization and authentication credentials such as a user name, password, multifactor authentication information and a blockchain address for an account or a stable coin. Said confidential message can also include a crypto currency blockchain address, a payment authorization, a private encryption key, an authentication certificate for digital media and a reference file for biometric authentication. This preferred procedure enables the confidential message to be received from a first user and output to that same first user or received by a first user and output to a second user. The CCS application on a first user's computer generates a unique symmetric encryption key 1302 to encrypt each confidential message 1303. The CCS front end application on the user's device generates a different symmetric encryption key for each message. The CCS application on the first user's computer then decomposes the confidential message into a number of subcomponents 1304. A number of tools are available to split a file into subcomponents, such as WinRar and HJSplit. For example, WinRar allows the user to specify the size of each subcomponent. The example in FIG. 13, decomposes the message 1304 into 5 subcomponents Sub1 1305, Sub2 1306, Sub3 1307, Sub4 1308, and Sub5 1309 in that order. It also sets the "last subcomponent flag" to "False" for Sub1 1305, Sub2 1306, Sub3 1307, and Sub4 1308 but sets the "last subcomponent flag" to "True" for Sub5 1309 because Sub5 1309 is the last subcomponent of message 1304. It also sets the counter=1 for Sub1 1305, counter=2 for Sub2 1306, counter=3 for Sub3 1307, counter=4 for Sub4 1308 and counter=5 for Sub5 1309. The CCS application on the first user's computer randomly selects three computers, Comp412 1314, Comp987 1319, and Comp682 1324, from a predetermined list of independent member computers. Each organization that wants to use this dynamic process to decompose encrypted messages can propose a computer to participate in the consortium of independent member computers. After the system administrator vets the organization and vets the proposed computer, for performance, security and other features, then the vetted computer is added to the network of independent member computers. The CCS application on the first user's computer, writes the first subcomponent 1305 of the decomposed encrypted confidential message and the counter value (e.g., 1) and the "last subcomponent flag" (e.g., "False") from subcomponent1 (Sub1) to computer 412 (Comp412) 1314. It also writes the same subcomponent1 (Sub1), counter value and "last subcomponent flag" to computer 987 (Comp987) 1319 and the same subcomponent1 (Sub1), counter value and "last subcomponent flag" to computer 662 (Comp662) 1324.

Computer 412 (Comp412) 1314 then randomly selects another computer from the predetermined list of member computers, namely computer (Comp993) 1315 and remembers that next computer in sequence (Comp993). Computer 412 (Comp412) 1314 then instructs the CCS application on the first user's computer to copy subcomponent2 (Sub2), the counter value (e.g., 2) and the "last subcomponent flag" (e.g., "False") 1306 to computer 993 (Comp993) 1315. When Computer 412 (Comp412) 1314 makes this request, it increments its own counter by 1 (e.g., 1+1=2) to know which subcomponent (e.g., Sub2) to request from block 1304 to be sent to computer 993 (Comp993) 1315. Similarly, Computer 987 (Comp987) 1319 randomly selects another computer from the predetermined list of member computers, namely computer (Comp199) 1320 and remembers that next computer in sequence (Comp199). Computer 987 (Comp987) 1319 then instructs the CCS application on the first user's computer to copy subcomponent2 (Sub2), the counter value (e.g., 2) and the "last subcomponent flag" (e.g., "False") 1306 to computer 199 (Comp199) 1320. Further, Computer 662 (Comp662) 1324 randomly selects another computer from the predetermined list of independent member computers, namely computer 111 (Comp 111) 1325 and remembers that next computer in sequence. Computer 662 (Comp662) 1324 then instructs the CCS application on the first user's computer to copy subcomponent2 (Sub2), the counter value (e.g., 2) and the "last subcomponent flag" (e.g., "False") 1306 to computer 111 (Comp 111) 1325. Computers 987 (Comp987) 1319 and 662 (Comp662) 1324 both increment their own counter+1 (e.g., 1+1=2) to determine which subcomponent (e.g., Sub2) to request from block 1304.

Computer 993 (Comp993) 1315 then randomly selects another computer from the predetermined list of independent member computers, namely computer 567 (Comp567) 1316 and remembers that next computer in sequence (Comp567). Computer 993 (Comp993) 1315 then instructs the CCS application on the first user's computer to copy subcomponent3 (Sub3), the counter value (e.g., 3) and the "last subcomponent flag" (e.g., "False") 1307 to computer 567 (Comp567) 1316. When Computer 993 (Comp993) 1315 makes this request, it uses its own counter+1 (e.g., 2+1=3) to determine which subcomponent (e.g., Sub3) to request from block 1304 to be sent to computer (Comp567) 1316. Similarly, Computer 199 (Comp199) 1320 randomly selects another computer from the predetermined list of independent member computers, namely computer 867 (Comp867) 1321 and remembers that next computer in sequence (Comp867). Computer 199 (Comp199) 1320 then instructs the CCS application on the first user's computer to copy subcomponent3 (Sub3), the counter value (e.g., 3) and the "last subcomponent flag" (e.g., "False") 1307 to computer 867 (Comp867) 1321. Further, Computer 111 (Comp111) 1325 randomly selects another computer from the predetermined list of independent member computers, namely computer 573 (Comp573) 1326 and remembers that next computer in sequence (Comp573). Computer 111 (Comp111) 1325 then instructs the CCS application on the first user's computer to copy subcomponent3 (Sub3), the counter value (e.g., 3) and the "last subcomponent flag" (e.g., "False") 1307 to computer 573 (Comp573) 1326. Computers 199 (Comp199) 1320 and 111 (Comp111) 1325 both increment their own counter+1 (e.g., 2+1=3) to determine which subcomponent (e.g., Sub3) to request from block 1304.

Computer 567 (Comp567) 1316 then randomly selects another computer from the predetermined list of independent member computers, namely computer 113 (Comp 113) 1317 and remembers that next computer in sequence (Comp113). Computer 567 (Comp567) 1316 then instructs the CCS application on the first user's computer to copy subcomponent4 (Sub4), the counter value (e.g., 4) and the "last subcomponent flag" (e.g., "False") 1308 to computer 113 (Comp113) 1317. When Computer 567 (Comp567) 1316 makes this request, it uses its own counter+1 (e.g., 3+1=4) to determine which subcomponent (e.g., Sub4) to request from block 1304 to be sent to computer (Comp113) 1317. Similarly, Computer 867 (Comp867) 1321 randomly selects another computer from the predetermined list of independent member computers, namely computer 188 (Comp188) 1322 and remembers that next computer in sequence (Comp188). Computer 867 (Comp867) 1321 then instructs the CCS application on the first user's computer to copy subcomponent4 (Sub4), the counter value (e.g., 4) and the "last subcomponent flag" (e.g., "False") 1308 to computer 188 (Comp188) 1322. Further, Computer 573 (Comp573) 1326 randomly selects another computer from the predetermined list of independent member computers, namely computer 333 (Comp333) 1327 and remembers that next computer in sequence (Comp333). Computer 573 (Comp573) 1326 then instructs the CCS application on the first user's computer to copy subcomponent4 (Sub4), the counter value (e.g., 4) and the "last subcomponent flag" (e.g., "False") 1308 to computer 333 (Comp333) 1327. Computers 867 (Comp867) 1321 and 573 (Comp573) 1326 both increment their own counter+1 (e.g., 3+1=4) to determine which subcomponent (e.g., Sub4) to request from block 1304.

Computer 113 (Comp113) 1317 then randomly selects another computer from the predetermined list of independent member computers, namely computer 123 (Comp123) 1318 and remembers that next computer in sequence. Computer 113 (Comp113) 1317 then instructs the CCS application on the first user's computer to copy subcomponent5 (Sub5), the counter value (e.g., 5) and the "last subcomponent flag" (e.g., "True") 1309 to computer 123 (Comp123) 1318. When Computer 113 (Comp113) 1317 makes this request, it uses its own counter+1 (e.g., 4+1=5) to determine which subcomponent (e.g., Sub5) to request from block 1304 to be sent to computer 123 (Comp123) 1318. Similarly, Computer 188 (Comp188) 1322 randomly selects another computer from the predetermined list of independent member computers, namely computer 777 (Comp777) 1323 and remembers that next computer in sequence (Comp777). Computer 188 (Comp188) 1322 then instructs the CCS application on the first user's computer to copy subcomponent5 (Sub5), the counter value (e.g., 5) and the "last subcomponent flag" (e.g., "True") 1309 to computer 777 (Comp777) 1323. Further, Computer 333 (Comp333) 1327 randomly selects another computer from the predetermined list of independent member computers, namely computer 331 (Comp331) 1328 and remembers that next computer in sequence. Computer 333 (Comp333) 1327 then instructs the CCS application on the first user's computer to copy subcomponent5 (Sub5), the counter value (e.g., 5) and the "last subcomponent flag" (e.g., "True") 1309 to computer 331 (Comp331) 1328. Computers 188 (Comp188) 1322 and 333 (Comp333) 1327 both increment their own counter+(e.g., 4+1=5) to determine which subcomponent (e.g., Sub5) to request from block 1304.

Block1 1310 is a copy of the encrypted confidential message distributed across five random independent computers. Block2 1311 is a second copy of the encrypted confidential message distributed across five different random independent computers. Block3 1312 is a third copy of the encrypted confidential message distributed across five more random independent computers. None of the computers in each block know all of the other computers in the block. For example, Comp993 1315 only knows that Comp567 1316 is the next computer in the chain after itself for Block1. It does not know that Comp113 1317 is the next computer after Comp567 1316. This makes the solution more secure because a hacker would have to break into many independent computers to recover the encrypted information then that hacker would need to figure out how to reconstruct the confidential message and also figure out how to decrypt the information. This additional security is appropriate for the storage of referenceable personal identifiable information such as customer biometrics and crypto currency addresses. After a pre-determined period of time, one day say, the CCS application on the first user's computer randomly selects another computer 1329 from a predetermined list of independent member computers. The CCS application on the first user's computer, writes the first subcomponent of the decomposed encrypted confidential message from subcomponent1 (Sub1), the counter value (e.g., 1) and the "last subcomponent flag" (e.g., "False") 1305 to computer 772 1329. Similar to above, computer 772 (Comp772) 1329 randomly selects another computer from the predetermined list of member computers, namely computer (Comp623) 1330, and remembers that next computer in sequence (Comp623), then instructs the CCS application on the first user's computer to copy subcomponent2 (Sub2), the counter value (e.g., 2) and the "last subcomponent flag" (e.g., "False") 1306 to computer 623 (Comp623) 1330. Similar to above, computer 623 (Comp623) 1330 randomly selects another computer from the predetermined list of independent member computers, namely computer 327 (Comp327) 1331, and remembers that next computer in sequence (Comp327), then instructs the CCS application on the first user's computer to copy subcomponent3 (Sub3), the counter value (e.g., 3) and the "last subcomponent flag" (e.g., "False") 1307 to computer 327 (Comp327) 1331. Similar to above, computer 327 (Comp327) 1331 randomly selects another computer from the predetermined list of independent member computers, namely computer 449 (Comp449) 1332, and remembers that next computer in sequence (Comp449), then instructs the CCS application on the first user's computer to copy subcomponent4 (Sub4), the counter value (e.g., 4) and the "last subcomponent flag" (e.g., "False") 1308 to computer 449 (Comp449) 1332. Similar to above, computer 449 (Comp449) 1332 randomly selects another computer from the predetermined list of independent member computers, namely computer 563 (Comp563) 1333, and remembers that next computer in sequence (Comp563), then instructs the CCS application on the first user's computer to copy subcomponent5 (Sub5), the counter value (e.g., 5) and the "last subcomponent flag" (e.g., "True") 1309 to computer 563 (Comp563) 1333. This flag indicates that subcomponent5 is the final subcomponent that comprises the confidential message 1301.

Block4 1313 is a fourth copy of the encrypted confidential message distributed across five random computers. The CCS instructs the CCS application on the first user's computer to delete Block 0 and Block 1 1310 by discarding subcomponent1 (Sub1) from computer 412 (Comp412) 1314. Computer 412 (Comp412) 1314 then instructs Computer 993 (Comp993) 1315 to discard subcomponent2 (Sub2) from computer 993 (Comp993) 1315. Computer 993 (Comp993) 1315 then instructs Computer 567 (Comp567) 1316 to discard subcomponent3 (Sub3) from computer 567 (Comp567) 1316. Computer 567 (Comp567) 1316 then instructs Computer 113 (Comp113) 1317 to discard subcomponent4 (Sub4) from computer 113 (Comp113) 1317. Computer 113 (Comp113) 1317 then instructs Computer 123 (Comp123) 1318 to discard subcomponent5 (Sub5) from computer 123 (Comp123) 1318. In the example illustrated in FIG. 13, on Day 1 Block0, Block1, Block2 and Block3 form the original decomposed message and three copies of the decomposed message. On Day 2, Block4 is created and Block1 is deleted. In the first iteration of block creation and deletion, Block0 is also deleted. This process of creating a new block and deleting an old block continues until the user no longer needs access to the confidential message and deletes that confidential message from the decentralized distributed database. This causes the three copies of the decomposed message to keep moving dynamically throughout the network of member computers making the confidential information more difficult for a hacker to locate.

In order for the CCS application on the second user's computer (such as a pharmacist reviewing a prescription, an intellectual property user reviewing an authentication certificate, a user authenticating a biometric parameter or a user accessing the blockchain address for their digital currency or stable coin) to reconstruct the confidential message, the CCS application on the first user's computer (such as the prescribing doctor or intellectual property owner of payment sender for a digital currency) sends a unique authorization identifier ("authorization ID") to the second user (pharmacist or intellectual property user or payment receiver). Alternatively, the first user (e.g., the doctor or intellectual property owner or payment sender) can give the authorization identifier to the patient or intellectual property reseller or payment receiver who can forward it to the pharmacist or intellectual property user or keep it for themselves. The pharmacist or intellectual property user or payment receiver uses the unique authorization identifier to request the authorization (e.g., request the prescription or authentication certificate or blockchain address). For additional security, the present invention can use the recipient's public encryption key to encrypt the authorization identifier. The present invention will then enable the recipient to use their private encryption key to decrypt the authorization identifier which the present invention uses to locate the correct confidential message in the decentralized distributed database. The present invention enables a user to associate multiple confidential messages with a single authorization identifier or biometric signature. The present invention achieves this by enabling a user to associate meta data with each authorization identifier. For example, a user may use a single biometric signature to access 3 different web sites. In this case, the present invention allows the user to add the URL of each website, or some other meta data, with each authorization identifier.

The present invention enables the user who stores the confidential message (e.g., storer user) and the user who retrieves the confidential message (e.g., retriever user) to be the same person for applications, such as warm storage for a crypto currency blockchain address or for password access to a system. A stable coin is a specific form of a crypto currency. The CCS verifies the unique authorization identifier, which can be a biometric signature if user 1 and user 2 are the same person, then copies subcomponent1 (Sub1) from computer 772 (Comp772) 1329 to the second user's computer 1335. Similarly, computer 772 (Comp772) 1329 knows that computer 623 (Comp623) 1330 is the next computer in Block4 and instructs computer 623 (Comp623) 1330 to write subcomponent2 (Sub2) to the second user's computer 1336. Similarly, computer 623 (Comp623) 1330 knows that computer 327 (Comp327) 1331 is the next computer in Block4 and instructs computer 327 (Comp327) 1331 to write subcomponent3 (Sub3) to the second user's computer 1337. Similarly, computer 327 (Comp327) 1331 knows that computer 449 (Comp449) 1332 is the next computer in Block4 and instructs computer 449 (Comp449) 1332 to write subcomponent4 (Sub4) to the second user's computer 1338. Similarly, computer 449 (Comp449) 1332 knows that computer 563 (Comp563) 1333 is the next computer in Block4 and instructs computer 563 (Comp563) 1333 to write subcomponent5 (Sub5) to the second user's computer 1339. Computer 563 (Comp563) 1333 knows that it is the final computer in the chain because its "last subcomponent flag" is set to "True" indicating that subcomponent5 is the final subcomponent that comprises the confidential message 1301. The second user can alternatively reconstruct the message from the computers in Block3 or Block2 in addition to Block4. For more robust applications, the present invention can be configured to recover all three versions of the message and take a consensus of the three copies to minimize even further the possibility of data corruption impacting the results.

The CCS application on the second user's computer then uses the same decomposition application, such as WinRar or HJSplit, to reconstruct the encrypted confidential message 1340 from the linked subcomponents in block 1334. The CCS application on the first user's computer uses the second user's public encryption key 1341 to encrypt the symmetric encryption key 1302. The first user then uses the CCS to send the encrypted symmetric encryption key to the second user. The CCS application on the second user's computer then uses her private encryption key 1342 to decrypt the symmetric encryption key 1343. The CCS application on the second user's computer then uses the symmetric encryption key 1343 to decrypt the confidential message 1344.

The example in FIG. 13, illustrates three copies of the authorization message one in each of Block1 1310, Block2 1311 and Block3 1312. In the present invention, the number of replicated messages can be reduced to 1 or 2 or increased to more than 3 to provide more or less redundancy in order to match the specific needs of each business requirement. In addition, the encrypted message can be decomposed into fewer than 5 subcomponents or more than 5 subcomponents. Also, user 1 (the storer user) and user 2 (the retriever user) can be the same user, such as in the case of warm storage of a crypto currency address. In this case, the user can use a biometric signature to initiate the encryption and decomposition process then use their biometric signature to initiate the reconstruction and decryption process. Steps 1341 and 1342 could be eliminated because the symmetric key in step 1302 could be seeded from user 1's biometric signature and the symmetric key in step could be seeded from user 2's biometric signature but user 1 and user 2 are the same person.

Figure 13A:
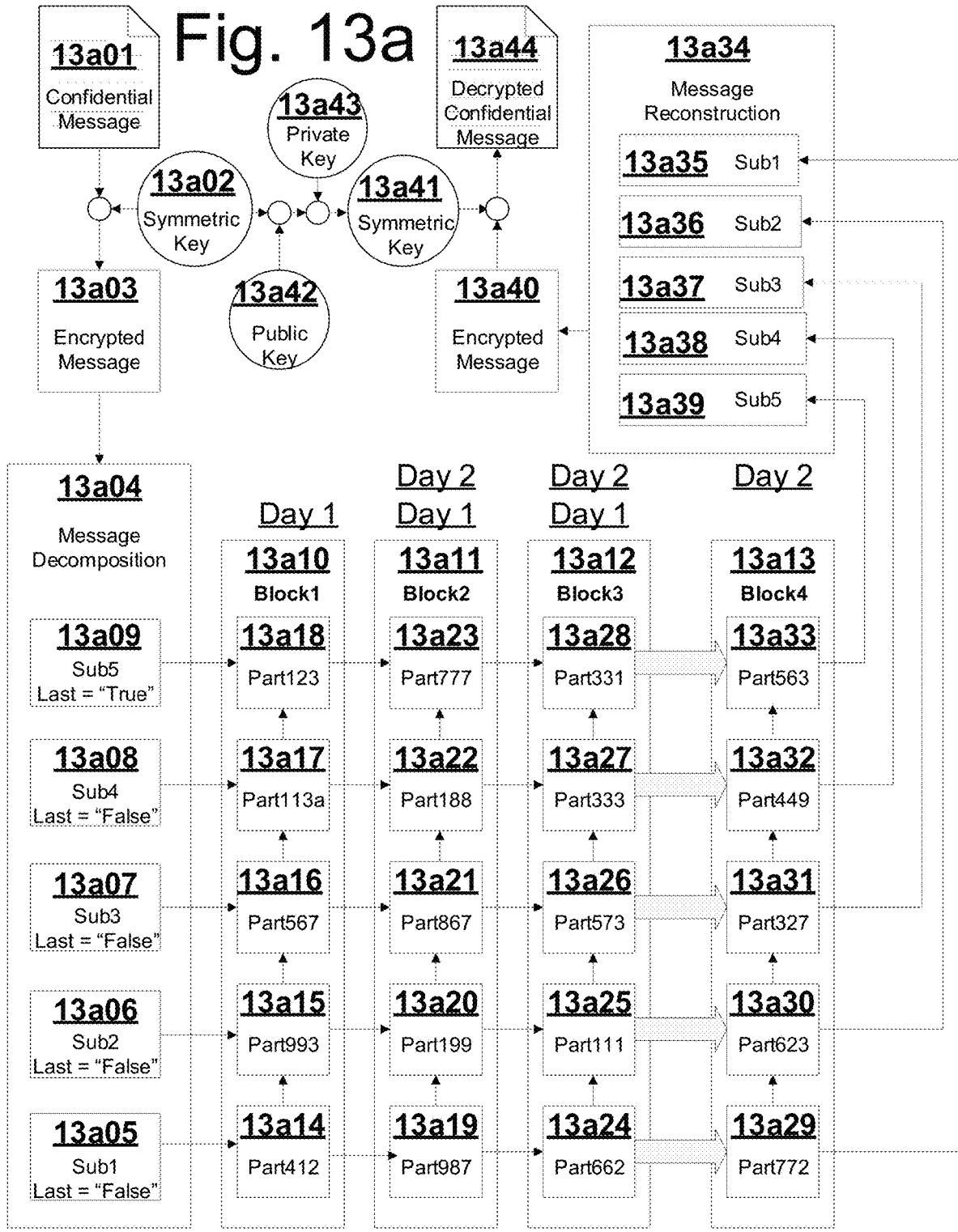
FIG. 13a illustrates a first embodiment of the high level authentication approach for logical partitions for the present invention.

FIG. 13 illustrates the unique solution that secures authentication information by encrypting that information, decomposing it into subcomponents then distributing those subcomponents across member computers. This works well when all of the member computers are mostly available for intercommunication. In an alternative embodiment of the present invention, FIG. 13 is replicated on a single computer by configuring its storage system as a plurality of independent, logical partitions. U.S. Pat. No. 8,271,545B2 teaches a method to partition databases. Each partition in a segmented database plays the role of a member computer, or more precisely a member computer's database, as illustrated in FIG. 13. This variation that leverages logical partitions within a single segmented database is illustrated in FIG. 13*a*. A secure authorization message 13*a*01 is encrypted using a symmetric key 13*a*02 to create an encrypted version of that secure authorization message 13*a*03. This information could be user authentication information. Just like in FIG. 13, FIG. 13*a* illustrates that the encrypted version of the secure authorization message, or messages, is decomposed into a plurality of subcomponents 13a04. This includes subcomponent 1 13a05, subcomponent 2 13a06, subcomponent 3 13a07, subcomponent 4 13a08, and subcomponent 5 13a09.

These subcomponents are then copied to a plurality of blocks comprised of independent partitions within the segmented database. For example, in FIG. 13a, block 1 13a10 is comprised of segmented database partition 123 (Part123) 13a18, partition 113a (Part 113a) 13a17, partition 567 (Part567) 13a16, partition 993 (Part993) 13a15 and partition 412 (Part412) 13a14. Each individual database partition such as partition 412 (Part412) 13a14 stores information about the next partition in sequence, in this case partition 993 (Part993) 13a15. This enables the message to be recomposed from the blocks. In addition, each database partition has its own independent access security and hardware level encryption just like the database for a separate independent computer. A hacker would have to hack into each individual database partition separately to reconstruct the message. This a substantial enhancement of data security over the prior art. Similar to FIG. 13, the encrypted subcomponents of the authorization message are also copied to the database partitions in block 2 13a11 and block 3 13a12. For example, in FIG. 13a, block 2 13a11 is comprised of segmented database partition 777 (Part777) 13a23, partition 188 (Part188) 13a22, partition 867 (Part867) 13a21, partition 199 (Part199) 13a20 and partition 987 (Part987) 13a19.

Figure 13B:
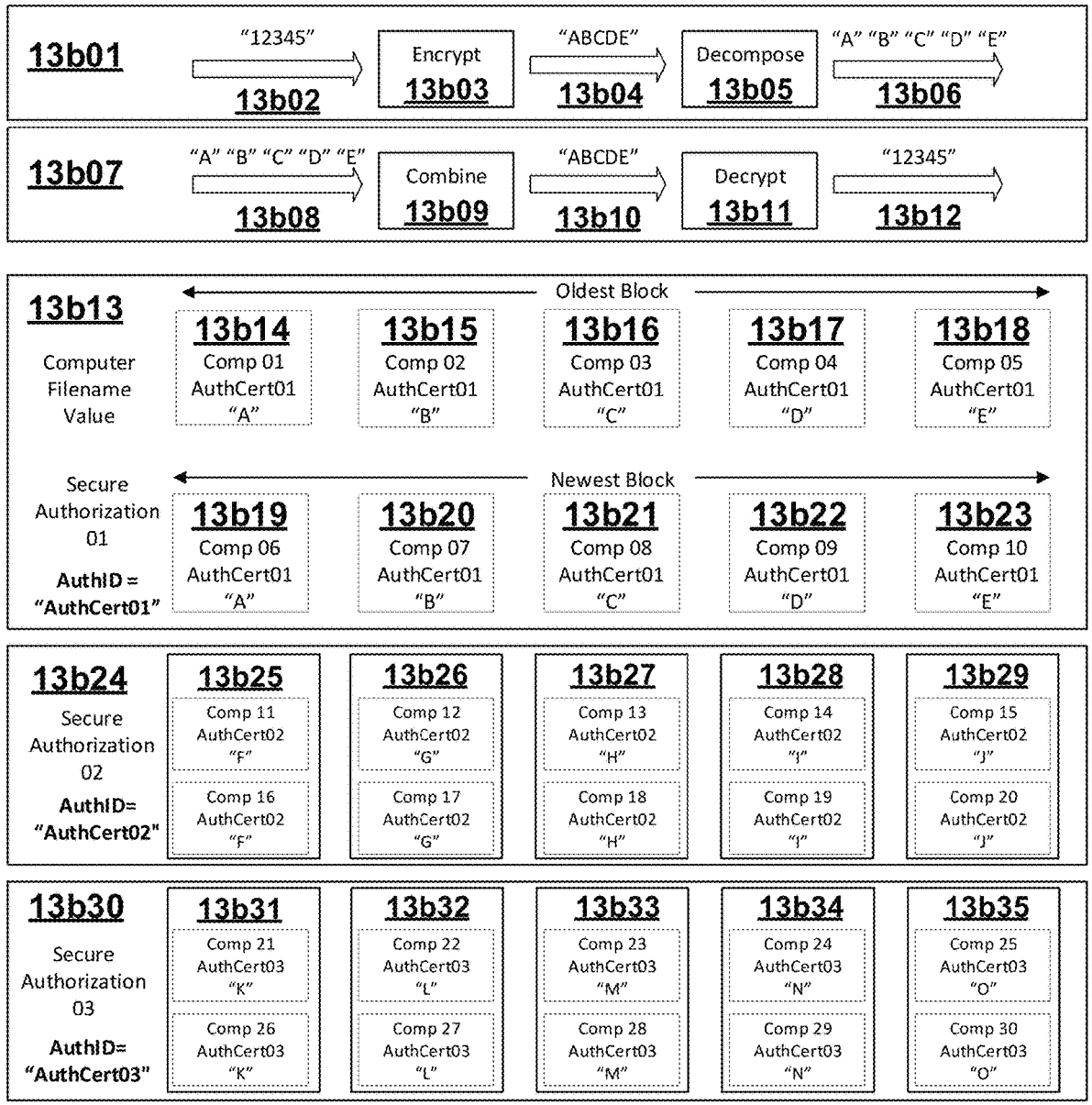
FIG. 13b illustrates the use of the authorization identifier as a file name for individual subcomponents.

Similarly, block 3 13a12 is comprised of segmented database partition 331 (Part331) 13a28, partition 333 (Part333) 13a27, partition 573 (Part573) 13a26, partition 111 (Part111) 13a25 and partition 662 (Part662) 13a24. After a period of time, e.g., on day 2 in the example illustrated FIG. 13a, the encrypted subcomponents are copied to the database partitions in block 4 13a13 and deleted from block 1 13a10. Block 4 13a13 is comprised of segmented database partition 563 (Part563) 13a33, partition 449 (Part449) 13a32, partition 327 (Part327) 13a31, partition 623 (Part623) 13a30 and partition (Part772) 13a29. This process of making a new copy of the subcomponents and deleting the oldest copy of the subcomponents is repeated over time to ensure the blocks in use move dynamically through the database partitions making it more difficult for a hacker to focus on hacking a specific database partition. The present invention uses the authorization identifier as a file name to write subcomponents to each partition and to read subcomponents from each partition. FIG. 13b explains this process in more detail. The present invention recombines the encrypted version of the authorization message from the newest copy of the subcomponents as illustrated in Block 13a34. This block is a reconstruction of subcomponent 1 13a35, subcomponent 2 13a36, subcomponent 3 13a37, subcomponent 4 13a38, and subcomponent 5 13a39.

The present invention enables an authenticated user to initiate this reconstruction process which combines the subcomponents into the encrypted version of the authorization message 13a40. The use can initiate this reconstruction process in many ways including by applying their biometric signature. After the subcomponents are reconstructed, the present invention applies the user's private key 13a43 to access the symmetric key 13a41 that is required to recover the authorization message 13a44. The private key must match the public key 13a42 that was used to encrypt the symmetric key 13a02. When a user registers their biometric signatures, the present invention issues a matching public key and private key for that user. The receiving user can use at least one of his biometric signatures that he previously registered with the present invention to initiate the reconstruction of the authorization message 13a34 from its subcomponents. This process makes a member computer that is isolated from the network of member computers much more difficult to hack. It also secures the database against physical theft of, or changes to, the authorization message. In FIG. 13a, the present invention enables the administrator user to adjust the number of subcomponents, which can be more of fewer than five. It also enables the administrator user to select the number of blocks, which can be more or fewer than three. It also enables the administrator user to adjust the dynamic time, to be longer or less than one day.

Computer level encryption and decomposition into linked subcomponents works in concert with partition level encryption and decomposition into linked subcomponents. In one embodiment of the present invention, a user can choose computer level enhanced security for a confidential message or partition level enhanced security depending on whether that user expects their computer to become disconnected from the network of member computers.

The present invention uses the authorization identifier as a file name. In the example illustrated in FIG. 13b, box 13b01, illustrates the encryption and decomposition of a secure authorization (e.g., confidential message), such as a password. In this example, the value of the password is "12345" 13b02. The present invention encrypts this password 13b03. For simplicity, let's assume the encrypted form is "ABCDE 13b04. The present invention decomposes 13b05 the encrypted secure authorization into five subcomponents. Again, for simplicity, let's assume these five subcomponents are "A". "B", "C", "D" and "E" 13b06. Box 13b07 illustrates that the present invention reconstructs or recombines 13b09 the decomposed subcomponents "A". "B", "C", "D" and "E" 13b08 into the encrypted version of the secure authorization "ABCDE 13b10. The present invention then decrypts 13b 11 the secure authorization into its original form "12345" 13b12.

Box 13b13 illustrates how the present invention uses the authorization identifier as a file name for each individual subcomponent and a distributed file name for the linked subcomponents that comprise an encrypted secure authorization. In this example, the value of the authorization identifier (e.g., "AuthID") is AuthCert01. Let's assume the first computer that is selected randomly by the present invention is computer 01 (e.g., "Comp 01"). In this example, the present invention uses the filename "AuthCert01" to write the first subcomponent "A" to computer 01 (e.g., "Comp 01") 13b14. The present invention then uses the same filename "AuthCert01" to write the second subcomponent "B" to computer 02 (e.g., "Comp 02") 13b15, wherein computer 02 (e.g., "Comp 02") is selected randomly by computer 01 (e.g., "Comp 01"). The present invention then uses the same filename "AuthCert01" to write the third subcomponent "C" to computer 03 (e.g., "Comp 03") 13b16, wherein Computer 03 is selected randomly by Computer 02. The present invention then uses the same filename "AuthCert01" to write the fourth subcomponent "D" to computer 04 (e.g., "Comp 04") 13b17, wherein Computer 04 is selected randomly by Computer 03. The present invention then uses the same filename "AuthCert01" to write the fourth subcomponent "E" to computer 05 (e.g., "Comp 05") 13b18, wherein Computer 05 is selected randomly by Computer 04. The present invention sets the LastSubcomponent Flag to "True" for Computer 05 but sets the LastSubcomponent Flag to "False" for Computer 04, Computer 03, Computer 02 and Computer 01. All of the computers in FIG. 13b are selected randomly from the plurality of member computers.

Periodically, the present invention creates a new block of subcomponents then deletes the oldest block. In the example, in block 13b13 the present invention uses the filename AuthCert01 to write the first subcomponent "A" to computer 06 (e.g., "Comp 06") 13b19, to write the second subcomponent "B" to computer 07 (e.g., "Comp 07") 13b20, to write the third subcomponent "C" to computer 08 (e.g., "Comp 08") 13b21, to write the fourth subcomponent "D" to computer 09 (e.g., "Comp 09") 13b22, and to write the fifth subcomponent "E" to computer 10 (e.g., "Comp 10") 13b23.

The present invention enables the same user to store a second secure authorization (e.g., "Secure Authorization 02") as illustrated in box 13b24. In this example, the value of the authorization identifier is "AuthCert02". The present invention uses the filename "AuthCert02" to write the first subcomponent, of the second secure authorization, "F", to computer 11 (e.g., "Comp 11"), then periodically to computer 16 (e.g., "Comp 16") 13b25. The present invention also uses the same filename "AuthCert02" to write the second subcomponent, of the second secure authorization, "G", to computer 12 (e.g., "Comp 12"), then periodically to computer 17 (e.g., "Comp 17") 13b26. The present invention also uses the same filename "AuthCert02" to write the third subcomponent, of the second secure authorization, "G", to computer 13 (e.g., "Comp 13"), then periodically to computer 18 (e.g., "Comp 18") 13b27. The present invention also uses the same filename "AuthCert02" to write the fourth subcomponent, of the second secure authorization, "H", to computer 14 (e.g., "Comp 14"), then periodically to computer 19 (e.g., "Comp 19") 13b28. The present invention also uses the same filename "AuthCert02" to write the fifth subcomponent, of the second secure authorization, "I", to computer 15 (e.g., "Comp 15"), then periodically to computer 20 (e.g., "Comp 20") 13b29.

The present invention enables the same user to store a third secure authorization (e.g., "Secure Authorization 03") as illustrated in box 13b30. In this example, the value of the authorization identifier is "AuthCert03". The present invention uses the filename "AuthCert03" to write the first subcomponent, of the third secure authorization, "K", to computer 21 (e.g., "Comp 21"), then periodically to computer 26 (e.g., "Comp 26") 13b31. The present invention also uses the same filename "AuthCert03" to write the second subcomponent, of the third secure authorization, "L", to computer 22 (e.g., "Comp 22"), then periodically to computer 27 (e.g., "Comp 27") 13b32. The present invention also uses the same filename "AuthCert03" to write the third subcomponent, of the third secure authorization, "M", to computer 23 (e.g., "Comp 23"), then periodically to computer 28 (e.g., "Comp 28") 13b33. The present invention also uses the same filename "AuthCert03" to write the fourth subcomponent, of the third secure authorization, "N", to computer 24 (e.g., "Comp 24"), then periodically to computer 29 (e.g., "Comp 29") 13b34. The present invention also uses the same filename "AuthCert03" to write the fifth subcomponent, of the third secure authorization, "O", to computer 25 (e.g., "Comp 25"), then periodically to computer 30 (e.g., "Comp 30") 13b35.

The example in FIG. 13b illustrates that the present invention can store a plurality of secure authorizations for each user in an encrypted dynamic distributed decomposed database. The present invention uses the authorization identifier is a file name for each individual subcomponent, as a distributed file name for linked subcomponents and as a reference identifier for each record in the database of secure authorizations.

Each member computer includes an operating system. Standard operating systems like Windows, Linux and UNIX include a file system. A file system or filesystem, controls how data is stored and retrieved. U.S. Pat. No. 8,156,090 B1 Curles Apr. 10, 2012 teaches "a computer system comprises an operating system that provides a file system for storage of objects . . . the compile manager automatically creates the repository within the file system with a unique file name based at least in part on an object name". See the Abstract. The file system provided by the operating system enables a user to use a file name to save and retrieve files from memory and storage devices. The present invention transforms a conventional file system, provided by a conventional operating system, into a distributed database that relocates confidential messages randomly and dynamically among a plurality of member computers to prevent robo hacking of critical information. The problem solved is computer vulnerability to hacking. The solution is therefore rooted in computer technology rather than being a computer implementation of human behavior. Robo hacking does not apply to human memory. In addition, this solution is a technological improvement over convention computer file systems that are vulnerable to robo hacking devices. It converts a standard static file system into a dynamic randomized distributed database that prevents hackers from locating confidential messages.

Each client organization can use their own naming convention for the authorization identifier. For example, a first organization may have a first user, named John Smith. John Smith can use a confidential message as a password to login to a system, such as a website or enterprise system. John Smith may have a unique ID such as an email address like John_Smith_22@xyz.org. John Smith may have created a password to access the ABC document management system on Jun. 21, 2016 at 2:20 pm (14:20 PDT). In this example, a client can configure the present invention to create the following file name to store a password for John Smith that will enable access to the document management system Org0001_AuthID_Pword_JohnSmith_22_xyz.org_ABC_Doc_Man_2016_06_21_1 The present invention will store that file name in the authorization identifier. If the same user creates another password on the next day at 3:36 pm (Jun. 22, 2016 at 15:36 PDT) to access the same system then the authorization identifier will be Org0001_AuthID_Pword_JohnSmith_22_xyz.org_ABC_Doc_Man_2016_06_22_1 5_36_PDT_0002_sub0001. The date and time component of the file name has changed. The client can configure the present invention to construct the authorization identifier based on the system access specified by the user. In this case, "Org0001" indicates client organization and the "AuthID_Pword" indicates that this authorization identifier is a password. The next component of the authorization identifier "JohnSmith_22_xyz.org" indicates that this password is used by John Smith. The next component of the authorization identifier "ABC_Doc_Man" indicates that this is the user's password to access the ABC Document Management system. The next component of the authorization identifier indicates the date and time that John Smith created the password "2016_06_22_15_36_PDT". The next component of the authorization identifier "0002" indicates that this is the second password that has been setup for John Smith to access the ABC Document Management system. The last component of the filename shown above "sub0001" indicates the subcomponent of the decomposed confidential message. This last component is not included in the authorization identifier. This naming convention is exemplary. Each client can specify their own naming convention after the organization component (Org0001). One of ordinary skill in the art will recognize that the present invention can use the authorization identifier to support many other possible naming conventions. Moreover, the present invention can store the meta data, such as the date and time or user ID, in a lookup table rather than configuring it into the file name. Also, the present invention can use different meta data to construct the authorization identifier. For example, instead of including the user's name in the authorization identifier, a unique reference ID can be used for each user. In this case, if a user changes her name the reference ID will remain the same so the name change will not impact the authorization identifier.

For additional security, the present invention can be configured to recover the password, or other confidential message, from multiple blocks. For example, in FIG. 13, the present invention can recover the password from each of Block2, Block3 and Block4 then compare the outputs. They should all be the same "ABCDE". However, if the output from one block is corrupted then two out of three will be correct which would enable the system to overcome the corruption by using the predominant decrypted value for the password or by retrying until all decrypted values are the same. If a client wants to protect against permanent corruption then that client can configure the present invention to use the predominant value. If a client wants to protect against corruption caused by intermittent transmission errors then that client can configure the present invention to use the retry option.

The present invention also enables a first user to send a confidential message to a second user. For example, if the first user wants to send bitcoin, or a stable coin, to a second user, the first user can input the blockchain address for that stable coin into the present invention's warm storage distributed database. The first user can send the authorization identifier to the second user securely. For example, the first user's computer can use the second user's public cryptographic encryption key to encrypt the authorization identifier then the second user's computer can use the second user's private cryptographic encryption key to decrypt the authorization identifier.

The present invention also enables a first user to present a confidential message to a second user. A third user can authenticate the confidential message then store the confidential message in the warm storage distributed database with an authenticated signature. A second user can then access the confidential message and validate that the confidential message has been authenticated by the third user. For example, the first user may have a birth certificate, or a University Degree, or a citizenship certification, or a social security number, or some other official document. A second user may be a potential employer, for example, who wants access to a validated version of the official document. The first user will take the official document to a third user who is a validation authority, such as a notary public. That third user will validate the official document then upload an electronic version as a confidential message to the warm storage distributed database. In this case, the present invention uses the third user's (e.g., notary public) private encryption key to encrypt the confidential message 1301. The first user (e.g., job candidate) will send the authorization identifier and the third user's (e.g., notary public) public encryption key to the second user (e.g., employer). The second user will use the authorization identifier to reconstruct then decrypt the university degree. In this embodiment, the present invention performs an additional function at step 1301 in FIG. 13 where the confidential message is encrypted by the third user's private encryption key. Consequently, at step 1344 in FIG. 13, the present invention will use the third user's public encryption key to decrypt the first user's university degree. Since the confidential message is encrypted by the third user's private encryption key, the second user knows that the university degree has been validated and signed cryptographically by the notary public.

When the computers depicted in FIG. 13 communicate with each other they use service accounts. Patent U.S. Pat. No. 10,044,756B2 discloses a method that enables computers to interoperate via a public cloud. This is a standard concept that is used by internet computers, blockchain computers and enterprise computers to interoperate over pubic networks. To secure the communication channel between any two member computers, the source member computer can use the public cryptographic encryption key of the destination member computer to encrypt the transmission. The destination member computer then uses its private cryptographic encryption key to decrypt the incoming information.

A first user can use a biometric signature to initiate the process to enter confidential information into the warm storage distributed database taught herein. First the user must register each biometric signature with the present invention, such as fingerprints, retina scans and voice prints. US patent application US 2019/0013931 A1 Benini teaches a biometric solution that meets the biometric requirements of the present invention. Benini teaches the comparison of biometric templates to verify the identity of a user (see the detailed description on page 2). When the first user navigates to a website or an enterprise system, such as a document management system, that system displays its login page. The first user can use a device, such as a fingerprint reader, to enter a biometric signature. The present invention will verify the biometric signature against the registered biometric signature for the first user then locate the password in the warm storage distributed database then login the user into to the document management system. The user must also enable biometric login for that system, such as a document management system. This enables a user to log into the document management system from any device by using his registered biometric signature to retrieve the secure password from the warm storage distributed database taught herein.

Also a first user can register at least one biometric signature in the present invention. Similarly, a second user can register at least one biometric signature with the present invention. The first user can then use a biometric signature to initiate the storage of a confidential message, such as a blockchain address for bitcoin, stable coin, or other currency, in the warm storage distributed database taught herein. In FIG. 13, the present invention will use the second user's public key 1341 and private key 1342 in the encryption and decryption process for the confidential message (e.g., blockchain address for a stable coin). The present invention also enables the first user to encrypt the authorization identifier, send it to the second user then the present invention enables the second user to decrypt the authorization identifier. The present invention then enables the second user to use a pre-registered biometric signature to initiate the decryption of the confidential message (e.g., blockchain address for bitcoin). This enables the second user to access and spend the currency associated with that blockchain address. For security purposes, the user should not use that bitcoin address again. The most secure approach is to create a new bitcoin address and repeat the process. To one skilled in the art, it will be evident that this enhanced security process has applications beyond crypto currency authentication to include any application where an authentication code, or critical data string, or other confidential message, requires enhanced security.

Figure 14:
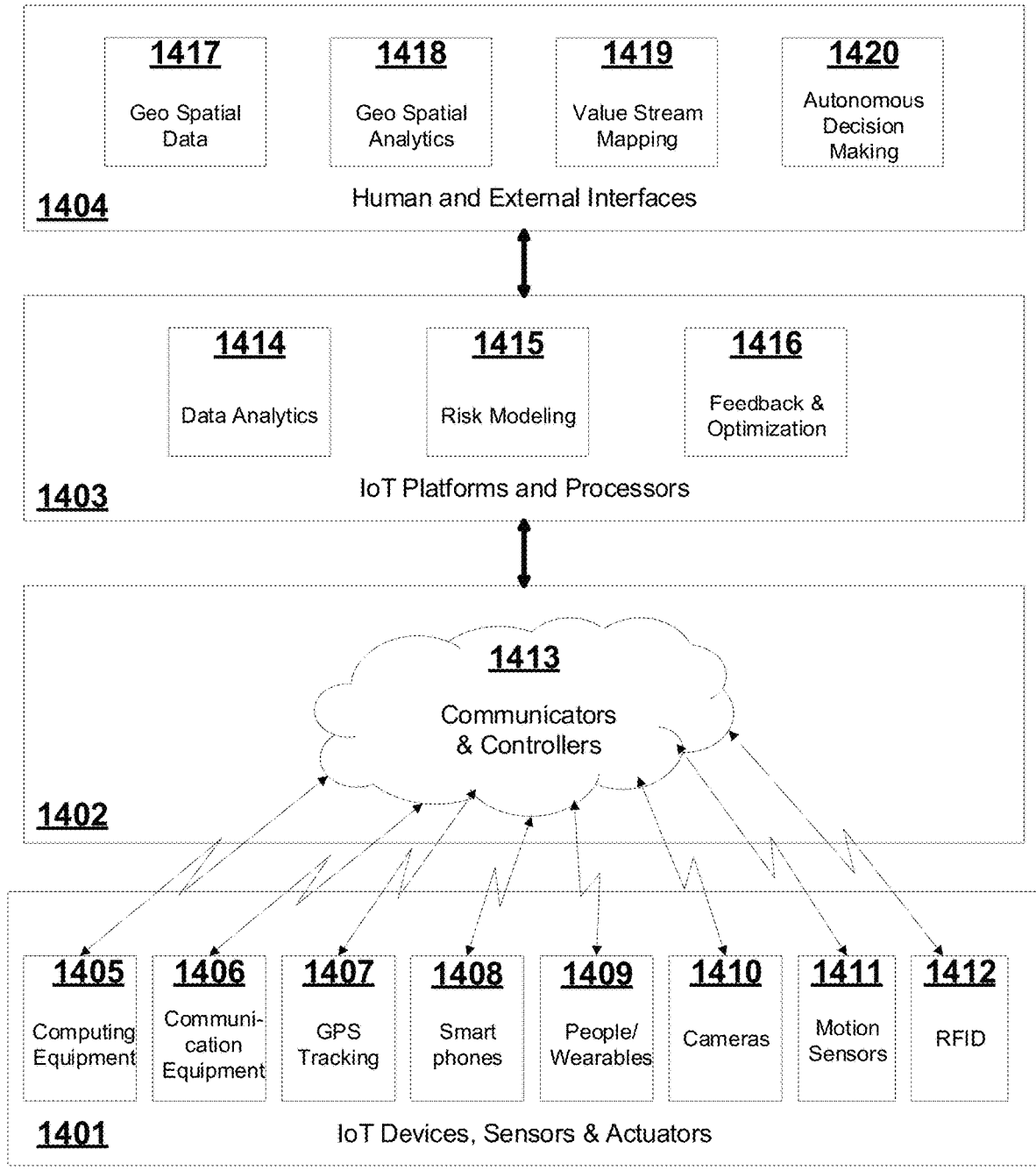
FIG. 14 illustrates a first embodiment of the internet of things system for the present invention.
Figure 15:
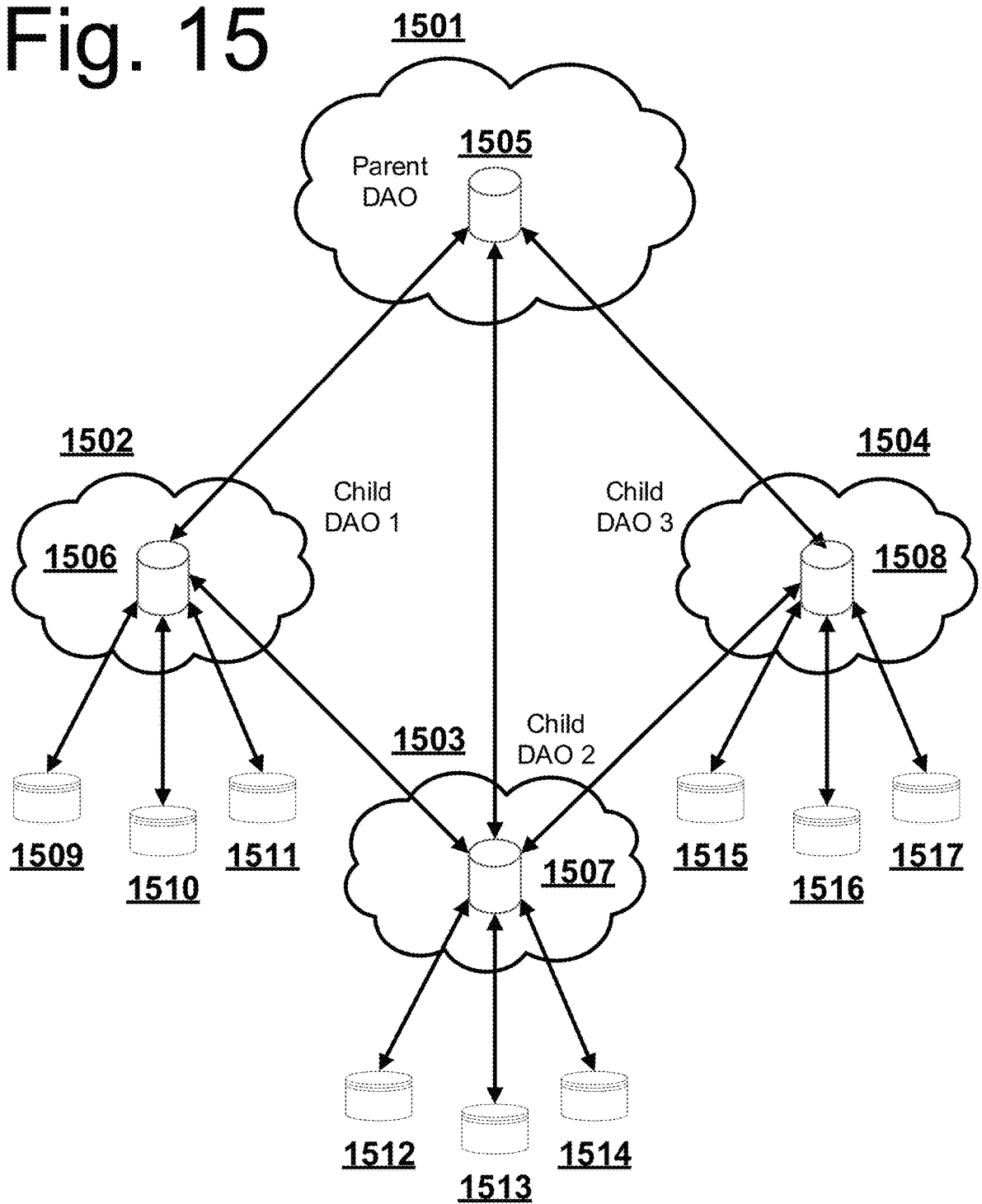
FIG. 15 illustrates a first embodiment of the parent-child configuration of the decentralized autonomous organization for the present invention.

FIG. 14 illustrates the internet of things architecture for a first embodiment of the apparatus and method of the present invention.

The Internet of Things (IoT) is a fairly nascent technology enabled by the convergence of data, connectivity and analytics. The objective is to deliver the right data, at the right time, to the right people to drive the right business outcomes. In the case of a decentralized autonomous organization, like the present invention, the objective is to deliver the right data, at the right time, to the right systems to automate the right business actions. The IoT is the connection of objects such as computing machines, embedded devices, equipment, appliances, and sensors to the Internet for access, processing and decision making by analytical tools and management. The technology involves connecting devices and equipment based on radio frequency identification devices (RFID) and sensor technologies.

The present invention uses the IoT to automate the maintenance and operations of equipment and transition from preventive to predictive maintenance.

In a first embodiment of the present invention, IoT devices 1401 include sensors that capture data from their surroundings and IoT actuators that initiate actions in their surroundings, such as control mechanical and electronic devices. The IoT automatically receives and transfers this data over a network of communicators and controllers 1402 without requiring human intervention. This data is transformed into useful information by the IoT platforms and processors 1403. The human and external interfaces 1404 layer, transforms this IoT information into knowledge to support decision making and autonomous actions. This data management and analytics infrastructure provides a number of benefits including predictive maintenance and automated decision support.

The IoT devices 1401 enable remote monitoring of operations which helps to optimize efficiency, improve safety, decrease variability and reveal performance issues. For example, IoT sensors are used to monitor the computing equipment 1405 and communication equipment 1406 that comprise the present invention. As equipment performance indicators move toward the outer range of their acceptable limits, the system generates alerts. For example, a computer processor may be performing slower than expected or memory usage may be exceeding design guidelines. These types of alerts indicate a requirement for proactive maintenance which can be provided under the service provider model described in FIG. 1*b*. Predictive analytics enable the present invention to predict failures before they occur. This enables spare parts to be ordered well in advance which avoids downtime and express shipping costs. IoT sensors are also available to monitor the location of a user's assets through GPS tracking 1407, a user's smart phone 1408, and a user's wearable devices 1409. Wearable devices help monitor a user's vital signs for health purposes and their location for security purposes. A lender user can also use IoT devices to capture information from security cameras 1410 and motion detectors 1411. This further enhances security for their businesses. The broad range of IoT devices in FIG. 14 is exemplary and should not be considered as limiting. However, they help each lender user better manage his or her collateral and business assets.

Radio frequency identification ("RFID") 1412 is the identification technology for IoT sensors and actuators. Each device has a unique RFID that enables the IoT network to distinguish it.

The IoT communicators and controllers 1402 include a plurality of networks including, satellite, ethernet, wireless area network, personal area network and the global system for mobile radio. In a preferred embodiment of the present invention, the key components of the IoT communicators and controllers layer include, IoT Routers, IoT gateways and IoT switches.

Each IoT gateway is a physical device and software program that serves as the connection point between the cloud and the plurality of controllers, sensors and intelligent devices. In a first embodiment of the present invention, each gateway transfers and interprets data between IoT systems. These gateways, also known as protocol converters, use encryption to increase network security. They also aggregate, summarize and analyze data at the edge of the cloud. This functionality minimizes the volume of data that is transferred to the cloud. Reducing the data in the cloud improves network response times and reduces network transmission costs.

IoT routers are similar to gateways. However, in the present invention, routers provide an interface between two dissimilar networks. The IoT routers enable network level interoperability whereas the IoT gateways are used as a bridge between similar networks. Moreover, the IoT routers are network layer devices that route data packets based on their IP addresses. They interconnect LANs and WANs.

Conversely, the present invention uses a plurality of IoT switches in the data link layer to perform error checking before forwarding any data. Each IoT switch is a multi-port bridge with a buffer that improves performance.

The IoT platforms and processors 1403 filter the large volumes of raw data into critical data then transforms this critical data into useful information. The data analytics module 1414 examines these IoT data sets then draws conclusions about the information they contain. This helps users make more-informed business decisions often by verifying or disproving models, theories and hypotheses. Data analytics methodologies include exploratory data analysis (EDA), which aims to find patterns and relationships in data, and confirmatory data analysis (CDA), which applies statistical techniques to determine whether a hypothesis about a data set is true or false. The present invention also separates data analytics into quantitative data analysis and qualitative data analysis. The former involves analysis of numerical data with quantifiable variables that can be compared or measured statistically. The qualitative approach is more interpretive and focuses on understanding the content of non-numerical data like text, images, audio and video, including common phrases, themes and points of view. The present invention also supports more advanced types of data analytics including data mining, which involves sorting through large data sets to identify trends, patterns and relationships; predictive analytics, which seeks to predict user behavior, equipment failures and other future events; and machine learning, which is an artificial intelligence technique that uses automated algorithms to churn through data sets more quickly than data scientists can do via conventional analytical modeling. The present invention uses big data analytics to apply data mining, predictive analytics and machine learning tools to sets of big data that often contain unstructured and semi-structured data. In general, data analytics initiatives help increase revenues, improve operational efficiency, optimize marketing campaigns and customer service efforts, respond more quickly to emerging market trends and gain a competitive edge. The risk modeling module 1415 examines a number of uncertain factors to predict the likelihood of each possible outcome. For example, there is uncertainty about whether each venture capital fund user will repay their loan and release the collateral back to the lender. This will lead to uncertain reserves to fund investments. In this case, a service provider user can use the risk modeling module 1415 to estimate the value of each investment and the share price of a venture capital fund to determine the repayment probability for the collateral.

The feedback and optimization module 1416 collects and interprets data, then applies models to gain insight before making actionable recommendations that improve collateral repayment probabilities and equipment failure probabilities. The results are measured by the IoT sensors and then fed back into the feedback and optimization module 1416. This is a continuous improvement process aimed at optimizing a specific goal for the micro loan operations, such as return on investment.

The IoT processors also use encryption techniques to secure the data. The key components include, data processing, device configuration, data analytics, risk modeling, optimization via feedback loops, data security and SCADA. Features include, automated enrollment and provisioning of gateways and endpoints, over-the-air lifecycle management, dynamic and customizable dashboards, device inventory, configuration management, network management for constrained bandwidth, network troubleshooting, Role Based Access Control ("RBAC") user management, rich APIs for integration with third party applications, active monitoring and alerts for critical events, real-time location tracking of assets and geofencing, and rich Geographic Information System ("GIS") map overlays. Geofencing creates a virtual geographic boundary around the area covered by the decentralized autonomous organization, using GPS and RFID technology. The present invention uses a specific commercial off the shelf solution that includes the features listed above. However, the present invention can use any one of a plurality of commercial off the shelf solution options including, Cisco IoT Field Network Director, Ericsson IoT Accelerator and the Pelion IoT Platform from Arm. Other options include SymBot® from Symboticware, which is a monitoring and data solution that delivers standardized information-based technology that enhances the productivity, safety and efficiency of mobile and fixed assets. Synertrex® technology collects critical data to provide operators with insight into equipment functionality.

The IoT human and external interfaces 1404 use intelligent computing technologies such as cloud computing, fuzzy recognition, data mining and semantic. This enables integrated remote-control centers, promotes compliance with safety and environmental regulations, and facilitates management decision making.

The geospatial data module 1417 intelligently and automatically transforms geographic data into information and then synthesizes geographic knowledge. The goal is to extract useful information from massive amounts of data to support decision-making. The geospatial data module extracts new, insightful information embedded within large heterogeneous databases to formulate knowledge. The process for knowledge discovery in databases includes data warehousing, target data selection, data cleansing, preprocessing, transformation and reduction, data mining, model selection, evaluation and interpretation, and then consolidation and use of the extracted knowledge. The geospatial analytics module 1418 is designed to gather, display, and manipulate imagery, GPS, satellite photography and historical data. It describes this data explicitly in terms of geographic coordinates or implicitly, in terms of a street address and postal code, or forest stand identifier. The geospatial analytics module applies this data to geographic models. Spatial analysis allows users to solve complex location-oriented problems and better understand where and what is occurring. In the present invention, spatial analysis lends new perspectives to decision-making. It uses statistical analysis to help borrower users determine if visual patterns are significant. This spatial analysis also helps users determine relationships, understand and describe locations and events, detect and quantify patterns, make predictions and find the best locations and paths. Although the present invention uses a specific commercial off the shelf geospatial information system, for geospatial data and geospatial analytics, any one of a number of commercial off the shelf geospatial information systems can meet the needs of the present invention, such as Simple GIS Software, ArcGIS and QGIS. The value stream mapping module 1419 is designed to transform geospatial knowledge into a story, or journey map. For example, a story may explain the motion patterns of workers or equipment over time. This helps borrower users optimize supply and distribution paths to facilitate the free flow of workers, equipment and other assets. This increases efficiency, reduces costs and can also increase revenues. Patent application US 2008/0195433 A1 teaches value stream mapping. Although the present invention uses a specific commercial off the shelf IoT value mapping solution, any one of a number of commercial off the shelf platforms can meet the needs of the present invention, such as SmartDraw, LucidChart and eDraw. The value stream maps are the optimal paths that maximize return on investment. The autonomous decision-making module 1420 assesses the optimal value stream maps then decides the optimal value stream for each inventory asset to navigate.

The IoT infrastructure is a practical integration of the present invention with IoT devices that enhances decision making for borrower users who can run their businesses more efficiently and more effectively which increases repayment rates. This practical integration of the present invention with IoT devices also helps eliminate human intervention in the management of the decentralized autonomous organization by automatically monitoring performance of the infrastructure then proactively initiating maintenance and service activities that improve performance and avoid the failure of components that comprise the infrastructure. The benefits include higher collateral loan repayment probabilities and lower equipment failure probabilities which improves return on investment and makes more money available for more micro loans. Also, the IoT routers enable the interconnection of different decentralized autonomous organizations. This enables a plurality of decentralized autonomous organizations to be managed automatically in order to leverage economies of scale. Also, this IoT infrastructure enables a parent decentralized autonomous organization to be configured to manage the plurality of inter-connected decentralized autonomous organizations.

Referring back to FIG. 1, which illustrates a high-level summary of the preferred embodiment of the present invention, the following is a summary of how the key components of the present invention enable its functionality.

When setting up a new decentralized autonomous organization, the workflow &, document management system 224 (also "document management system" or "workflow management system") is used to document a number of agreements including the terms and conditions, the privacy policy, and the initial contracts. Also, the business intelligence system is configured to enable a number of default business rules. For example, how long a user must be active on the platform before they can apply for an investment, the number of approval votes required to approve each type of investment, which system features can be accessed with single factor authentication, which features can be accessed with two factor authentication, which features can be accessed with three factor authentication, the requirements to qualify for each type of investment, the information required for each type of investment application, the information that will be displayed to users for each type of investment application, the qualifications required for each role, the algorithm to calculate a system credit score, the conditions that must be met to close an investment, the qualifications to be an arbitrator user, the qualifications to be a reviewer user and the qualifications to be a service provider user.

The workflow &, document management system is also used to list all relevant jurisdictions that may impact an investment and also list the laws, regulations, moral obligations and policies that apply to each type of investment and to each jurisdiction. These jurisdictions include continents, countries, states, counties, cities, towns, villages and other municipalities as well as other supranational, national, regional and local jurisdictions. These lists are accessible by the CCS 201 which is operatively coupled to the document management system. The other systems, that comprise the present invention, such as the business intelligence system, also have access to this information via the CCS. The payment processor system 218 captures the initial pool of funds (e.g., the initial investment) into an account for the decentralized autonomous organization.

The CCS enables new users to request access to the system 101. The CCS enables the authentication process for users 102. The CCS also enables the authorization process for users, which determines the features they can access 102. The CCS also enables users to setup a user profile 103 and login to the system 104. The CCS enables each user to update their user profile during subsequent log ins. Each time the user logs in, the CCS re-authenticates and re-authorizes the user 105.

The workflow management system executes the process to determine which users are qualified to submit a request for an investment. When a user sets up their profile, the CCS allows the user to input their qualifications that match each type of investment. The workflow management system compares the predetermined requirements for each type of investment with the qualifications that are listed in the profile of the entrepreneur. The workflow management system ensures that each user can only see and select the investments for which he or she is qualified.

The CCS authenticates users to grant them access to the system and then controls their access to the system's functionality. The CCS only authorizes authenticated users to access the features that they are entitled to use. For example, the initial reviewers are configured as reviewers in their profile. The CCS authorizes these reviewer users to access reviewer features. Similarly, initial arbitrator users are configured as arbitrator users in their profile. The CCS authorizes these arbitrator users to access arbitrator features. The CCS also authorizes service provider users to access services provider features and authorizes reviewer users to access reviewer features. This list is exemplary and is not intended to be limiting. Overtime, the initial reviewers and arbitrators will be replaced by users who acquire the skills, knowledge and community standing to receive sufficient votes from existing reviewers and arbitrators to be elected to these roles. This enables the system to be managed by its users with a self-sustaining organizational structure. One skilled in the art will recognize that the CCS grants authenticated users access to the system features that those authenticated users require to perform the roles configured in their user profile. In one embodiment of the present inventions, the CCS enables the system administrator to specify which features require low-level authorization, medium level authorization and high-level authorization. The CCS then allows the system administrator to assign single-factor authentication to low-level features, two-factor authentication to medium-level features, and three-factor authentication to high-level features.

Users can store their confidential information, including authentication and authorization information for users and payment, in a secure decentralized, distributed, encrypted, decomposed and dynamic database described in FIG. 13. In one embodiment of the present invention users input a biometric signature to initiate the storage and retrieval of their confidential information in the secure decentralized, distributed, encrypted, decomposed and dynamic database.

The workflow management system qualifies the collateral provider users who are permitted to submit collateral to the venture capital fund 106. The workflow management system compares a plurality of business rules, that are configured in the business intelligence system 222, with the qualifications of the collateral provider user, that are entered in that user's profile. This comparison enables the workflow management system to determine which collateral provider users are qualified to submit collateral.

The workflow management system enables a collateral provider (lender) user to submit collateral 107. The workflow management system captures the lender user's electronic signature on the loan terms when it is submitted by the lender user. The workflow management system also enables the system to receive and validate 108 the loan offer. The workflow management system inter-operates with the CCS, the document management system and the business intelligence system to validate each loan offer. This includes qualifying the collateral and qualifying that the application complies with a predetermined list of legal, regulatory, moral and policy guidelines. The CCS also qualifies the custodian user who provides a custody service for the collateral 109. The token system 219 enables the stable coins to be created 110. The workflow management system and the CCS enables companies to be notified that investment funds are available 111. And also enable companies to request an investment 112.

The workflow management system and the CCS interoperate to process each investment request 113. The workflow management system enables each approver user to vote on whether or not to approve each investment 114. The workflow management system receives the votes and inter operates with the CCS, the business intelligence system and the document management system to apply the consensus rules 115. The workflow management system validates the decision 116 and it automates the approval or rejection of the investment request.

The workflow management system interoperates with the payment processor system and the smart contract system to disburse the stable coins 117 to the company as the investment. The workflow management system interoperates with the Token Exchange 220 to receive shares in the company 118 for the venture capital fund in return for the investment. The workflow management system also interoperates with the Token Exchange to enable the company to sell stable coins (tokens) or use stable coins to buy goods and services 119. The workflow management system also interoperates with the payment processor system and the smart contract system to enable service providers to receive stable coins as payment for their goods and services 120. The workflow management system interoperates with the Token Exchange to enable each token holder to exchange their stable coins for shares in the venture capital fund 121 then receive stable coins from the service provider then issue venture capital shares to the service provider 122. The workflow management system interoperates with the CCS, to enable the collateral to be returned to the collateral provider 123 after all of the stable coins underwritten by that collateral have been returned to the venture capital fund. The workflow management system interoperates with the CCS to enable the collateral provider to confirm receipt of the collateral 124.

When the system requires an action by a user, the workflow management system generates an event. This event triggers an alert in the notification management system 225 which sends a non-confidential notification to the public email address of target user. This first notification notifies the target user that they have a second message in their secure email address. The workflow management system also sends a corresponding confidential message to the secure email address of each target user. This secure message includes the confidential details of the communication.

Referring back to FIG. 1*a*, which is an overview of the arbitration process for the decentralized autonomous organization, the following is a summary of how the key components of the present invention enables this functionality.

The arbitration process starts when a requestor user submits a change request 101*a* that is optionally initiated by a dispute that requires a ruling by an arbitrator. The workflow management system enables a requestor user to submit a change request that includes the requestor user's preferred resolution to the dispute. The CCS receives the change request 102*a* via the workflow management system. This is the main method to distribute the change request 103*a* to the expert users. However, this event also triggers the notification management system to send a notification message to the public email address of each expert user and also send a confidential message to the secure email address of each expert user. The confidential message includes the change request. The workflow management system enables each expert user to review the change request 104*a*. The secure email system also enables each expert user to review the change request in the secure email system. The role of the expert user is to agree a response. The workflow management system enables the lead expert user to submit feedback and a counter offer 105*a*. The workflow management system inter-operates with the CCS and document management system to receive this feedback and combine it with the change request 106*a*.

The workflow management system then distributes these documents as a case to the arbitrator users 107*a*. The workflow management system inter-operates with the CCS to distribute the change request 107*a* to the arbitrator users. However, this event also triggers the notification management system to send a notification message to the public email address of each arbitrator user and also send a confidential message to the secure email address of each arbitrator user. The confidential message includes the case documents. The workflow management system enables the arbitrator users to assess the case documents and determine options 108*a*. The secure email system enables each arbitrator user to review the case documents in the secure email system. The role of the arbitrator users is to present the options to the impacted users and recommend a solution. The workflow management system enables the arbitrator users to agree a response. The workflow management system, the messaging system 226 and the forum system 227 enable the lead arbitrator user to negotiate the options with the impacted users 109*a* then agree options 110*a*. The workflow management system enables the arbitrator users to vote on and submit the agreed options 111*a* and final recommended option, which is the arbitration ruling. The workflow management system inter-operates with the CCS, the business intelligence system and the document management system to receive and validate the impact of the arbitration ruling 112*a* in order to ensure the resultant changes comply with all relevant predetermined rules configured in the business intelligence system.

The workflow management system inter-operates with the CCS to display the arbitration ruling 113*a*. This creates an event that also causes the workflow management system to inter-operate with the CCS, the notification management system and the secure email system to notify the impacted users 114*a* by sending a non-confidential message to the public email address of each impacted user and also by sending a confidential message to the secure email address of each impacted user. The workflow management system then ratifies the decision 114*a* by inter-operating with the CCS and other components of the present invention to implement the changes.

For approved arbitrator rulings, any change required is implemented by a selected service provider user as described in FIG. 1*b*.

Referring back to FIG. 1*b*, which is an overview of the maintenance process for the decentralized autonomous organization, the following is a summary of how the key components of the present invention enables this functionality.

The maintenance process starts when a requestor user drafts and submits a service request 101*b*, which may be initiated by an arbitration ruling. The workflow management system receives that service request 102*b*. The workflow management system then distributes this service request to the reviewer users 103*b*. The workflow management system inter-operates with the CCS to display this information.

However, this event also triggers the notification management system to send a notification message to the public email address of each reviewer user and also send a confidential message to the secure email address of each reviewer user. The confidential message includes the service request. The workflow management system enables each reviewer user to review and approve the service request 104*b*. The secure email system enables each reviewer user to review and approve the service request in the secure email system. The role of the reviewer users is to create and submit a proposal 105*b* for the approved service request. The workflow management system inter-operates with the CCS to receive the proposal 106*b* then publish the proposal 107*b*. This event triggers the notification management system and secure email system to send a non-confidential notification to the public email address of each eligible service provider and a confidential email to the secure email address of each eligible service provider. The confidential email contains the proposal. Each eligible service provider can review the proposal 108*b* and submit a bid 109*b*. The workflow management system inter-operates with the CCS to receive 110*b* the bid and also enables a service provider to submit the bid.

The workflow management system then distributes the bid to the reviewer users 111b. The workflow management system inter-operates with the CCS to display this information. This event also triggers the notification management system to send a non-confidential notification message to the public email address of each of the reviewer users and also send a confidential message to the secure email address of each of the reviewer users. The confidential message includes the bid. The workflow management system enables the reviewer users to assess each bid 112b then score each bid and submit a recommendation 113b. The workflow management system inter-operates with the CCS to receive the scores and recommendation 114b.

The workflow management system then distributes the recommendations to the approver users 115b. The workflow management system inter-operates with the CCS to display this. This event also triggers the notification management system to send a non-confidential notification message to the public email address of each approver user and also send a confidential message to the secure email address of each approver user. The confidential message includes the recommendation. The workflow management system enables the approver users to assess the recommendation then vote to approve or reject the service request 116b. The workflow management system inter-operates with the CCS to validate the decision 117b. The workflow management system inter-operates with the CCS to display this information and to notify the supplier and the users 118b. This event also triggers the notification management system to send a non-confidential notification message to the public email address of each impacted user and also send a confidential message to the secure email address of each impacted user. This also notifies impacted users 118b. For approved service requests, the work is conducted by the selected service provider user and accepted by the reviewer users.

The present invention provides a plurality of benefits including enabling collateral providers to monetize their collateral. It also enables entrepreneurs to receive investments at more attractive rates. Also, the present invention eliminates the central organization, which eliminates human intervention that can lead to corrupt, negligent and bias behavior. Instead, a decentralized autonomous organization automates the key activities and decisions that are typically undertaken by a centralized venture capitalists whose investment decisions are typically influenced by centralized limited partners who typical provide the initial capital. The present invention offers other benefits that help the venture capital process to operate more efficiently and more effectively.

The present invention has a plurality of potential revenue streams including selling shares in portfolio companies. The present invention also generates revenues from subscription fees, licensing fees, advertising, and the sale of trend information generated by the business intelligence system. Payments can be made using a plurality of methods including fiat currencies, crypto currencies, proprietary system tokens, credit cards, debit cards, electronic funds transfer, digital cash, cash, checks and barter. In addition, a plurality of options exist for the timing of payments. It will be evident to one skilled in the art that one or more of the steps in the preferred procedure can be eliminated in specific situations without affecting the usefulness of the present invention.

Anyone skilled in the art will also recognize that the method and apparatus of the present invention has many applications and advantages, and that the present invention is not limited to the representative examples and variations disclosed herein. In addition, the scope of the present invention covers conventional variations and modifications, to the components of the present invention, which are known to those who are skilled in the art.

I claim:

1. A computer implemented method for a secure communication environment configured to manage a decentralized venture capital ("VC") fund in a decentralized autonomous organization ("DAO"), said method comprising:
   receiving, in the secure communication environment, a plurality of information about a collateral that underwrites a first number of stable coins where the stable coins are funding for said decentralized venture capital fund;
   receiving, in the secure communication environment, a request for an investment from a company;
   receiving, in the secure communication environment, from a plurality of shareholders of said decentralized venture capital fund, a first plurality of votes based on said request;
   approving said request automatically, in the secure communication environment, when a first number of approval votes, based on said first plurality of votes, exceeds a predetermined investment threshold;
   transferring, in the secure communication environment, to said company, a second number of stable coins from said first number of stable coins as the investment based on the approval;
   transferring, in the secure communication environment, at least one stable coin, from said second number of stable coins, to a seller as payment for at least one of a good and service; and
   converting, in the secure communication environment, said at least one stable coin into at least one share option in said decentralized venture capital fund,
   where the secure communication environment is generated by downloading a CCS application, from a central control system (CCS), which includes at least one processor and memory configured to store computer program code instructions, to the computers of users of the decentralized autonomous organization, the CCS application generating secure authentication messages between the users and the CCS, the secure authentication messages implementing authentication with encryption that perform the steps of:
   storing securely, on a sender's computer, a plurality of authentication and authorization information, based on using at least one of a cryptographic public encryption key and a cryptographic symmetric encryption key in a process that encrypts a secure authentication message;
   decomposing, by the CCS application running on the sender's computer, an encrypted version of said secure authentication message into a block of linked and ordered subcomponents that are stored randomly across a first plurality of member computers that are selected from a predetermined list of participating computers, a final subcomponent in the link of subcomponents flagged as a last subcomponent;
   randomly selecting, by the CSS application running on the sender's computer, three member computers on which to copy a first subcomponent of the secure authentication message;
   randomly selecting, by each of the three computers which have a copy of the first subcomponent of the secure authentication message, a member computer for which to copy a second subcomponent of the secure authentication message, and repeating the process of randomly selecting a member computer to copy the next ordered subcomponent of the secure authentication message by the computer that copied the ordered subcomponent that immediately precedes the next ordered subcomponent, until the final subcomponent of the block which is flagged as the last subcomponent has been copied, which generates three copies of blocks of linked and ordered subcomponents of the secure authentication message, where each computer which stores a copy of a subcomponent knows only of the computer which was randomly selected by that computer;

using a unique, configurable authorization identifier as a file name for each individual subcomponent, in said link of subcomponents, on each member computer that stores a subcomponent;

periodically, by the computer storing a newest copy of the first subcomponent of the secure authentication message, randomly selecting a member computer for which to copy the first subcomponent of the secure authentication message and generating a new block of linked and ordered subcomponents of the secure authentication message;

deleting an oldest block of linked and ordered subcomponents of the secure authentication message after generating the new block of linked and ordered subcomponents of the secure authentication message;

recombining, on a receiver's computer, the encrypted version of the secure authentication message from the new block of linked and ordered subcomponents of the secure authentication message after verifying, by the receiver's computer, the unique, configurable authorization identifier transmitted by the sender's computer; and recovering said secure authentication message, based on using at least one of a cryptographic private encryption key and said cryptographic symmetric encryption key in a process that decrypts said encrypted version of said secure authentication message, where said cryptographic private encryption key matches said cryptographic public encryption key.

2. The method according to claim 1, where:

encrypting said secure authentication message is based on receiving a first biometric signature from a first user; and recombining said encrypted version of said secure authentication message is based on receiving a second biometric signature from a second user.

3. The method according to claim 1, where said method further comprises:

receiving a change request from a requestor user, wherein said change request includes a change to said decentralized autonomous organization;

receiving, from said plurality of approver users, a second plurality of votes based on said change request; and approving said change request when a second number of approval votes exceeds a predetermined change threshold.

4. The method according to claim 1, where said method further comprises:

receiving a service request from a requestor user, where said service request describes a requirement for at least one of a service activity and a maintenance activity for said decentralized autonomous organization;

receiving, from a reviewer user, a request for proposal associated with said service request;

receiving, from at least one supplier user, at least one bid based on said request for proposal;

receiving, from said reviewer user, a recommended service request based on said at least one bid;

receiving, from said plurality of approver users, a third plurality of votes based on said recommended service request; and approving said recommended service request when a third number of approval votes exceeds a predetermined service threshold.

5. The method according to claim 1, where said method further comprises:

receiving, from a requestor user, an arbitration request, where said arbitration request includes a request to amend at least one of a change request, a service request and said request for said investment;

receiving, from an arbitration user, a summary adjudication of said arbitration request and a recommended amendment to at least one of said change request, said service request and said request for said investment;

receiving, from said plurality of approver users, a fourth plurality of votes based on said recommended amendment; and approving said recommended amendment when a fourth number of approval votes exceeds a predetermined arbitration threshold.

6. The method according to claim 1, where:

transferring said investment, based on a plurality of terms and conditions, includes using a first smart contract to:

retrieve said second plurality of stable coins from a first blockchain address associated with said decentralized venture capital fund; then pay said second plurality of stable coins into a second blockchain address associated with said company;

transferring said at least one stable coin, includes using a second smart contract to:

retrieve said at least one stable coin from said second blockchain address; then pay said at least one stable coin into a third blockchain address associated with said seller; and converting said at least one stable coin into at least one share option, includes using a third smart contract to:

retrieve said at least one stable coin from said third blockchain address; then pay said at least one stable coin into said first blockchain address; and transfer ownership of said share option to said seller.

7. The method according to claim 1, where said decentralized autonomous organization further comprises:

receiving a plurality of diagnostic data from at least one sensor configured to monitor at least one performance parameter of at least one infrastructure component that comprises said decentralized autonomous organization; and predicting a service need for said at least one infrastructure component based on said plurality of diagnostic data, whereby a service request is received from a requestor user based on the prediction before said service need causes a system failure.

8. A system for a secure communication environment configured to manage a decentralized venture capital ("VC") fund in a decentralized autonomous organization ("DAO"), comprising:

at least one memory configured to store computer program code instructions; and at least one processor configured to execute said computer program code instructions to:

receive, in the secure communication environment, a plurality of information about a collateral that underwrites a first number of stable coins where the stable coins are funding for said decentralized venture capital fund;

receive, in the secure communication environment, a request for an investment from a company;

receive, in the secure communication environment, from a plurality of shareholders of said decentralized venture capital fund, a first plurality of votes based on said request;

approve said request automatically, in the secure communication environment, when a first number of approval votes, based on said first plurality of votes, exceeds a predetermined investment threshold;

transfer, in the secure communication environment, to said company, a second number of stable coins from said first number of stable coins as the investment based on the approval;

transfer, in the secure communication environment, at least one stable coin, from said second number of stable coins, to a seller as payment for at least one of a good and service; and convert, in the secure communication environment, said at least one stable coin into at least one share option in said decentralized venture capital fund, where the secure communication environment is generated by downloading a CCS application, from a central control system (CCS), which includes at least one processor and memory configured to store computer program code instructions, to the computers of users of the decentralized autonomous organization, the CCS application generates secure authentication messages between the users and the CCS, the secure authentication messages implement authentication with encryption that:

store securely, on a sender's computer, a plurality of authentication and authorization information, based on a use of at least one of a cryptographic public encryption key and a cryptographic symmetric encryption key in a process that encrypts a secure authentication message;

decompose, by the CCS application running on the sender's computer, an encrypted version of said secure authentication message into a block of linked and ordered subcomponents that are stored randomly across a first plurality of member computers that are selected from a predetermined list of participating computers, a final subcomponent in the link of subcomponents flagged as a last subcomponent;

randomly select, by the CSS application running on the sender's computer, three member computers on which to copy a first subcomponent of the secure authentication message;

randomly select, by each of the three computers which have a copy of the first subcomponent of the secure authentication message, a member computer for which to copy a second subcomponent of the secure authentication message, and repeat the process that randomly selects a member computer to copy the next ordered subcomponent of the secure authentication message by the computer that copied the ordered subcomponent that immediately precedes the next ordered subcomponent, until the final subcomponent of the block which is flagged as the last subcomponent has been copied, which generates three copies of blocks of linked and ordered subcomponents of the secure authentication message, where each computer which stores a copy of a subcomponent knows only of the computer which was randomly selected by that computer;

use a unique, configurable authorization identifier as a file name for each individual subcomponent, in said link of subcomponents, on each member computer that stores a subcomponent;

periodically, by the computer that stores a newest copy of the first subcomponent of the secure authentication message, select randomly a member computer for which to copy the first subcomponent of the secure authentication message and generate a new block of linked and ordered subcomponents of the secure authentication message;

delete an oldest block of linked and ordered subcomponents of the secure authentication message after the generation of the new block of linked and ordered subcomponents of the secure authentication message;

recombine, on a receiver's computer, the encrypted version of the secure authentication message from the new block of linked and ordered subcomponents of the secure authentication message after a verification, by the receiver's computer, of the unique, configurable authorization identifier transmitted by the sender's computer; and recover said secure authentication message, based on the use of at least one of a cryptographic private encryption key and said cryptographic symmetric encryption key in a process that decrypts said encrypted version of said secure authentication message, where said cryptographic private encryption key matches said cryptographic public encryption key.

9. The system according to claim 8, where said at least one processor is further configured to:

encrypt said secure authorization based on a receipt of a first biometric signature from a first user; and recombine said encrypted version of said secure authorization based on a receipt of a second biometric signature from a second user.

10. The system according to claim 8, where said at least one processor is further configured to:

receive a change request from a requestor user, where said change request includes a change to said decentralized autonomous organization;

receive, from said plurality of approver users, a second plurality of votes based on said change request; and approve said change request when a second number of approval votes exceeds a predetermined change threshold.

11. The system according to claim 8, where said at least one processor is further configured to:

receive a service request from said requestor user, where said service request describes a requirement for at least one of a service activity and a maintenance activity for said decentralized autonomous organization;

receive, from a reviewer user, a request for proposal associated with said service request;

receive, from at least one supplier user, at least one bid based on said request for proposal;

receive, from said reviewer user, a recommended service request based on said at least one bid;

receive, from said plurality of approver users, a third plurality of votes based on said recommended service request; and approve said recommended service request when a third number of approval votes exceeds a predetermined service threshold.

12. The system according to claim 8, where said at least one processor is further configured to:
- receive, from a requestor user, an arbitration request, where said arbitration request includes a request to amend at least one of a change request, a service request and said request for said investment;
- receive, from an arbitration user, a summary adjudication of said arbitration request and a recommended amendment to at least one of said change request, said service request and said request for said investment;
- receive, from said plurality of approver users, a plurality of arbitration votes based on said recommended amendment; and
- approve said recommended amendment when a number of approval votes exceeds a predetermined arbitration threshold.

13. The system according to claim 8, where said at least one processor is configured to:
- transfer said investment, based on a plurality of terms and conditions, includes using a first smart contract to:
  - retrieve said second plurality of stable coins from a first blockchain address associated with said decentralized venture capital fund; then
  - pay said second plurality of stable coins into a second blockchain address associated with said company;
- transfer said at least one stable coin, includes using a second smart contract to:
  - retrieve said at least one stable coin from said second blockchain address; then
  - pay said at least one stable coin into a third blockchain address associated with said seller; and
- convert said at least one stable coin into at least one share option, includes using a third smart contract to:
  - retrieve said at least one stable coin from said third blockchain address; then
  - pay said at least one stable coin into said first blockchain address; and
  - transfer ownership of said share option to said seller.

14. The system according to claim 8, where said at least one processor is further configured to:
- receive a plurality of diagnostic data from at least one sensor configured to monitor at least one performance parameter of at least one infrastructure component that comprises said decentralized autonomous organization; and
- predict a service need for said at least one infrastructure component based on said plurality of diagnostic data, whereby a service request is received from said requestor user based on the prediction before said service need causes a system failure.

15. A non-transitory computer storage medium storing computer-executable instructions that, when executed, cause a processor to perform a computer-implemented operation for a secure communication environment configured to manage a decentralized venture capital ("VC") fund in a decentralized autonomous organization ("DAO"), comprising:
- receiving, in the secure communication environment, a plurality of information about a collateral that underwrites a first number of stable coins where the stable coins are funding for said decentralized venture capital fund;
- receiving, in the secure communication environment, a request for an investment from a company;
- receiving, in the secure communication environment, from a plurality of shareholders of said decentralized venture capital fund, a first plurality of votes based on said request;
- approving said request automatically, in the secure communication environment, when a first number of approval votes, based on said first plurality of votes, exceeds a predetermined investment threshold;
- transferring, in the secure communication environment, to said company, a second number of stable coins from said first number of stable coins as the investment based on the approval;
- transferring, in the secure communication environment, at least one stable coin, from said second number of stable coins, to a seller as payment for at least one of a good and service; and
- converting, in the secure communication environment, said at least one stable coin into at least one share option in said decentralized venture capital fund,
- where the secure communication environment is generated by downloading a CCS application, from a central control system (CCS), which includes at least one processor and memory configured to store computer program code instructions, to the computers of users of the decentralized autonomous organization, the CCS application generating secure authentication messages between the users and the CCS, the secure authentication messages implementing authentication with encryption that perform the steps of:
- storing securely, on a sender's computer, a plurality of authentication and authorization information, based on using at least one of a cryptographic public encryption key and a cryptographic symmetric encryption key in a process that encrypts a secure authentication message;
- decomposing, by the CCS application running on the sender's computer, an encrypted version of said secure authentication message into a block of linked and ordered subcomponents that are stored randomly across a first plurality of member computers that are selected from a predetermined list of participating computers, a final subcomponent in the link of subcomponents flagged as a last subcomponent;
- randomly selecting, by the CSS application running on the sender's computer, three member computers on which to copy a first subcomponent of the secure authentication message;
- randomly selecting, by each of the three computers which have a copy of the first subcomponent of the secure authentication message, a member computer for which to copy a second subcomponent of the secure authentication message, and repeating the process of randomly selecting a member computer to copy the next ordered subcomponent of the secure authentication message by the computer that copied the ordered subcomponent that immediately precedes the next ordered subcomponent, until the final subcomponent of the block which is flagged as the last subcomponent has been copied, which generates three copies of blocks of linked and ordered subcomponents of the secure authentication message, where each computer which stores a copy of a subcomponent knows only of the computer which was randomly selected by that computer;
- using a unique, configurable authorization identifier as a file name for each individual subcomponent, in said link of subcomponents, on each member computer that stores a subcomponent;

periodically, by the computer storing a newest copy of the first subcomponent of the secure authentication message, randomly selecting a member computer for which to copy the first subcomponent of the secure authentication message and generating a new block of linked and ordered subcomponents of the secure authentication message;

deleting an oldest block of linked and ordered subcomponents of the secure authentication message after generating the new block of linked and ordered subcomponents of the secure authentication message;

recombining, on a receiver's computer, the encrypted version of the secure authentication message from the new block of linked and ordered subcomponents of the secure authentication message after verifying, by the receiver's computer, the unique, configurable authorization identifier transmitted by the sender's computer; and recovering said secure authentication message, based on using at least one of a cryptographic private encryption key and said cryptographic symmetric encryption key in a process that decrypts said encrypted version of said secure authentication message, where said cryptographic private encryption key matches said cryptographic public encryption key.

16. The non-transitory computer storage medium of claim 15, further comprising:
    receiving a change request from a requestor user, wherein said change request includes a change to said decentralized autonomous organization;
    receiving, from said plurality of approver users, a second plurality of votes based on said change request; and
    approving said change request when a second number of approval votes exceeds a predetermined change threshold.

17. The non-transitory computer storage medium of claim 15, further comprising:
    receiving a service request from a requestor user, where said service request describes a requirement for at least one of a service activity and a maintenance activity for said decentralized autonomous organization;
    receiving, from a reviewer user, a request for proposal associated with said service request;
    receiving, from at least one supplier user, at least one bid based on said request for proposal;
    receiving, from said reviewer user, a recommended service request based on said at least one bid;
    receiving, from said plurality of approver users, a third plurality of votes based on said recommended service request; and
    approving said recommended service request when a third number of approval service votes exceeds a predetermined service threshold.

18. The non-transitory computer storage medium of claim 15, further comprising:
    receiving, from a requestor user, an arbitration request, where said arbitration request includes a request to amend at least one of a change request, a service request and said request for said investment;
    receiving, from an arbitration user, a summary adjudication of said arbitration request and a recommended amendment to at least one of said change request, said service request and said request for said investment;
    receiving, from said plurality of approver users, a forth plurality of votes based on said recommended amendment; and
    approving said recommended amendment when a forth number of approval votes exceeds a predetermined arbitration threshold.

19. The non-transitory computer storage medium of claim 15, further comprising:
    transferring said investment, based on a plurality of terms and conditions, includes using a first smart contract to:
    retrieve said second plurality of stable coins from a first blockchain address associated with said decentralized venture capital fund; then
    pay said second plurality of stable coins into a second blockchain address associated with said company;
    transferring said at least one stable coin, includes using a second smart contract to:
    retrieve said at least one stable coin from said second blockchain address; then
    pay said at least one stable coin into a third blockchain address associated with said seller; and
    converting said at least one stable coin into at least one share option, includes using a third smart contract to:
    retrieve said at least one stable coin from said third blockchain address; then
    pay said at least one stable coin into said first blockchain address; and
    transfer ownership of said share option to said seller.

20. The non-transitory computer storage medium of claim 15, further comprising:
    receiving a plurality of diagnostic data from at least one sensor configured to monitor at least one performance parameter of at least one infrastructure component that comprises said decentralized autonomous organization; and
    predicting a service need for said at least one infrastructure component based on said plurality of diagnostic data,
    whereby a service request is received from a requestor user based on the prediction before said service need causes a system failure.

* * * * *